United States Patent
Jung et al.

(10) Patent No.: US 10,069,703 B2
(45) Date of Patent: Sep. 4, 2018

(54) METHODS AND SYSTEMS FOR MONITORING AND/OR MANAGING DEVICE DATA

(71) Applicant: Elwha LLC, Bellevue, WA (US)

(72) Inventors: Edward K. Y. Jung, Bellevue, WA (US); Royce A. Levien, Lexington, MA (US); Richard T. Lord, Gig Harbor, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/732,326

(22) Filed: Dec. 31, 2012

(65) Prior Publication Data

US 2014/0122702 A1 May 1, 2014

Related U.S. Application Data

(63) Continuation of application No. 13/732,305, filed on Dec. 31, 2012, now Pat. No. 9,749,206, which is a
(Continued)

(51) Int. Cl.
*H04L 12/26* (2006.01)
*H04L 29/06* (2006.01)
*H04L 29/08* (2006.01)

(52) U.S. Cl.
CPC .......... *H04L 43/0876* (2013.01); *H04L 43/00* (2013.01); *H04L 63/0421* (2013.01); *H04L 67/22* (2013.01)

(58) Field of Classification Search
CPC . H04L 43/00; H04L 43/0876; H04L 63/0421; H04L 67/22
(Continued)

(56) References Cited

U.S. PATENT DOCUMENTS 6,029,175 A 2/2000 Chow et al.
6,122,520 A 9/2000 Want et al.
(Continued)

FOREIGN PATENT DOCUMENTS

EP 1818807 A 8/2007
WO WO 01/28273 A1 4/2001

OTHER PUBLICATIONS

Holder, Joseph, "BlackBerry 101—Application permission", Dec. 31, 2010, pp. 1-6.*
(Continued)

*Primary Examiner* — Michael Pyzocha

(57) ABSTRACT

Computationally implemented methods and systems include monitoring one or more properties of a device configured to carry out one or more services, determining one or more services that require access to a particular portion of the device, said determining at least partly based on the monitored one or more properties of the device, and facilitating presentation, to the device, of the determined one or more services that require access to the particular portion of the device, and are configured to be carried out by the device, wherein the one or more services are presented along with a request for access to the particular portion of the device. In addition to the foregoing, other aspects are described in the claims, drawings, and text.

37 Claims, 39 Drawing Sheets

Related U.S. Application Data continuation-in-part of application No. 13/685,485, filed on Nov. 26, 2012, now Pat. No. 9,825,800, and a continuation-in-part of application No. 13/685,609, filed on Nov. 26, 2012, now abandoned, and a continuation-in-part of application No. 13/685,488, filed on Nov. 26, 2012, now Pat. No. 9,755,884, and a continuation-in-part of application No. 13/685,612, filed on Nov. 26, 2012, and a continuation-in-part of application No. 13/685,491, filed on Nov. 26, 2012, now Pat. No. 9,948,492, and a continuation-in-part of application No. 13/685,613, filed on Nov. 26, 2012, now abandoned, and a continuation-in-part of application No. 13/692,829, filed on Dec. 3, 2012, now Pat. No. 9,736,004, and a continuation-in-part of application No. 13/692,882, filed on Dec. 3, 2012.

(58) Field of Classification Search
USPC .................................................. 726/27, 22
See application file for complete search history.

(56) References Cited

U.S. PATENT DOCUMENTS

| | | |
|---|---|---|
| 6,509,830 B1 | 1/2003 | Elliot |
| 6,871,277 B1 | 3/2005 | Keronen |
| 7,178,034 B2 | 2/2007 | Cihula et al. |
| 7,203,752 B2 | 4/2007 | Rice et al. |
| 7,269,853 B1 | 9/2007 | Dunn |
| 7,496,652 B2 | 2/2009 | Pezzutti |
| 7,647,164 B2 | 1/2010 | Reeves |
| 7,680,889 B2 | 3/2010 | Blumenau et al. |
| 7,685,238 B2 | 3/2010 | Etelapera |
| 7,849,311 B2 | 12/2010 | Donlin et al. |
| 7,860,807 B2 | 12/2010 | Kaneko et al. |
| 7,873,957 B2 | 1/2011 | Nallipogu et al. |
| 7,913,312 B2 | 3/2011 | de Jong |
| 7,917,154 B2 | 3/2011 | Fortescue et al. |
| 7,996,682 B2 | 8/2011 | Schutz et al. |
| 8,175,794 B1* | 5/2012 | Szybalski .......... G06F 17/30241 701/409 |
| 8,364,389 B2 | 1/2013 | Dorogusker et al. |
| 8,387,155 B2 | 2/2013 | Gregg et al. |
| 8,504,729 B2 | 8/2013 | Pezzutti |
| 8,554,608 B1 | 10/2013 | O'Connor |
| 8,578,483 B2 | 11/2013 | Seshadri et al. |
| 8,630,494 B1* | 1/2014 | Svendsen ............ G06K 9/00677 382/209 |
| 8,756,321 B2 | 6/2014 | Clark et al. |
| 8,838,751 B1 | 9/2014 | Scofield et al. |
| 9,047,648 B1* | 6/2015 | Lekutai .................. G06Q 50/22 |
| 2001/0025316 A1 | 9/2001 | Oh |
| 2002/0032798 A1 | 3/2002 | Xu |
| 2003/0023726 A1 | 1/2003 | Rice et al. |
| 2003/0045308 A1 | 3/2003 | Sidhu et al. |
| 2003/0130893 A1 | 7/2003 | Farmer |
| 2003/0145229 A1 | 7/2003 | Cohen et al. |
| 2003/0191877 A1* | 10/2003 | Zaudtke .............. G06F 11/0709 710/72 |
| 2004/0002902 A1 | 1/2004 | Muehlhaeuser |
| 2004/0036611 A1 | 2/2004 | Kidney et al. |
| 2004/0128500 A1 | 7/2004 | Cihula et al. |
| 2004/0214576 A1 | 10/2004 | Myers et al. |
| 2004/0230835 A1* | 11/2004 | Goldfeder ............. G06F 21/566 726/23 |
| 2005/0162699 A1* | 7/2005 | Fukunaga .......... H04N 1/00132 358/1.18 |
| 2005/0182825 A1 | 8/2005 | Eytchison |
| 2005/0272445 A1* | 12/2005 | Zellner .................. H04L 41/12 455/456.2 |
| 2005/0278342 A1 | 12/2005 | Abdo et al. |
| 2006/0010047 A1 | 1/2006 | Minor |
| 2006/0031337 A1 | 2/2006 | Kim |
| 2006/0229778 A1 | 10/2006 | Obradovich et al. |
| 2007/0006321 A1* | 1/2007 | Bantz ................. G06F 21/6218 726/27 |
| 2007/0044143 A1 | 2/2007 | Zhu et al. |
| 2007/0113079 A1 | 5/2007 | Ito et al. |
| 2007/0136466 A1 | 6/2007 | Etelapera |
| 2007/0142727 A1 | 6/2007 | Zhang et al. |
| 2007/0232268 A1 | 10/2007 | Park et al. |
| 2007/0273583 A1 | 11/2007 | Rosenberg |
| 2008/0046886 A1* | 2/2008 | Brown ................. G06F 21/577 718/100 |
| 2008/0076451 A1 | 3/2008 | Sheha et al. |
| 2008/0102856 A1 | 5/2008 | Fortescue et al. |
| 2008/0126541 A1 | 5/2008 | Rosenberg et al. |
| 2008/0153670 A1 | 6/2008 | McKirdy et al. |
| 2008/0189793 A1* | 8/2008 | Kirkup .................... G06F 21/53 726/27 |
| 2008/0207232 A1* | 8/2008 | Rice ................... G06F 17/30893 455/466 |
| 2008/0229389 A1* | 9/2008 | Singh ................. G06F 21/6209 726/3 |
| 2009/0077085 A1* | 3/2009 | Olivieri ............. G06F 17/30383 |
| 2009/0160970 A1* | 6/2009 | Fredlund ................ H04N 5/232 348/229.1 |
| 2009/0248833 A1* | 10/2009 | Frazier .............. G06F 17/30041 709/217 |
| 2010/0015993 A1* | 1/2010 | Dingler ................ G06Q 10/109 455/456.1 |
| 2010/0024020 A1 | 1/2010 | Baugher et al. |
| 2010/0035596 A1 | 2/2010 | Nachman et al. |
| 2010/0070475 A1* | 3/2010 | Chen ................... G06F 11/1461 707/640 |
| 2010/0082237 A1 | 4/2010 | Black |
| 2010/0094458 A1 | 4/2010 | Sagady et al. |
| 2010/0107225 A1 | 4/2010 | Spencer et al. |
| 2010/0151842 A1 | 6/2010 | De Vries |
| 2010/0238985 A1* | 9/2010 | Traywick ................ H04B 1/401 375/220 |
| 2010/0324819 A1 | 12/2010 | Nurminen et al. |
| 2010/0325239 A1 | 12/2010 | Khedouri et al. |
| 2011/0018759 A1 | 1/2011 | Bennett et al. |
| 2011/0022468 A1 | 1/2011 | Muster et al. |
| 2011/0059693 A1 | 3/2011 | O'Sullivan |
| 2011/0093941 A1* | 4/2011 | Liu ..................... G06F 9/44505 726/7 |
| 2011/0099040 A1 | 4/2011 | Felt et al. |
| 2011/0125866 A1 | 5/2011 | Williams |
| 2011/0128568 A1* | 6/2011 | Bhogal ................. G06F 3/1204 358/1.15 |
| 2011/0136472 A1* | 6/2011 | Rector .............. H04M 1/72572 455/411 |
| 2011/0145089 A1 | 6/2011 | Khunger et al. |
| 2011/0153189 A1 | 6/2011 | Chiang et al. |
| 2011/0173681 A1 | 7/2011 | Qureshi et al. |
| 2011/0179366 A1 | 7/2011 | Chae |
| 2011/0190009 A1 | 8/2011 | Gerber, Jr. et al. |
| 2011/0205965 A1 | 8/2011 | Sprigg et al. |
| 2011/0209221 A1* | 8/2011 | Hanson ............. G06F 17/30265 726/26 |
| 2011/0231092 A1* | 9/2011 | Kuo .......................... G01S 5/16 701/532 |
| 2011/0243553 A1 | 10/2011 | Russell |
| 2011/0274011 A1 | 11/2011 | Stuempert et al. |
| 2011/0295899 A1 | 12/2011 | James et al. |
| 2011/0313804 A1 | 12/2011 | Camp et al. |
| 2011/0313880 A1 | 12/2011 | Paul et al. |
| 2012/0016951 A1* | 1/2012 | Li ...................... H04N 21/6125 709/217 |
| 2012/0017252 A1* | 1/2012 | Li ...................... H04L 65/1063 725/110 |
| 2012/0036345 A1 | 2/2012 | Chen et al. |
| 2012/0054841 A1 | 3/2012 | Schultz et al. |
| 2012/0084247 A1 | 4/2012 | Aguera y Arcas et al. |
| 2012/0089465 A1 | 4/2012 | Froloff |
| 2012/0096080 A1 | 4/2012 | Levesque et al. |
| 2012/0101952 A1 | 4/2012 | Raleigh et al. |
| 2012/0117232 A1 | 5/2012 | Brown et al. |
| 2012/0143662 A1 | 6/2012 | Heath |
| 2012/0179764 A1 | 7/2012 | Erdal |

(56) References Cited

U.S. PATENT DOCUMENTS

| | | |
|---|---|---|
| 2012/0185912 A1 | 7/2012 | Lee et al. |
| 2012/0197852 A1 | 8/2012 | Dutta et al. |
| 2012/0209923 A1* | 8/2012 | Mathur .................. G06F 21/53 709/206 |
| 2012/0222083 A1 | 8/2012 | Vaha-Sipila et al. |
| 2012/0252498 A1 | 10/2012 | Trinchero et al. |
| 2012/0291101 A1 | 11/2012 | Ahlstrom et al. |
| 2012/0293465 A1 | 11/2012 | Nandu et al. |
| 2012/0296455 A1 | 11/2012 | Ohnemus et al. |
| 2012/0317565 A1* | 12/2012 | Carrara ..................... G06F 8/61 717/178 |
| 2013/0014212 A1 | 1/2013 | Cohen |
| 2013/0046632 A1 | 2/2013 | Grigg et al. |
| 2013/0054139 A1 | 2/2013 | Bodin et al. |
| 2013/0059698 A1 | 3/2013 | Barton |
| 2013/0110854 A1* | 5/2013 | Lockhart ............... G06F 17/212 707/756 |
| 2013/0124546 A1 | 5/2013 | Wormley et al. |
| 2013/0179244 A1 | 7/2013 | Laffoon et al. |
| 2013/0179988 A1 | 7/2013 | Bekker et al. |
| 2013/0218704 A1* | 8/2013 | Duncan ................. G06Q 30/08 705/26.3 |
| 2013/0219461 A1 | 8/2013 | Esaki et al. |
| 2013/0232573 A1* | 9/2013 | Saidi ................... G06F 21/6218 726/22 |
| 2013/0263000 A1* | 10/2013 | Lucas et al. ................. 715/719 |
| 2013/0263206 A1* | 10/2013 | Nefedov et al. ................. 726/1 |
| 2013/0268378 A1* | 10/2013 | Yovin .................. G06Q 20/204 705/18 |
| 2013/0282227 A1* | 10/2013 | Chen et al. .................. 701/31.5 |
| 2013/0290359 A1 | 10/2013 | Eronen et al. |
| 2013/0318627 A1* | 11/2013 | Lundkvist et al. ............ 726/27 |
| 2013/0339234 A1 | 12/2013 | Prakash et al. |
| 2014/0006616 A1 | 1/2014 | Aad et al. |
| 2014/0031959 A1 | 1/2014 | Glode et al. |
| 2014/0047062 A1 | 2/2014 | Krueger et al. |
| 2014/0059695 A1* | 2/2014 | Parecki et al. .................. 726/26 |
| 2014/0074570 A1* | 3/2014 | Hope ..................... G06Q 30/02 705/14.4 |
| 2014/0078304 A1* | 3/2014 | Othmer .................... G08G 1/20 348/148 |
| 2014/0122890 A1 | 5/2014 | Prot |
| 2014/0123300 A1 | 5/2014 | Jung et al. |
| 2014/0195349 A1 | 7/2014 | Muster et al. |
| 2015/0222641 A1* | 8/2015 | Lu ........................... G06F 21/57 726/1 |

OTHER PUBLICATIONS

Tasker, "Total Automation for Android" user guide archived on Jul. 5, 2012, 14 pages.*

Beresford, Alastair et al., "MockDroid: trading privacy for application functionality on smartphones", HotMobile '11 Mar. 1-3, 2011, pp. 49-54.*

PCT International Search Report; International App. No. PCT/US14/19562; dated Jun. 10, 2014; pp. 1-2.

Zhou, Yajin et al., "Taming Information-Stealing Smartphone Applications (on Android)," Proceedings of the 4th International Conference on Trust and Trustworthy Computing, Pittsburgh, PA, Jun. 2011, 15 pages.

Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.

Extended European Search Report; European App. No. EP 14 75 7393; dated Oct. 13, 2016; pp. 1-8.

Hildenbrand, Jerry; "Android app permissions—How Google gets it right . . . "; bearing a date of Feb. 2012; printed on Apr. 1, 2017; pp. 1-22; located at: http://www.androidcentral.com/android-permissions-privacy-security.

* cited by examiner

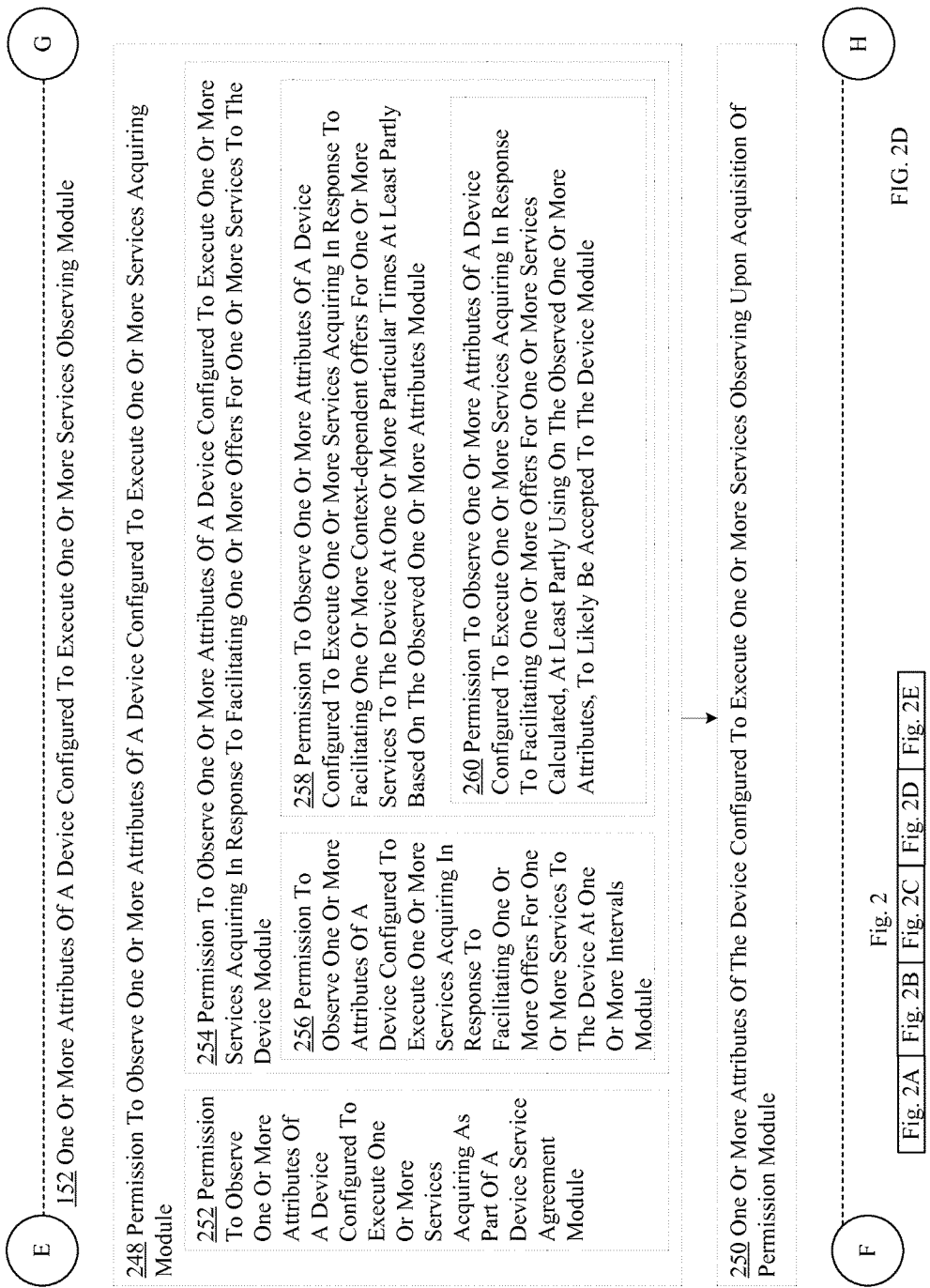

154 Service That Requires Access To A Particular Portion Of The Device For Execution Determining At Least Partly Based On The One Or More Observed Attributes Module 302 Service That Requires Access To Particular Data Under Control Of The Device For Execution Determining At Least Partly Based On The One Or More Observed Attributes Module 304 Picture Analyzing Service That Requires Access To Image Data Under Control Of The Device For Execution Determining At Least Partly Based On The One Or More Observed Attributes Module 306 Picture Analyzing Service That Requires Access To Image Data Under Control Of The Device For Execution Determining At Least Partly Based On The One Or More Observed Attributes Indicating That More Than Five Hundred Images Are Stored On The Device Module 308 Service That Requires Access To A Particular Sensor Of The Device For Execution Determining At Least Partly Based On The One Or More Observed Attributes Module 310 Service That Requires Access To A Velocity Sensor Of The Device For Execution Determining At Least Partly Based On The One Or More Observed Attributes Module

Fig. 3

| Fig. 3A | Fig. 3B | Fig. 3C | Fig. 3D |

FIG. 3A

154 Service That Requires Access To A Particular Portion Of The Device For Execution Determining At Least Partly Based On The One Or More Observed Attributes Module 322 Service That Requires Access To A Particular Portion Of The Device For Execution Determining At Least Partly Based On The One Or More Observed Attributes Of The Particular Portion Module

| 324 Service That Requires Access To A Particular Portion Of The Device For Execution Determining At Least Partly Based On An Observed State Of The Particular Portion Module | 326 Service That Requires Access To A Particular Portion Of The Device For Execution Determining At Least Partly Based On An Observed Usage Of The Particular Portion Module | 328 Service That Requires Access To A Particular Portion Of The Device For Execution Determining At Least Partly Based On An Observed Condition Detected By A Particular Sensor Module |

330 Service That Requires Access To Particular Data Of The Device For Execution Determining At Least Partly Based On One Or More Observed Attributes Of The Particular Data Module 332 Service That Requires Access To Particular Data Of The Device For Execution Determining At Least Partly Based On Received Information Regarding One Or More Attributes Of The Particular Data Module 334 Service That Requires Access To Particular Data Of The Device For Execution Determining At Least Partly Based On Received Information Regarding One Or More Values Of At Least A Portion Of The Particular Data Module

| Fig. 3A | Fig. 3B | Fig. 3C | Fig. 3D |

154 Service That Requires Access To A Particular Portion Of The Device For Execution Determining At Least Partly Based On The One Or More Observed Attributes Module 336 Service That Requires Access To A Particular Portion Of The Device For Execution Determining At Least Partly Based On An Environment Of The Device Attribute As Detected By An Observed Sensor Of The Device Module 338 Soda Pop Vending Machine Location Finding Service That Requires Access To A Positioning Sensor Of The Device For Execution Determining At Least Partly Based On An Ambient Temperature Surrounding The Device As Detected By An Observed Temperature Sensor Of The Device Module 340 Service That Requires Ongoing Access To A Particular Portion Of The Device For Execution Determining At Least Partly Based On The One Or More Observed Attributes Module

FIG. 3D

| Fig. 3A | Fig. 3B | Fig. 3C | Fig. 3D |

Fig. 3

156 Determined Service That Is Configured To Be Carried Out On The Device At Least In Part By Accessing The Particular Portion Of The Device And Request For Access To The Device Particular Portion At Least To Facilitate Carrying Out The Service Device Presentation Facilitating Module

| 402 Determined Service That Is Configured To Be Carried Out On The Device At Least In Part By Accessing The Particular Portion Of The Device, And Request For Access To The Device Particular Portion At Least To Facilitate Carrying Out The Service Device Presentation As Payment For Facilitating Carrying Out The Service Device Presentation Facilitating Module | 404 Determined Service That Is Configured To Be Carried Out On The Device At Least In Part By Accessing The Particular Portion Of The Device And Request For Access To The Device Particular Portion At Least To Facilitate Carrying Out The Service Device Presentation Of The Determined Service And The Request For Access In A Cell Of A Table Of One Or More Services Facilitating Module | 406 Determined Service That Is Configured To Be Carried Out On The Device At Least In Part By Accessing The Particular Portion Of The Device And Request For Access To The Device Particular Portion At Least To Facilitate Carrying Out The Service Device Presentation Of The Determined Service A Cell Of A Table And The Request For Access In An Adjacent Cell Of The Table Facilitating Module |

| Fig. 4A | Fig. 4B | Fig. 4C | Fig. 4D | Fig. 4E | Fig. 4F | Fig. 4G |

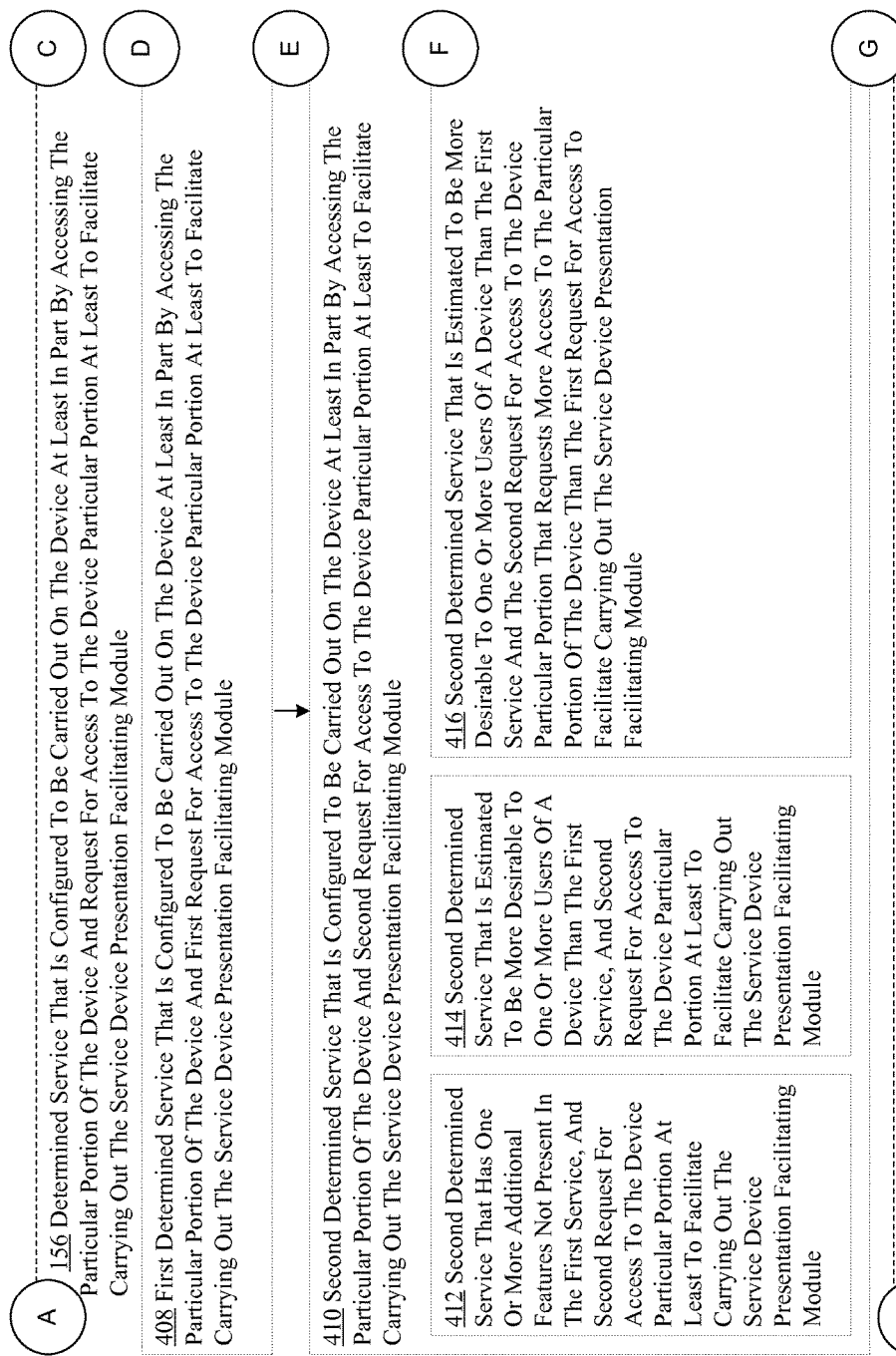

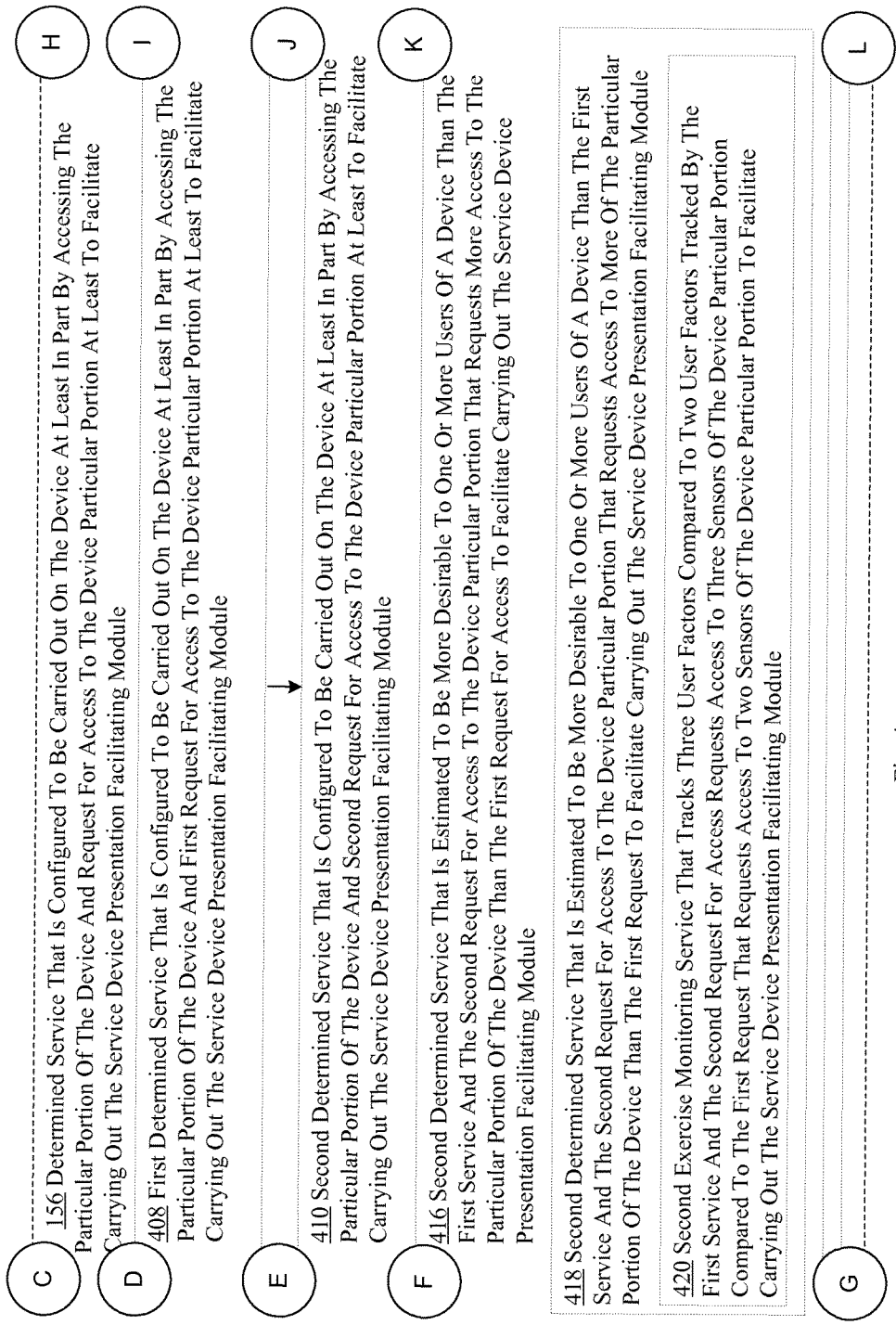

| Fig. 4A | Fig. 4B | Fig. 4C | Fig. 4D | Fig. 4E | Fig. 4F | Fig. 4G |

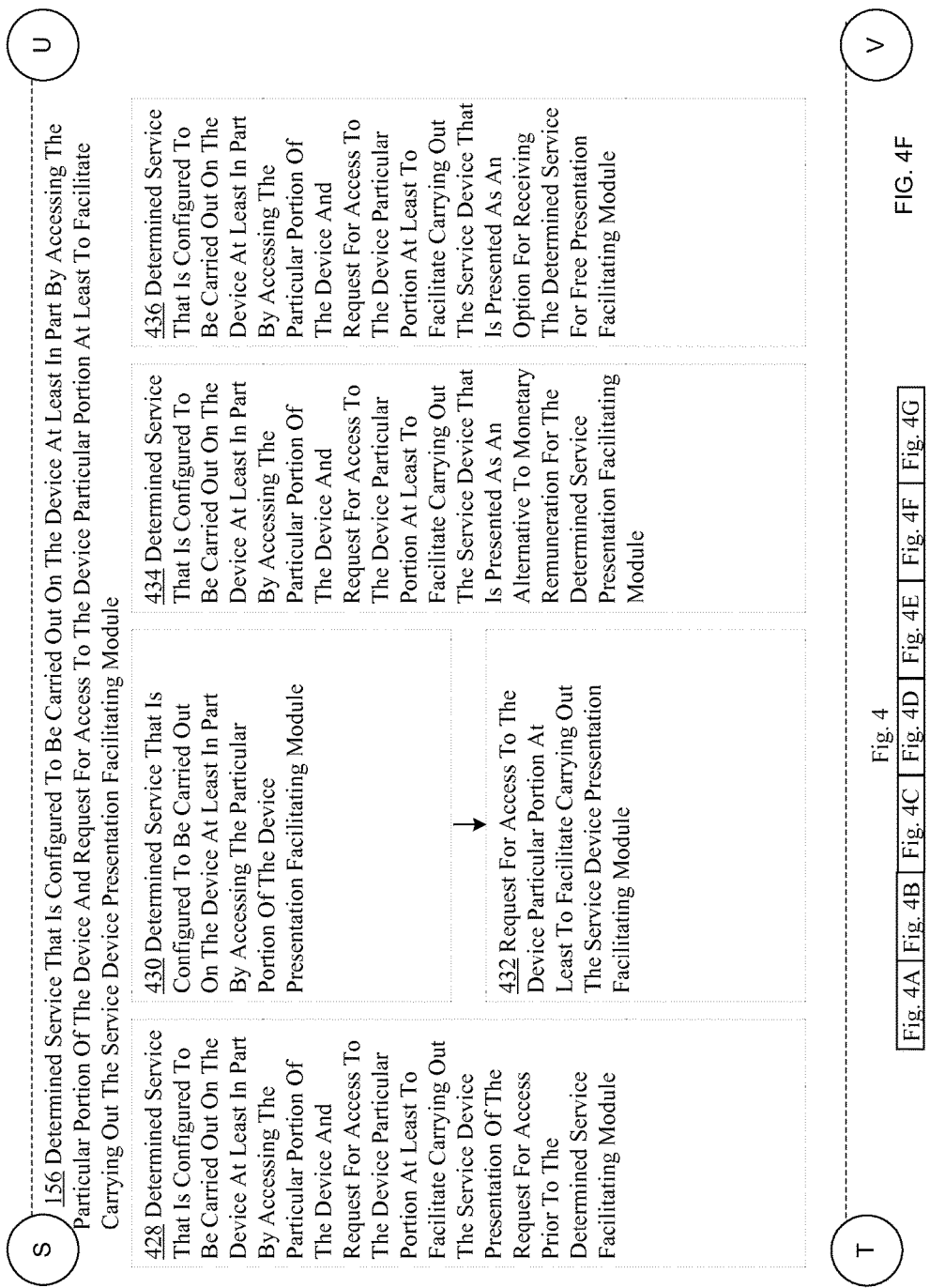

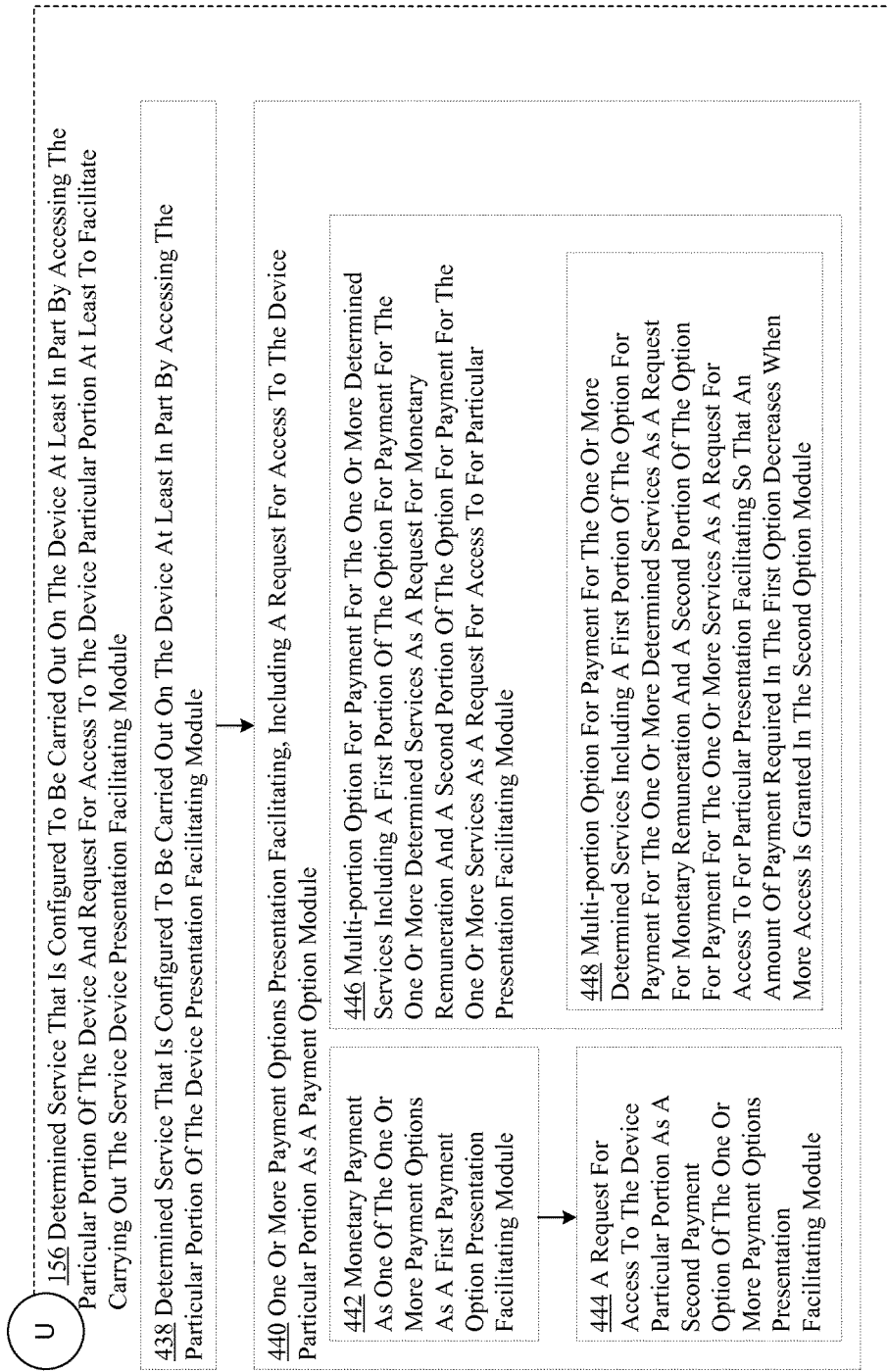

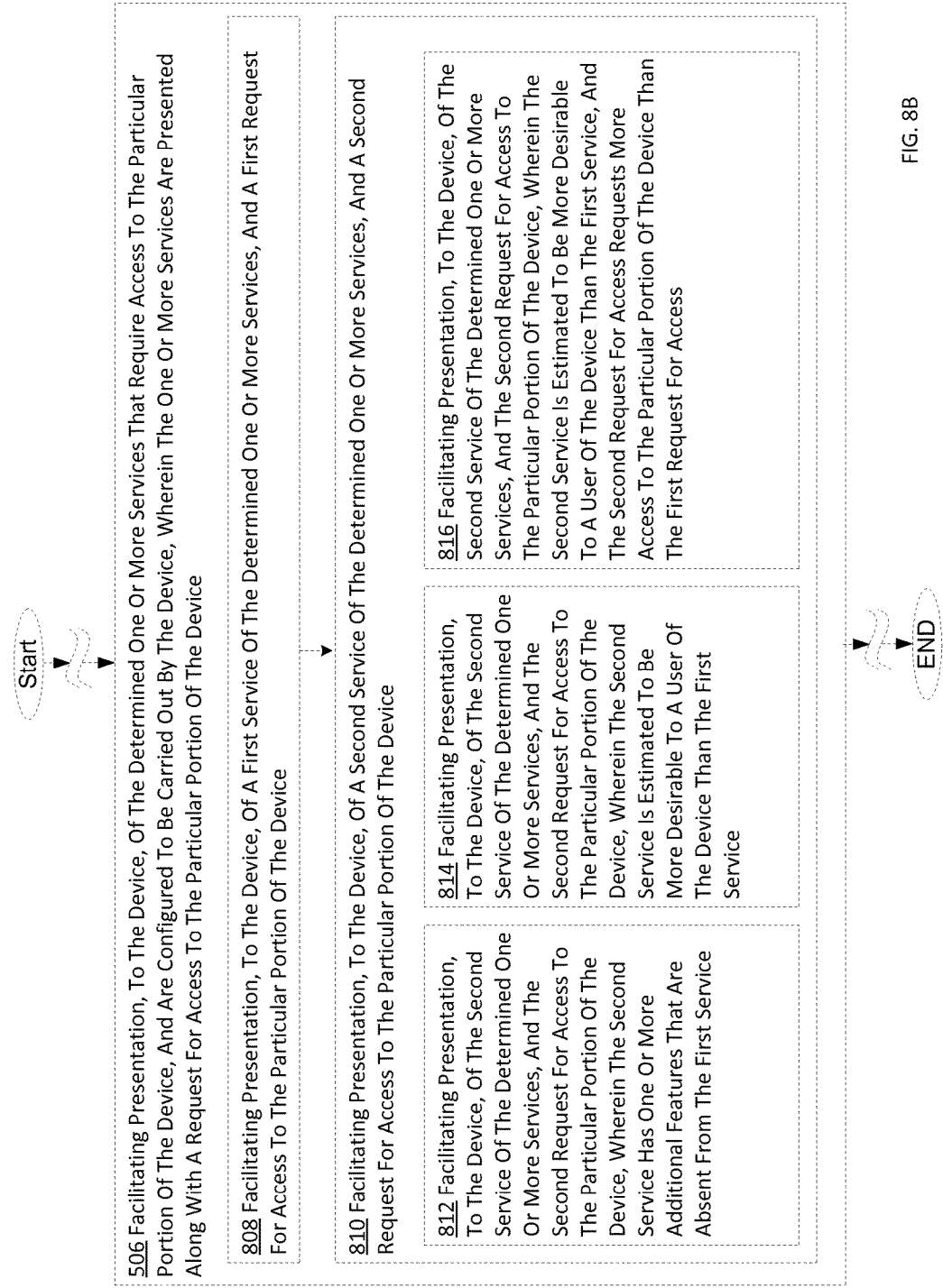

METHODS AND SYSTEMS FOR MONITORING AND/OR MANAGING DEVICE DATA

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

Priority Applications

For purposes of the USPTO extra-statutory requirements, the present application constitutes a continuation of U.S. patent application Ser. No. 13/732,305, entitled METHODS AND SYSTEMS FOR MONITORING AND/OR MANAGING DEVICE DATA, naming Edward K.Y. Jung, Royce A. Levien, Richard T. Lord, Robert W. Lord, and Mark A. Malamud as inventors, filed 31 Dec. 2012, which is currently co-pending or is an application of which a currently co-pending application is entitled to the benefit of the filing date.

For purposes of the USPTO extra-statutory requirements, the present application claims benefit of priority of U.S. Provisional Patent Application No. 61/720,245 titled METHODS AND SYSTEMS FOR DATA SERVICES, naming Edward K. Y. Jung, Royce A. Levien, Richard T. Lord, Robert W. Lord, and Mark A. Malamud as inventors, filed 30 Oct. 2012, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 61/720,874 titled METHODS AND SYSTEMS FOR DATA SERVICES, naming Edward K. Y. Jung, Royce A. Levien, Richard T. Lord, Robert W. Lord, and Mark A. Malamud as inventors, filed 31 Oct. 2012, which was filed within the twelve months preceding the filing date of the present application or is an application of which a currently co-pending application is entitled to the benefit of the filing date.

For purposes of the USPTO extra-statutory requirements, the present application constitutes a continuation-in-part of U.S. patent application Ser. No. 13/685,485, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,609, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,488, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,612, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,491, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/685,613, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/692,829, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 3 Dec. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/692,882, entitled METHODS AND SYSTEMS FOR MANAGING DEVICE DATA, naming Edward K. Y. Jung, Royce A. Levien, Richard T. Lord, Robert W. Lord, and Mark A. Malamud as inventors, filed 3 Dec. 2012, which is currently co-pending or is an application of which a currently co-pending application is entitled to the benefit of the filing date.

Related Applications

U.S. patent application Ser. No. 13/731,624, entitled METHODS AND SYSTEMS FOR MANAGING ONE OR MORE SERVICES AND/OR DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,947, entitled METHODS AND SYSTEMS FOR MANAGING ONE OR MORE SERVICES AND/OR DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,641, entitled METHODS AND SYSTEMS FOR MANAGING SERVICES AND DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application Ser. No. 13/731,960, entitled METHODS AND SYSTEMS FOR MANAGING SERVICES AND DEVICE DATA, naming Edward K. Y. Jung, Royce A. Levien, Richard T. Lord, Robert W. Lord, and Mark A. Malamud as inventors, filed 31 Dec. 2012, is related to the present application.

U.S. patent application No. 13/731,968, entitled METHODS AND SYSTEMS FOR MANAGING DATA AND/OR SERVICES FOR DEVICES, naming Edward K. Y. Jung, Royce A. Levien, Richard T. Lord, Robert W. Lord, and Mark A. Malamud as inventors, filed 31 Dec. 2012, is related to the present application.

U.S. patent application No. 13/732,127, entitled METHODS AND SYSTEMS FOR MANAGING DATA AND/OR SERVICES FOR DEVICES, naming Edward K. Y. Jung, Royce A. Levien, Richard T. Lord, Robert W. Lord, and Mark A. Malamud as inventors, filed 31 Dec. 2012, is related to the present application.

U.S. patent application No. 13/732,305, entitled METHODS AND SYSTEMS FOR MONITORING AND/OR MANAGING DEVICE DATA, naming Edward K. Y. Jung, Royce A. Levien, Richard T. Lord, Robert W. Lord, and Mark A. Malamud as inventors, filed 31 Dec. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to data services.

SUMMARY

In one or more various aspects, a method includes but is not limited to monitoring one or more properties of a device configured to carry out one or more services, determining one or more services that require access to a particular portion of the device, said determining at least partly based on the monitored one or more properties of the device, and facilitating presentation, to the device, of the determined one or more services that require access to the particular portion of the device, and are configured to be carried out by the device, wherein the one or more services are presented along with a request for access to the particular portion of the device. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for monitoring one or more properties of a device configured to carry out one or more services, means for determining one or more services that require access to a particular portion of the device, said determining at least partly based on the monitored one or more properties of the device, and means for facilitating presentation, to the device, of the determined one or more services that require access to the particular portion of the device, and are configured to be carried out by the device, wherein the one or more services are presented along with a request for access to the particular portion of the device. In addition to the foregoing, other system aspects are described in the claims, drawings, and text forming a part of the disclosure set forth herein.

In one or more various aspects, a system includes, but is not limited to, circuitry for monitoring one or more properties of a device configured to carry out one or more services, circuitry for determining one or more services that require access to a particular portion of the device, said determining at least partly based on the monitored one or more properties of the device, and circuitry for facilitating presentation, to the device, of the determined one or more services that require access to the particular portion of the device, and are configured to be carried out by the device, wherein the one or more services are presented along with a request for access to the particular portion of the device. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for monitoring one or more properties of a device configured to carry out one or more services, one or more instructions for determining one or more services that require access to a particular portion of the device, said determining at least partly based on the monitored one or more properties of the device, and one or more instructions for facilitating presentation, to the device, of the determined one or more services that require access to the particular portion of the device, and are configured to be carried out by the device, wherein the one or more services are presented along with a request for access to the particular portion of the device. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for monitoring one or more properties of a device configured to carry out one or more services, one or more interchained physical machines ordered for determining one or more services that require access to a particular portion of the device, said determining at least partly based on the monitored one or more properties of the device, and one or more interchained physical machines ordered for facilitating presentation, to the device, of the determined one or more services that require access to the particular portion of the device, and are configured to be carried out by the device, wherein the one or more services are presented along with a request for access to the particular portion of the device.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 2, including FIGS. 2A-2E, shows a particular perspective of a one or more attributes of a device configured to execute one or more services observing module 152 of processing module 150 of computing device 130 of FIG. 1B, according to an embodiment.

FIG. 3, including FIGS. 3A-3D, shows a particular perspective of a service that requires access to a particular portion of the device for execution determining at least partly based on the one or more observed attributes module 154 of processing module 150 of computing device 130 of FIG. 1B, according to an embodiment.

FIG. 4, including FIGS. 4A-4G, shows a particular perspective of a determined service that is configured to be carried out on the device at least in part by accessing the particular portion of the device and request for access to the device particular portion at least to facilitate carrying out the service device presentation facilitating module 156 of processing module 150 of computing device 130 of FIG. 1B, according to an embodiment.

FIG. 8B is a high-level logic flow chart of a process depicting alternate implementations of a facilitating presentation operation 506, according to one or more embodiments.

DETAILED DESCRIPTION

Figure 1A:
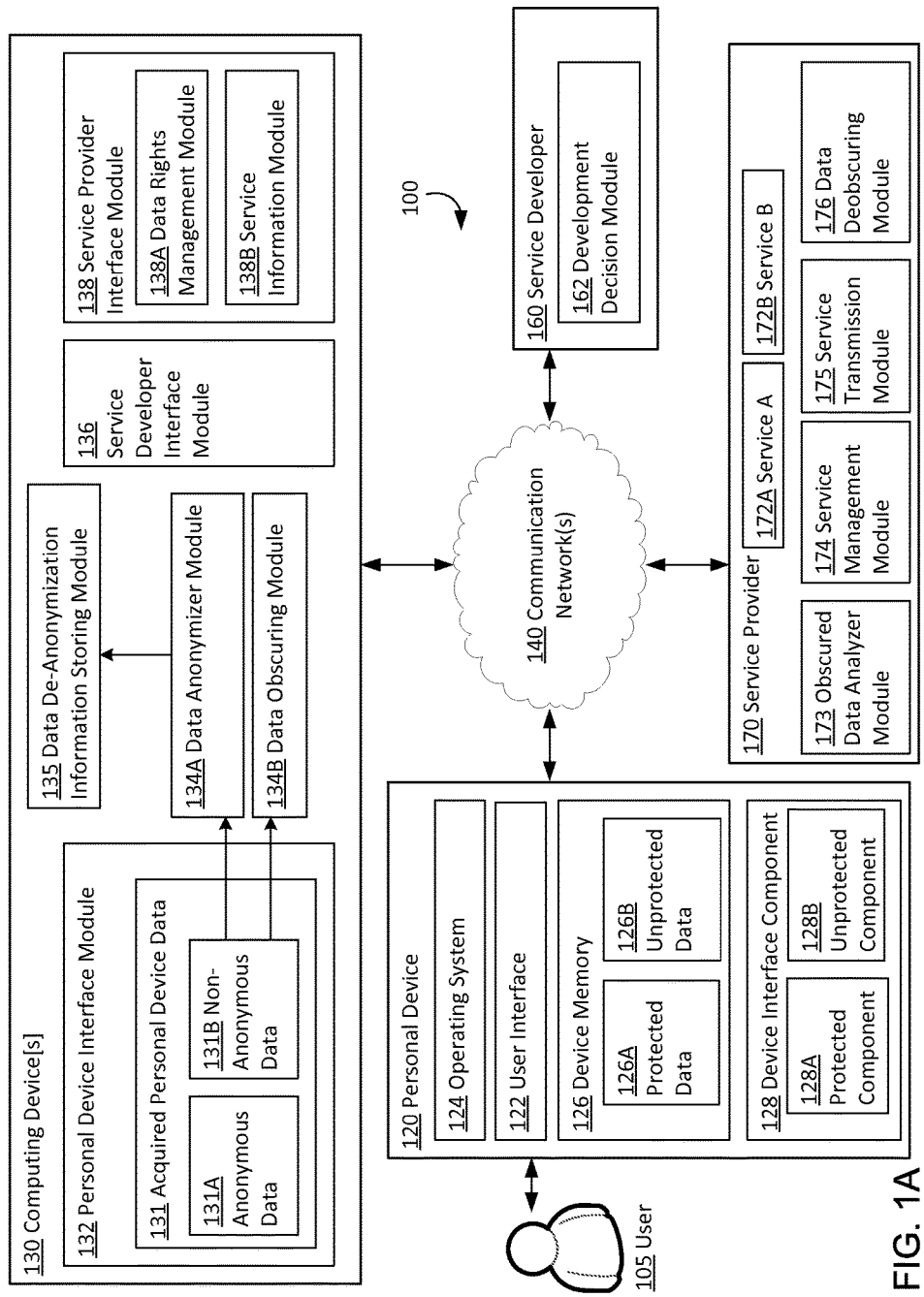
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for monitoring one or more properties of a device configured to carry out one or more services, determining one or more services that require access to a particular portion of the device, said determining at least partly based on the monitored one or more properties of the device, and facilitating presentation, to the device, of the determined one or more services that require access to the particular portion of the device, and are configured to be carried out by the device, wherein the one or more services are presented along with a request for access to the particular portion of the device.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/ wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

Referring now to FIG. 1, FIG. 1 illustrates an example environment 100 in which the methods, systems, circuitry, articles of manufacture, and computer program products and architecture, in accordance with various embodiments, may be implemented by one or more computing devices 130. As shown in FIG. 1A, one or more personal devices 120, one or more service providers 170, one or more service developers 160, and one or more computing devices 30 may communicate via one or more communication networks 140. In an embodiment, service provider 170 may have one or more services that personal device 120 may want. In an embodiment, computing device 130, which may be a remote or local server, or distributed set of servers, may manage data that is gathered, stored, controlled, accessed, restricted, monitored, under the control of, checked, examined, verified, authenticated, authorized, manipulated, updated, altered, filtered, or otherwise acted upon, whether passively or actively, by personal device 20. In an embodiment, as described in more detail herein, computing device 130 may have access to some or all of the data on personal device 120. In another embodiment, computing device 130 may have access to only a portion of the data on personal device 120. In still another embodiment, computing device 130 may have access to a modified version of the data on personal device 120. Specifically, in an embodiment, computing device 20 may have access to the data stored on personal device 120, but in anonymous form.

In an embodiment, computing device 130 may offer one or more services to personal device 120. In an embodiment, the offer of one or more services may be conditional on a grant of access to part or all of the data stored and/or collected by personal device 120. In an embodiment, computing device 30 may receive one or more services from service provider 170 and/or service developer 160, and may select one or more of the received services for presentation to the personal device 120. In an embodiment, the data from personal device 120 may be shared with one or more of service provider 170 and service developer 160. In an embodiment, the data from personal device 120 may be anonymized prior to sharing with service developer 160 and/or service developer 170.

Referring again to FIG. 1A, FIG. 1A shows a personal device 120. Personal device 120 may be any electronic device, portable or not, that may be operated by or associated with one or more users. Personal device 120 is shown as interacting with a user 105. As set forth above, user 105 may be a person, or a group of people, or another entity that mimics the operations of a user. In some embodiments, user 105 may be a computer or a computer-controlled device. Personal device 120 may be, but is not limited to, a cellular phone, a network phone, a smartphone, a tablet, a music player, a walkie-talkie, a radio, a USB drive, a portable solid state drive, a portable disc-type hard drive, an augmented reality device (e.g., augmented reality glasses and/or headphones), earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 1A, personal device 120 may include an operating system 124. In this context, operating system 124 refers to any hardware, software, firmware, and combination thereof which is considered at the core or baseline of a device. For example, applications that interact directly with hardware may be considered to be part of an operating system. In some embodiments, operating system 124 may be an FPGA, printed circuit board, or other wired device. In an embodiment, operating system 124 may include one or more of Google's Android, Apple's iOS, Microsoft's Windows, various implementations of Linux, and the like. In some embodiments, operating system 124 may include a root menu for one or more televisions, stereo systems, media players, and the like. In some embodiments, operating system 124 may be a "home" screen of a device.

Referring again to FIG. 1A, in an embodiment, personal device 20 may include a user interface 123. User interface 123 may include any hardware, software, firmware, and combination thereof that allow a user 105 to interact with a personal device 120, and for a personal device 120 to interact with a user 105. In some embodiments, user interface 123 may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, and the like.

Referring again to FIG. 1A, in some embodiments, personal device 120 may include a device memory 126. In some embodiments, device memory 126 may include memory, random access memory ("RAM"), read only memory ("ROM"), flash memory, hard drives, disk-based media, disc-based media, magnetic storage, optical storage, volatile memory, nonvolatile memory, and any combination thereof. In some embodiments, device memory 126 may be separated from the device, e.g., available on a different device on a network, or over the air. For example, in a networked system, there may be many personal devices 120 whose device memory 126 is located at a central server that may be a few feet away or located across an ocean.

Referring again to FIG. 1A, in some embodiments, device memory 126 may include one or more of protected data 126A and unprotected data 126B. Not all embodiments include each or both of these, but protected data 126A and unprotected data 126B may be present in one or more embodiments. Protected data 126A may include any data, including data stored on personal device 120, data for which personal device 120 maintains at least partial control of, data for which personal device 120 monitors or provides the ability to monitor, and the like, for which some form of authorization is required to access the data. The authorization may take any form and relate to any sub-unit, including both internally and externally to the device. For example, in an embodiment, protected data 126A may include data which is not available to at least one application running on a computing device. For another example, in an embodiment, protected data 126A may be available to one application at any time, and to another application at specific times, or at times when the first application is not using the data. In an embodiment, protected data 126A includes data for which an application must be authenticated (e.g., a Microsoft operating system certification, or a user flag set to true) in order to access the protected data 126A.

In an embodiment, protected data 126A includes data that a user, e.g., user 105, cannot view until the user 105 verifies their identity, e.g., through a password input or biometric identification. In an embodiment, protected data 126A is limited to the device, and is not transmitted to any other system not under the direct control of the personal device 120. In an embodiment, protected data 126A is limited to the personal device 120, and only applications originating at the personal device 120, or originating with the user 105, are allowed to read protected data 126A. In an embodiment, personal device 120 modifies or directs to be modified protected data 126A, so at least a portion of the protected data 126A is altered or obscured. In an embodiment, personal device 120 allows protected data 126A to be transmitted to an external entity under the condition that the external entity will alter or obscure at least a portion of the protected data 126A.

Referring again to FIG. 1A, in an embodiment, personal device 120 may include device memory 126, which, in some embodiments, may include unprotected data 26B. In an embodiment, unprotected data 126B may have no protections or limitations. In another embodiment, unprotected data 126B may have protections and limitations, but be less protected and/or less limited than protected data 126B. In an embodiment, unprotected data 126B is broadcasted or otherwise transmitted upon request. In an embodiment, unprotected data 126B cannot be accessed by an entity external to personal device 120 due to device design or other factors, but there is no specific protection on unprotected data 126B from access by one or more entities external to personal device 20.

Referring again to FIG. 1A, in an embodiment, personal device 120 may include device interface component 128. In an embodiment, device interface component 128 includes any component that allows the device to interact with its environment. For example, in an embodiment, device interface component 128 includes one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, and the like. In an embodiment, device interface component 128 also may include one or more user interface components, e.g., user interface 122 (e.g., although they are drawn separately, in some embodiments, user interface 122 is a type of device interface component 128), and in some embodiments including one or more user input receiving components and output presenting components.

Referring again to FIG. 1A, in an embodiment, device interface component 128 may include protected component 128A. Protected component 128A may include any device interface component 128, of which some non-limiting examples previously were enumerated, for which some form of authorization and/or authentication is required to access the data. The authorization may take any form and relate to any sub-unit, including both internally and externally to the device. In an embodiment, protected component 128A is similar to protected data 126A. For example, in an embodiment, a personal device 120, e.g., a smart phone, may have twelve applications running on the smartphone. In an embodiment, six of those applications may have access to a protected component 128A, e.g., a positioning sensor, and the other six may not. In some embodiments, data collected by a protected component 128A is part of the protected component 128A. In some embodiments, data collected by a protected component 128A becomes protected data 126A. In some embodiments, data collected by a protected component 128A becomes protected data 126A some of the time, or none of the time. In some embodiments, data collected by a protected component 128A may be part of protected component 128A for a particular amount of time, e.g., two weeks, and then may transition to unprotected data or data that is not considered protected or unprotected. In some embodiments, a protected component 128A may be accessible to everyone at particular times and/or circumstances. For example, a protected component 128A, e.g., a wireless radio, may be accessible to any entity between the hours of 7 and 8 pm, and only accessible to specific entities and/or applications at other times. In some embodiments, a protected component 128A, e.g., an image capturing component, may be accessible to any entity when one or more conditions are met, which conditions may or may not be related to the protected component 128A or the personal device 120, e.g., when the personal device 120 is at a particular location.

Referring again to FIG. 1A, in some embodiments, computing device 30 may include personal device interface module 132. In some embodiments, personal device interface module 132 may communicate with one or more personal devices 120. In some embodiments, personal device interface module 132 may receive data 131 received from a personal device 120. Acquired personal device data 131 may include any data gathered from personal device 120, in any manner. In some embodiments, computing device 30 may request data from personal device 120. In some embodiments, computing device 30 may receive data from personal device 120 on a schedule. In some embodiments, computing device 130 may retrieve data from personal device 120 when certain conditions are met. In some embodiments, personal device 120 is broadcasting data, and computing device 130 gathers the broadcasted data. In some embodiments, personal device 120 broadcasts data that only computing device 130 can use (e.g., decrypt, interpret, or the like). In some embodiments, personal device 120 may transmit acquired personal device data 131 to computing device 30 using one or more communication networks 140, which will be described in more detail herein.

Referring again to FIG. 1A, in some embodiments, the acquired personal device data 131 may be anonymous data 131A. In an embodiment, anonymous data refers to data from which the origin of the data cannot be uniquely identified. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification. It is noted that, in some embodiments, the device may be able to recognize the origin of the data, e.g., an identity of personal device 120, that is transmitting the data due to the nature of the data transmission, but be unable to deduce the origin of the data through the data itself, in which case, in some embodiments, this data is still considered anonymous data 131A.

Anonymous data 131A may include data for which uniquely identifying information has been removed, or data for which uniquely identifying information has been concealed, obscured, made uncertain, made ambiguous, screened, camouflaged, masked, veiled, shrouded, hidden, encoded, encrypted, or otherwise altered. In some embodiments, the received anonymous data 131A never included uniquely identifying information. In some embodiments, anonymous data 131A may partially or non-uniquely identify its origin, e.g., the user 105 or the personal device 120 from which the anonymous data came. In some embodiments, uniquely identifying information may be extracted from anonymous data 131A using additional information, e.g., a lookup table, hash, or other known algorithm. In some embodiments, uniquely identifying information may be deduced from anonymous data 131A without additional information. In some embodiments, uniquely identifying information may not be retrieved from anonymous data 131A once the data is in its anonymous format.

In an embodiment, acquired personal device data 131 may include non-anonymous data 131B. In some embodiments, non-anonymous data 131B may identify, either explicitly or implicitly, the origin of the data. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification.

Referring to FIGS. 1A-1D, data anonymization systems and methods are illustrated. Although these systems and methods are illustrated as part of computing device 130, this is merely for convenience of drawing. In an embodiment, one or more of data de-anonymization information storing module 135, data anonymizer module 134A, and data obscuring module 134B may be located within personal device 120. In an embodiment, these modules may interact directly with device memory 126. In an embodiment, as pictured in FIG. 1A, computing device 130 may include a data anonymizer module 134A that converts non-anonymous data 131B into anonymized data, in a process described in more detail with respect to FIGS. 1C and 1D. In an embodiment, depending on the type of anonymization, there may be additional data that can be used to return the anonymized data into non-anonymous data, e.g., a lookup table. In some such embodiments, the additional data, e.g., de-anonymization data, may be stored in data de-anonymization information storing module 135.

Referring again to FIGS. 1A-1D, in an embodiment, computing device 130 may include a data obscuring module 134B. For example, in an embodiment, data obscuring module 134B may obscure the non-anonymous data 131B, similarly to the data anonymizer module 134A. For example, in an embodiment, data obscuring module 134B may apply data masking. In an embodiment, data obscuring module 134B may obscure by addition, e.g., by adding false identification information to the true identification information, so that the false identification information may not be distinguished from the true identification information. Data de-anonymization information storing module 135, data anonymizer module 134A, and data obscuring module 134B may be absent in some embodiments.

Referring again to FIG. 1A, in an embodiment, computing device 130 may include service developer interface module 136. Service developer interface module 136 may communicate with service developer 160, e.g., via communication network 140. Specifically, in an embodiment, service developer interface module 136 may provide limited information regarding the acquired personal device data 131. In an embodiment, for example, service developer interface module 136 may provide information to service developer 160 regarding the type of data collected. In an embodiment, for example, service developer interface module 136 may provide information to service developer 160 regarding an aggregate synopsis of the data collected. In an embodiment, service developer 160 may receive such information and make a decision about what types of services to develop, e.g., using development decision module 162.

Referring again to FIG. 1A, in an embodiment, computing device 130 may include service provider interface module 138. In an embodiment, service provider interface module 138 may communicate with service provider 170, e.g., via communication network 140.

In an embodiment, service provider interface module 138 may include data rights management module 138A. In an embodiment, data rights management module 138A may keep track of which services have rights to which personal device data. For example, in an embodiment, service 172A may have rights to certain anonymous data 131A. For another example, in an embodiment, service 172B may have rights to data that has been processed through the data anonymizer 134A.

Referring again to FIG. 1A, in an embodiment, service provider interface module 138 may include service information module 138B. Service information module 138B may include a list of services that are provided from service provider 170, so that such information may be delivered to personal device 120, in an embodiment. In an embodiment, computing device 130 may present one or more of the services listed in service information module 138B to personal device 120, either upon request, or upon detecting that personal device 120 may be interested in one or more of the services.

Referring again to FIG. 1A, in an embodiment, service provider 170 may provide services to a personal device 120. In an embodiment, these services may be delivered to directly to personal device 120. In an embodiment, service provider 170 has limited or no communication with personal device 120, and communication is handled through an intermediary, e.g., computing device 130. In an embodiment, computing device 130 handles the delivery of services and data between service provider 170 and personal device 120 such that protected data 126A and protected component 128A are protected from service provider 170, but that service provider 170 can still provide services, e.g., service 172A and service 172B, to personal device 120. In an embodiment, service provider 170 includes a list of services management module 174 that maintains a list of services to present to computing device 130, e.g., to allow service information module 138B of computing device 130 to maintain information about various services.

In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" as used herein and in the drawings refers to one or more communication networks, which may or may not interact with each other and which, in some embodiments, may work in concert, wittingly or unwittingly, to facilitate communication between one or more entities.

Figure 1B:
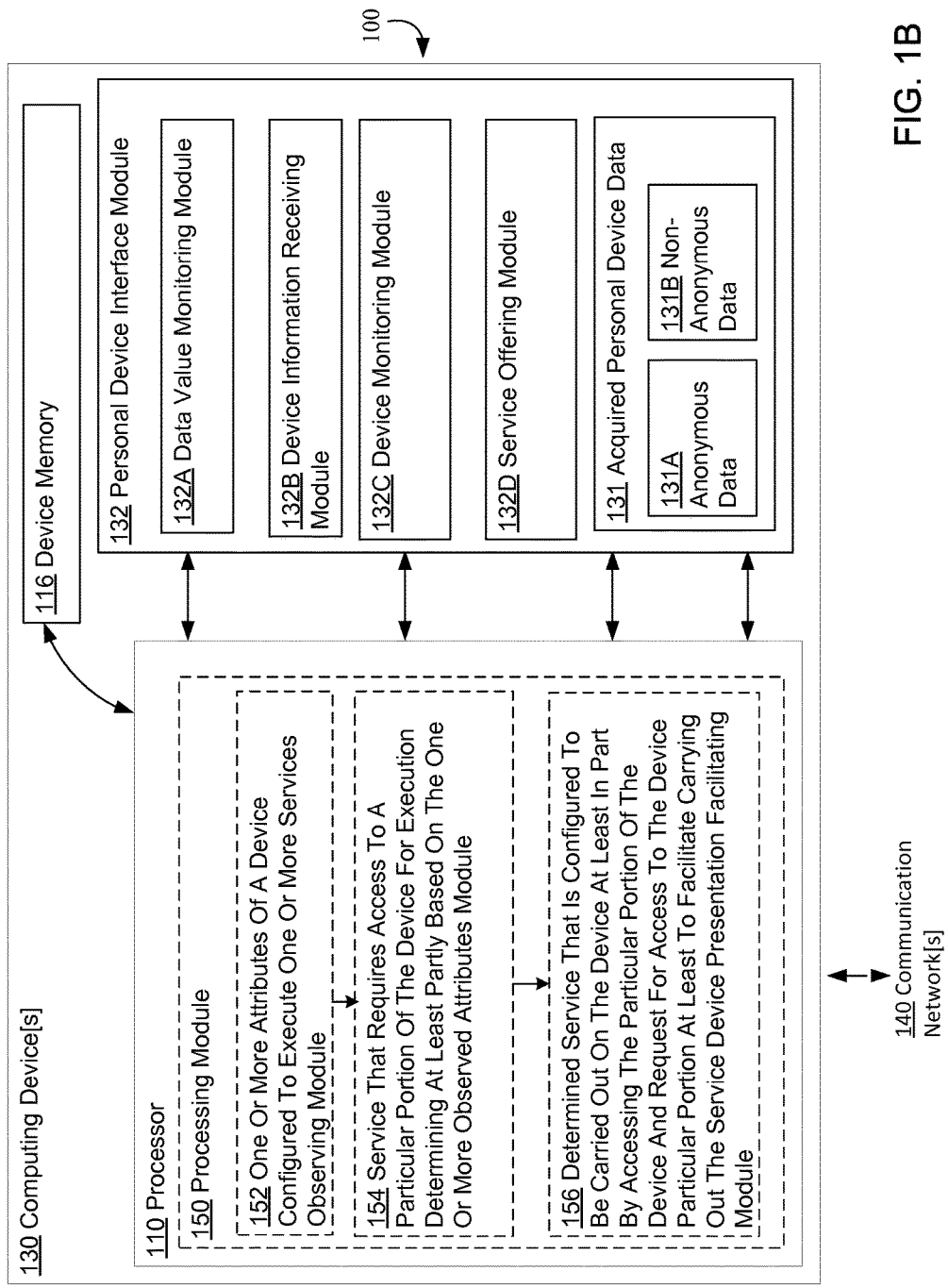
FIG. 1B shows a high-level block diagram of a personal device 120 operating in an exemplary environment 100, according to an embodiment.
Figure 1C:
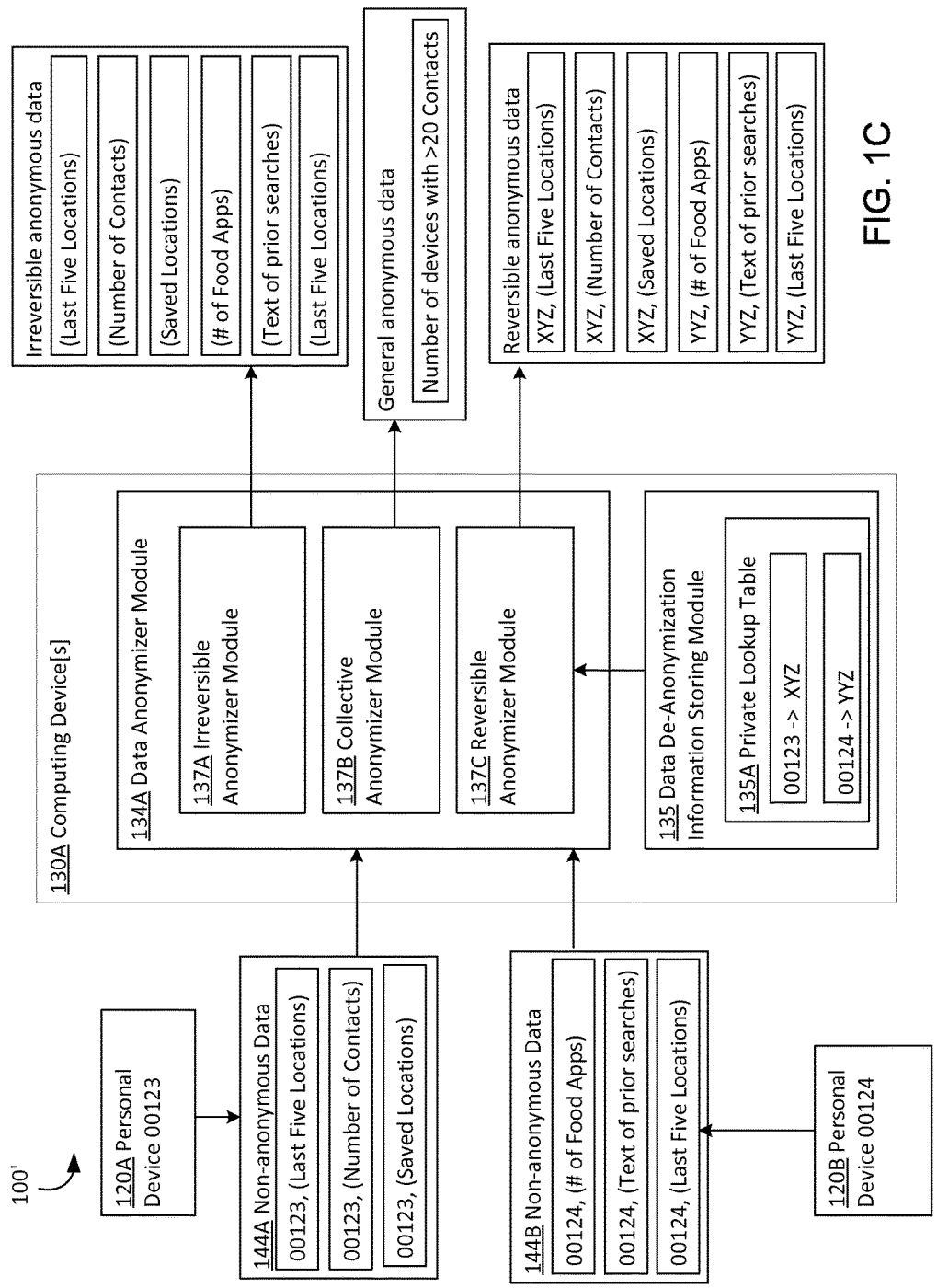
FIG. 1C shows a high level block diagram of a computing device 130A operating in an exemplary embodiment 100', according to an embodiment.

Referring now to FIG. 1C, an embodiment may include a personal device 120A and a personal device 120B. Personal device 120A may generate non-anonymous data 144A, and personal device 120B may generate non-anonymous data 144B. Non anonymous data 144A and non-anonymous data 144B may be transmitted to computing device 130A, which may be a non-exclusive and non-limiting example of computing device 130. In an embodiment, computing device 130A may include a data anonymizer module 134A. In an embodiment, data anonymizer module 134A may include irreversible anonymizer module 137A, which generates anonymous data that is irreversible, e.g., in an example, the identifying data has been removed. In an embodiment, data anonymizer module 134A may include collective anonymizer module 137B, which may take the non-anonymous data 144A and the non-anonymous data 144B and create an aggregated, general anonymous data, as shown FIG. 1C. In an embodiment, data anonymizer module 134A may include reversible anonymizer module 137C, which may use a private lookup table 135A to convert the non-anonymous data into anonymous data. In an embodiment, that private lookup table 135A may be stored in the data-deanonymization information storing module 135.

Figure 1D:
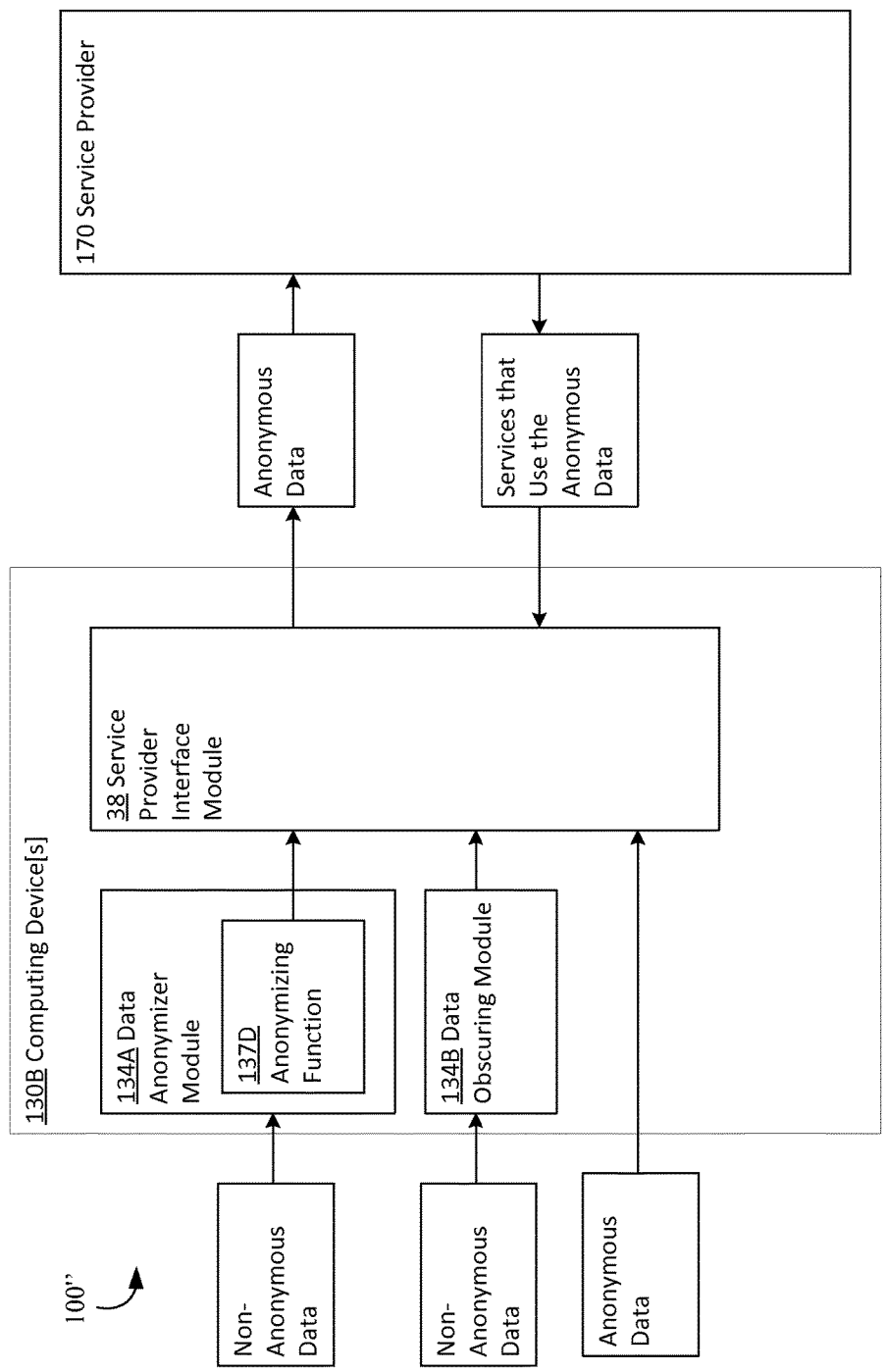
FIG. 1D shows a high-level block diagram of a computing device 130B operating in an exemplary embodiment 100", according to an embodiment.

Referring now to FIG. 1D, in an embodiment, a computing device 130B may have a data anonymizer 134A that may apply an anonymizing function 132A, as shown in FIG. 1D. For example, an anonymizing function may use a cryptographic method, a perturbation method, a DataFly algorithm, top-down specialization, and/or Mondarian multidimensional k-anonymity, as non-limiting and non-exclusive examples. In another embodiment, a data obscuring module 134B obscures the non-anonymous data. In an embodiment, the obscuring may be accomplished by adding similar-looking and plausible "false" data to the actual identifying data, so that later, the true data cannot be determined merely by looking at the data. In an embodiment, the anonymized data may be used by the service provider interface module 38 to give data to the service provider 170, either to carry out a portion of a service, or to determine which services may be useful to one or more personal devices 120.

The examples shown in FIGS. 1C and 1D are merely examples of how a data anonymizer might be implemented, and are not intended to be limiting or exclusive. There are many other techniques for anonymizing the data, some of which will be mentioned herein.

Figure 1E:
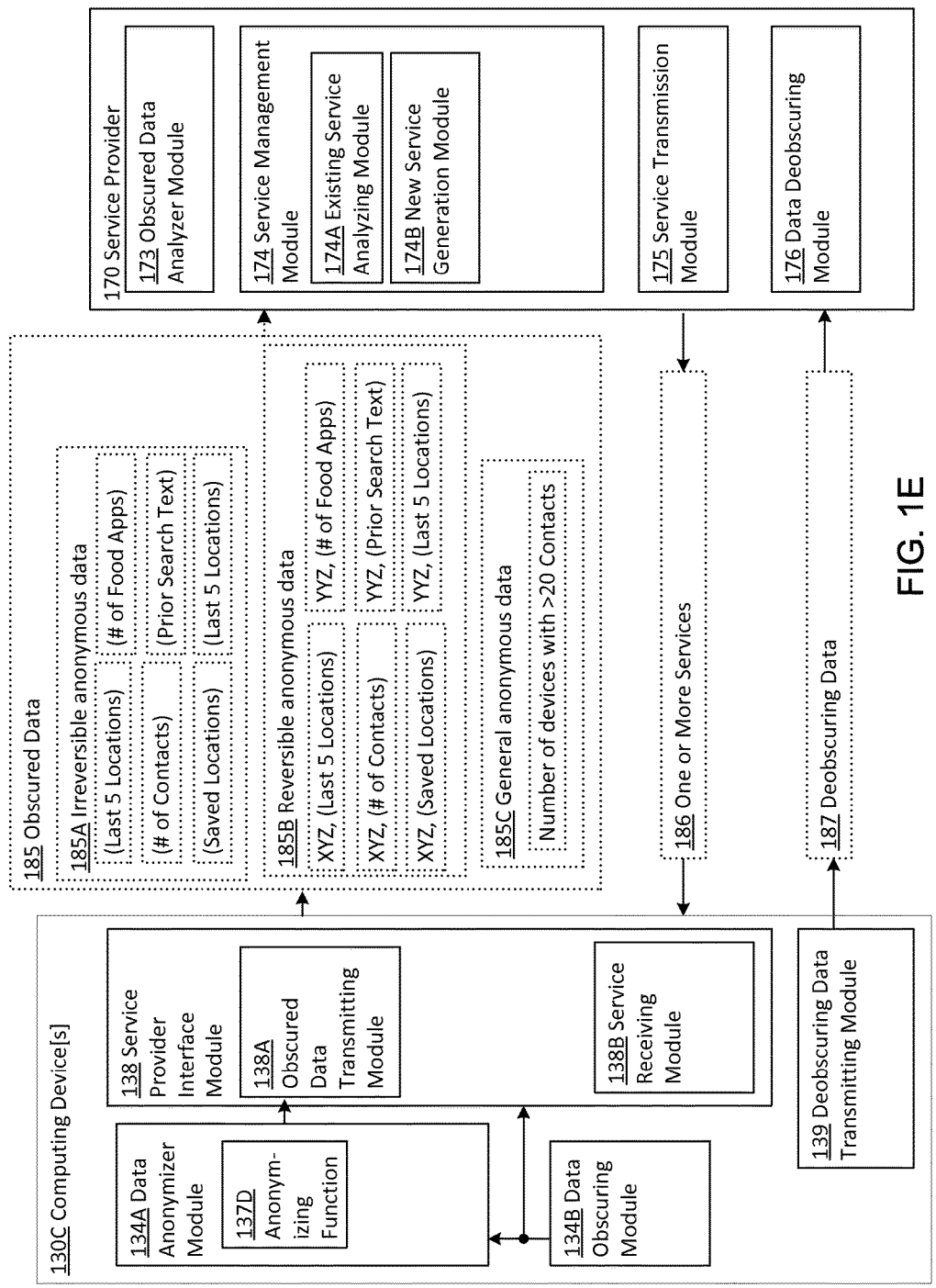
FIG. 1E shows a high-level block diagram of a computing device 130C operating in an exemplary embodiment 100''', according to an embodiment.

Referring now to FIG. 1E, FIG. 1E shows an embodiment of the invention focusing on a service provider 170 and a computing device 130C. Computing device 130C may receive data from one or more devices, and that data may be anonymized already, or may not be anonymized, or may already be obscured. In an embodiment, computing device 130C may generate obscured data from the data received from one or more devices, whether received directly from the one or more devices, or indirectly from another source. In an embodiment, Computing device 130C may obscure received data, even if the received data is already anonymized. In another embodiment, computing device 130C may not perform additional steps on previously anonymized or obscured data.

Referring again to FIG. 1E, in an embodiment, computing device 130C may request one or more services 190 that may be executed on one or more devices. The one or more services may be performed independently by the one or more devices, or may be performed with facilitation of one or more portions of the services by computing device 130C. Computing device 130C may request that service provider 170 provide one or more services that can be presented to the one or more devices. In an embodiment, computing device 130C may transmit obscured data 185 to service provider 170. This transmission may take place via any form of network, e.g., communication network 140 (not pictured in FIG. 1E). In an embodiment, service provider 170 may be integral with computing device 130C. In an embodiment, service provider 170 and computing device 130C may be under the control of a single entity.

Referring again to FIG. 1E, in an embodiment, service provider 170 may receive the obscured data 185. The obscured data 185 may be in any format, as described in several examples herein. The examples illustrated in FIG. 1E and in the following figures are intended for ease of understanding only, and should not be considered an exhaustive or an exclusive enumeration of ways that data may be obscured. For example, in an embodiment, irreversible anonymous data 185A may be obscured by deleting the device origin information from the data, such that the data cannot be recovered using the irreversible anonymous data 185A. In order to obtain the original device information that formed the irreversible anonymous data 185A, a copy of the original data may be retrieved. For example, in an embodiment, computing device 130C may store a separate copy of the data that resulted in the irreversible anonymous data 185A, with uniquely identifying device information present in the copy kept by computing device 130C.

In an embodiment, obscured data 185 may include reversible anonymous data 185B. Data 185B is not limited to a particular type of format, but a simple example is shown. In the example, the device identifiers of the one or more personal devices 120A and 120B, e.g., 00123 and 00124, are converted to new identifiers XYZ and YYZ (e.g., as shown in FIG. 1C), which, in an embodiment, may prevent service provider 170 from learning the identity of devices 00123 and 00124. In an embodiment, reversible anonymous data 185B may be converted into data that uniquely identifies one or more devices, through the providing of one or more algorithms, lookup tables, keys, encryption keys, hash functions, and the like.

In an embodiment, obscured data 185 may include general anonymous data 185C. In an embodiment, this type of data may include any format of aggregated data which gives information about one or more devices, but does not particularly identify the one or more devices that led to the aggregate information. For example, general anonymous data 185C may include such data as "thirty-five devices with more than twenty contacts in a contact list found," or more specific data, such as "thirty-five smartphones, e.g., Apple iPhone 4S running iOS 6.0, with more than 2.0 gigabytes of space remaining, with more than twenty contacts in a contact list found."

Referring again to FIG. 1E, in an embodiment, service provider 170 may receive obscured data 185, as shown in FIG. 1E. In an embodiment, service provider 170 may include an obscured data analyzer module 173. Obscured data analyzer module 173 may receive the obscured data 185 and use the obscured data 185 to determine one or more services or types of services that may be useful to the devices referenced in the obscured data 185. Obscured data analyzer module 173 may be completely automated, or may have some human intervention in the process. In an embodiment, obscured data analyzer 173 may obtain obscured data 185 from several different computing devices 130C, which may allow service provider 170 to provide one or more services more efficiently. In an embodiment, service provider 170 may include service management module 174. Service management module 174 may include existing service analyzing module 174A and new service generation module 174B. Existing service analyzing module 174A and new service generation module 174B may work together or separately, and with or without obscured data analyzer module 173, to determine if a service exists that meets the needs determined based on the received obscured data. If such a service does not exist, then new service generation module 174B may generate a new service, either by requesting from a third party, requesting human intervention, e.g., human programming of a new service, or may generate a new service automatically.

In an embodiment, service provider 170 may include a service transmission module 175, which may transmit one or more services 186 back to the computing device 130C, e.g., to service receiving module 138B, which, in an embodiment, may be a portion of service provider interface module 138. In various embodiments, once one or more actions are taken with respect to receiving the one or more services 186, deobscuring data 187, which may be data that can deobscure the obscured data 185, may be transmitted to the service provider 170, e.g., to data deobscuring module 176 of service provider 170. In an embodiment, deobscuring data 187 is combined with obscured data 185 to result in deobscured data. In another embodiment, deobscuring data 187 does not need to be combined with obscured data 185 in order to result in the deobscured data. In an embodiment, deobscuring data 187 may be transmitted upon receipt of one or more services 186. In another embodiment, one or more actions related to one or more services 186, e.g., proposing the one or more services to one or more devices, may be carried out prior to transmitting the deobscuring data 187. In an embodiment, if a particular number of users do not use one or more services 186, then computing device 130C may not transfer deobscuring data 187.

Figure 1F:
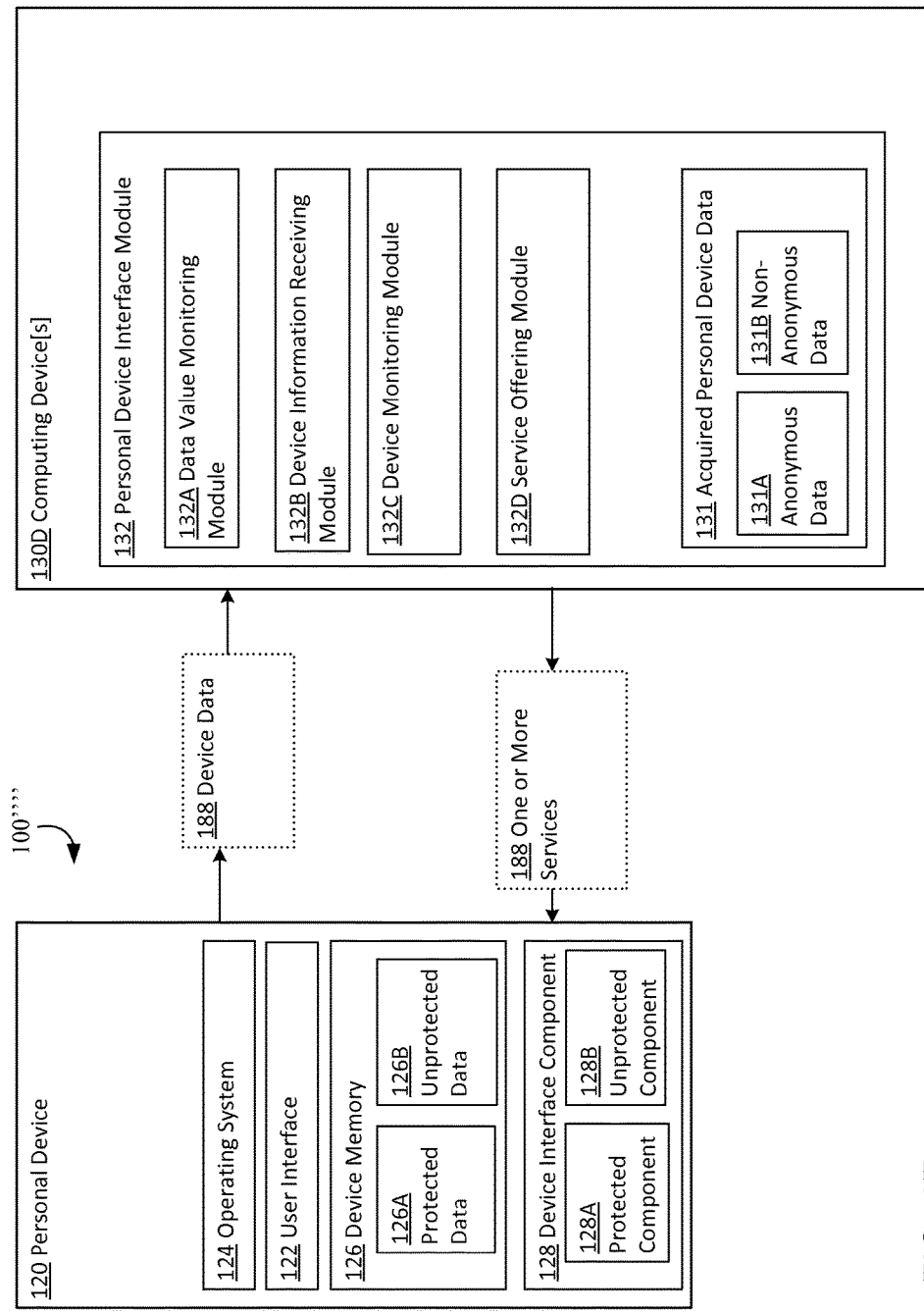
FIG. 1F shows a high-level block diagram of a computing device 130D operating in an exemplary embodiment 100'''', according to an embodiment.

Referring now to FIG. 1F, FIG. 1F shows an embodiment of the invention as shown in exemplary embodiment 100''''. For example, FIG. 1F shows computing device 130D interacting with personal device 120. In an embodiment, computing device 130D receives device data 188 from personal device 120. Although FIG. 1F shows this transfer as coming directly from personal device 120, in an embodiment, computing device 130D may receive device data 188 from any source, including a third device, a communication network, a social networking site, a device manufacturer, and the like. In an embodiment, computing device 130D monitors one or more personal devices 120 for device data 188. In an embodiment, computing device 130D monitors one or more other sources for device data 188 regarding personal devices 120.

In an embodiment, device data 188 may include data that personal device 120 has collected. In an embodiment, the device data 188 may be modified to obscure an identity of the device 120 or a user of the device 120. In an embodiment, the device data 188 is not obscured. In an embodiment, device data 188 may be about data that is stored on device 120 or otherwise under the control of personal device 120, rather than being the actual data under the control of personal device 120. For example, as shown in FIG. 1F, personal device 120 may include protected data 126A, which, in an embodiment, may include the last thirty locations visited by personal device 120. In an embodiment, device data 188 may include the last thirty locations visited by personal device 120. In another embodiment, device data 188 may include an indication that personal device 120 has thirty device locations stored in its memory. In an embodiment, device data 188 may include an indication that personal device 120 has thirty device locations stored in its memory, and 20 of those locations are locations for which an interest has been expressed by an entity in communication with computing device 130D.

Referring again to FIG. 1F, in an embodiment, computing device 130D may include personal device interface module 132. Personal device interface module 132 may include data value monitoring module 132A. In an embodiment, data value monitoring module 132A may receive information regarding which types of data are valuable (e.g., location data, or location data indicating that a device is inside Times Square on New Years' Eve, and the like), and may monitor one or more devices and other locations for one or more indications that a personal device 120 has data estimated to be valuable, and whether that data is protected. In an embodiment, personal device interface module may include device information receiving module 132B configured to receive device data 188. Device data 188 may have any number of formats, as described above, and as shown by way of non-limiting example in the examples given further herein.

Referring again to FIG. 1F, in an embodiment, computing device 130D may include device monitoring module 132C. In an embodiment, device monitoring module 132C may monitor one or more personal devices 120 through any monitoring technique. In an embodiment, device monitoring module 132C may include software, hardware, or firmware associated with personal device 120, that may be configured to report back to device monitoring module 132C at particular intervals. In an embodiment, device monitoring module 132C may monitor personal device 120 through one or more communication networks 140 (not pictured), and may communicate directly with personal device 120. In an embodiment, device monitoring module 132C may monitor personal device 120 through indirect means, e.g., through other devices or systems that may be used by personal device 120.

Referring again to FIG. 1F, in an embodiment, personal device interface module 132 may include service offering module 132D. For example, as described previously, computing device 130D may acquire one or more services. These services may be presented to personal device 120, either for presentation to a user, or for an automated decision regarding whether to accept the services. In an embodiment, the one or more services 188 may require access to protected data, e.g., protected data 126A of the personal device 120, or one or more protected components, e.g., protected component 128A of personal device 120, or both. In an embodiment, computing device 130D may facilitate the presentation of the one or more services to a user 105 of the personal device 120, via the personal device 120.

Referring again to FIG. 1B, FIG. 1B shows a more detailed description of computing device 130. In an embodiment, computing device 130 may include a processor 110. Processor 110 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 110 may be a server. In some embodiments, processor 110 may be a distributed-core processor. Although processor 110 is as a single processor that is part of a single computing device 130, processor 110 may be multiple processors distributed over one or many computing devices 130, which may or may not be configured to operate together. Processor 110 is illustrated as being configured to execute computer readable instructions in order to execute one or more operations described above, and as illustrated in FIGS. 5, 6A-6D, 7A-7D, and 8A-8G. In some embodiments, processor 122 is designed to be configured to operate as processing module 150, which may include one or more of one or more attributes of a device configured to execute one or more services observing module 152, service that requires access to a particular portion of the device for execution determining at least partly based on the one or more observed attributes module 154, and determined service that is configured to be carried out on the device at least in part by accessing the particular portion of the device and request for access to the device particular portion at least to facilitate carrying out the service device presentation facilitating module 156.

In an embodiment, computing device 130 may include a device memory 116. In some embodiments, memory 116 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 116 may be located at a single network site. In some embodiments, memory 116 may be located at multiple network sites, including sites that are distant from each other.

Figures 2, 2A:
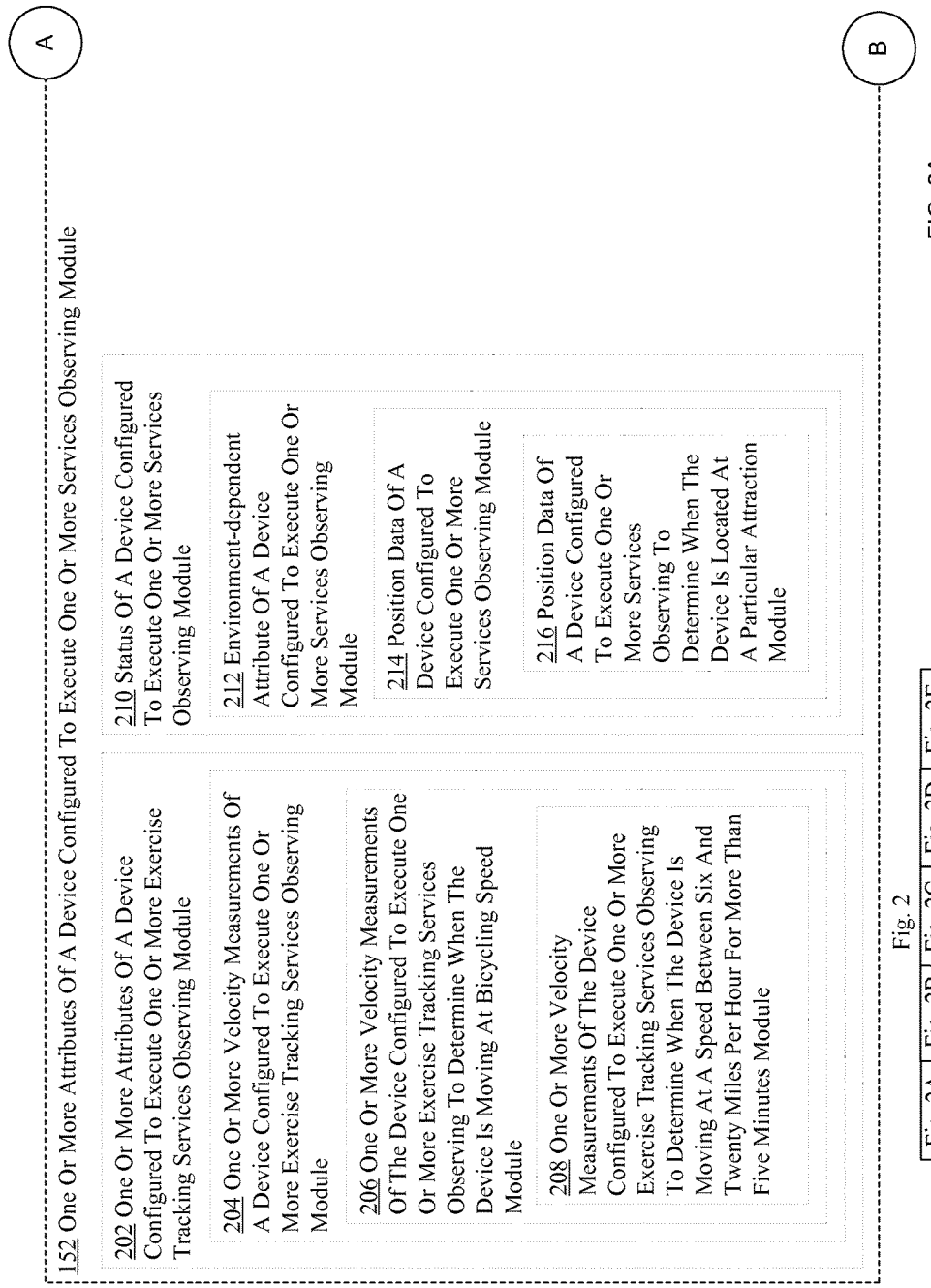

Referring now to FIG. 2, FIG. 2 illustrates an exemplary implementation of the one or more attributes of a device configured to execute one or more services observing module 152. As illustrated in FIG. 2, the one or more attributes of a device configured to execute one or more services observing module may include one or more sub-logic modules in various alternative implementations and embodiments. For example, as shown in FIG. 2, e.g., FIG. 2A, in some embodiments, module 152 may include one or more of one or more attributes of a device configured to execute one or more exercise tracking services observing module 202 and status of a device configured to execute one or more services observing module 210. In some embodiments, module 202 may include one or more velocity measurements of a device configured to execute one or more exercise tracking services observing module 204. In some embodiments, module 204 may include one or more velocity measurements of the device configured to execute one or more exercise tracking services observing to determine when the device is moving at bicycling speed module 206. In some embodiments, module 206 may include one or more velocity measurements of the device configured to execute one or more exercise tracking services observing to determine when the device is moving at a speed between six and twenty miles per hour for more than five minutes module 208. In some embodiments, module 210 may include environment-dependent attribute of a device configured to execute one or more services observing module 212. In some embodiments, module 212 may include position data of a device configured to execute one or more services observing module 214. In some embodiments, module 214 may include position data of a device configured to execute one or more services observing to determine when the device is located at a particular attraction module 216.

Figure 2B:
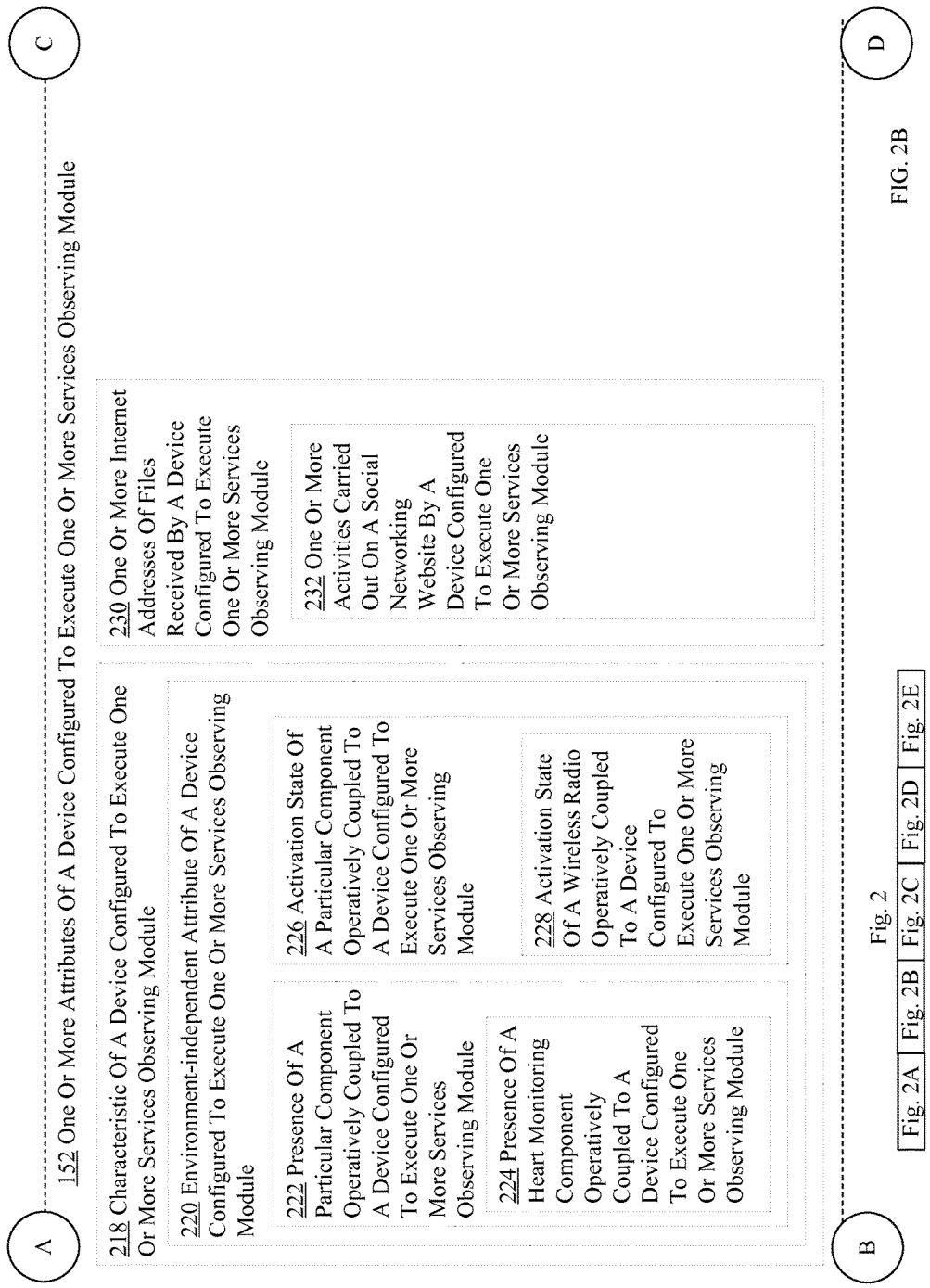

Referring again to FIG. 2, e.g., FIG. 2B, in some embodiments, module 152 may include one or more of characteristic of a device configured to execute one or more services observing module 218 and one or more internet addresses of files received by a device configured to execute one or more services observing module 230. In some embodiments, module 218 may include environment-independent attribute of a device configured to execute one or more services observing module 220. In some embodiments, module 220 may include one or more of presence of a particular component operatively coupled to a device configured to execute one or more services observing module 222 and activation state of a particular component operatively coupled to a device configured to execute one or more services observing module 226. In some embodiments, module 222 may include presence of a heart monitoring component operatively coupled to a device configured to execute one or more services observing module 224. In some embodiments, module 226 may include activation state of a wireless radio operatively coupled to a device configured to execute one or more services observing module 228. In some embodiments, module 230 may include one or more activities carried out on a social networking website by a device configured to execute one or more services observing module 232.

Figure 2C:
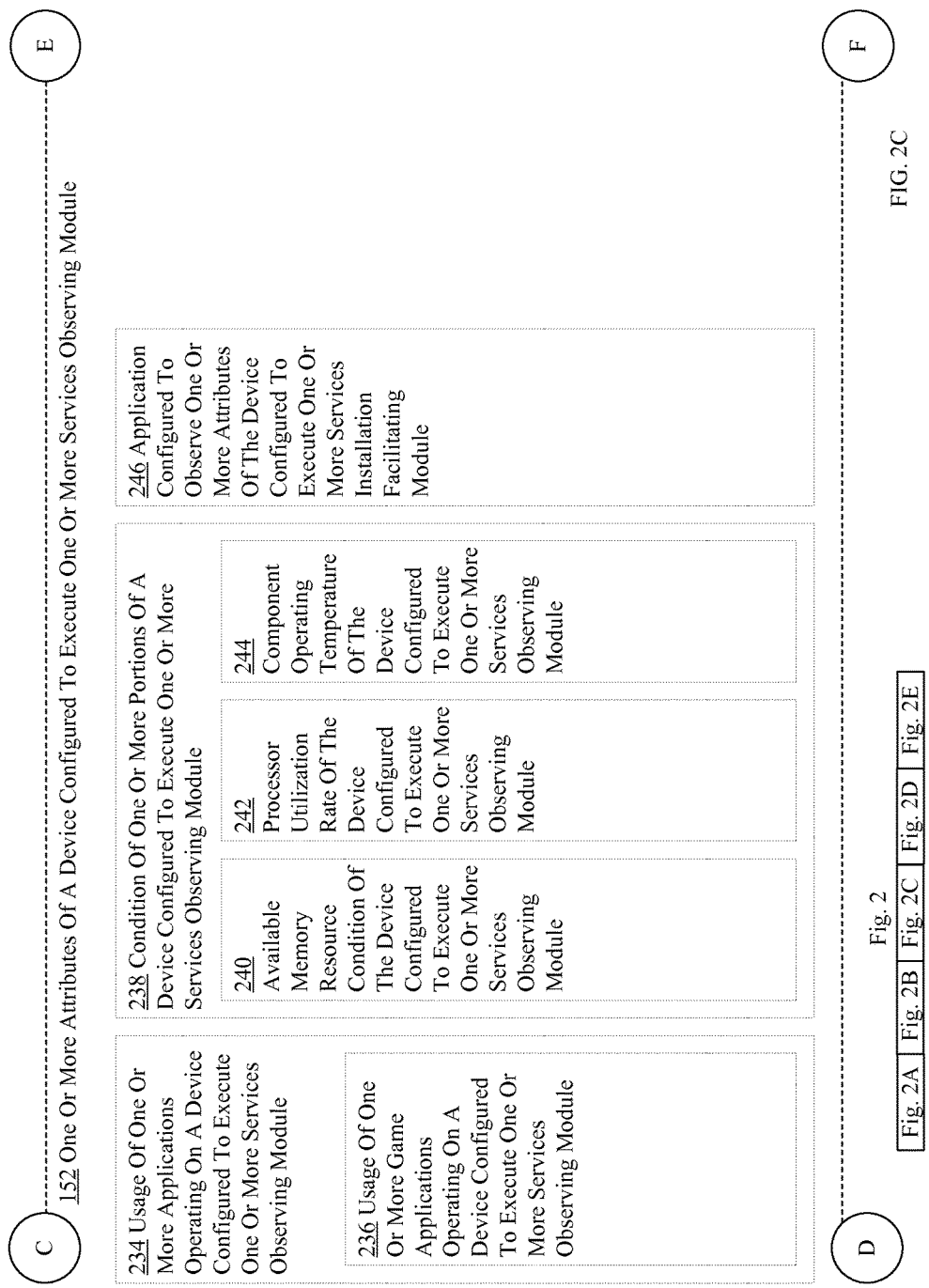

Referring again to FIG. 2, e.g., FIG. 2C, as described above, in some embodiments, module 152 may include one or more of usage of one or more applications operating on a device configured to execute one or more services observing module 234, condition of one or more portions of a device configured to execute one or more services observing module 238, and application configured to observe one or more attributes of the device configured to execute one or more services installation facilitating module 246. In some embodiments, module 234 may include usage of one or more game applications operating on a device configured to execute one or more services observing module 236. In some embodiments, module 238 may include one or more of available memory resource condition of the device configured to execute one or more services observing module 240, processor utilization rate of the device configured to execute one or more services observing module 242, and component operating temperature of the device configured to execute one or more services observing module 244.

Referring again to FIG. 2, e.g., FIG. 2D, in some embodiments, module 152 may include one or more of permission to observe one or more attributes of a device configured to execute one or more services acquiring module 248 and one or more attributes of the device configured to execute one or more services observing upon acquisition of permission module 250. In some embodiments, module 248 may include one or more of permission to observe one or more attributes of a device configured to execute one or more services acquiring as part of a device service agreement module 252 and permission to observe one or more attributes of a device configured to execute one or more services acquiring in response to facilitating one or more offers for one or more services to the device module 254. In some embodiments, module 254 may include one or more of permission to observe one or more attributes of a device configured to execute one or more services acquiring in response to facilitating one or more offers for one or more services to the device at one or more intervals module 256 and permission to observe one or more attributes of a device configured to execute one or more services acquiring in response to facilitating one or more context-dependent offers for one or more services to the device at one or more particular times at least partly based on the observed one or more attributes module 258. In some embodiments, module 258 may include permission to observe one or more attributes of a device configured to execute one or more services acquiring in response to facilitating one or more offers for one or more services calculated, at least partly using on the observed one or more attributes, to likely be accepted to the device module 260.

Figure 2E:

Referring again to FIG. 2, e.g., FIG. 2E, in some embodiments, module 152 may include one or more attributes of a device configured to execute one or more services observing via a communication network over which the device has transmitted and/or received data module 262.

Referring now to FIG. 3, FIG. 3 illustrates an exemplary implementation of service that requires access to a particular portion of the device for execution determining at least partly based on the one or more observed attributes module 154. As illustrated in FIG. 3, the service that requires access to a particular portion of the device for execution determining at least partly based on the one or more observed attributes module 154 may include one or more sub-logic modules in various alternative implementations and embodiments. For example, as shown in FIG. 3 (e.g., FIG. 3A), in some embodiments, module 154 may include one or more service that requires access to particular data under control of the device for execution determining at least partly based on the one or more observed attributes module 302 and service that requires access to a particular sensor of the device for execution determining at least partly based on the one or more observed attributes module 308. In some embodiments, module 302 may include picture analyzing service that requires access to image data under control of the device for execution determining at least partly based on the one or more observed attributes module 304. In some embodiments, module 304 may include picture analyzing service that requires access to image data under control of the device for execution determining at least partly based on the one or more observed attributes indicating that more than five hundred images are stored on the device module 306. In some embodiments, module 308 may include service that requires access to a velocity sensor of the device for execution determining at least partly based on the one or more observed attributes module 310.

Figure 3B:
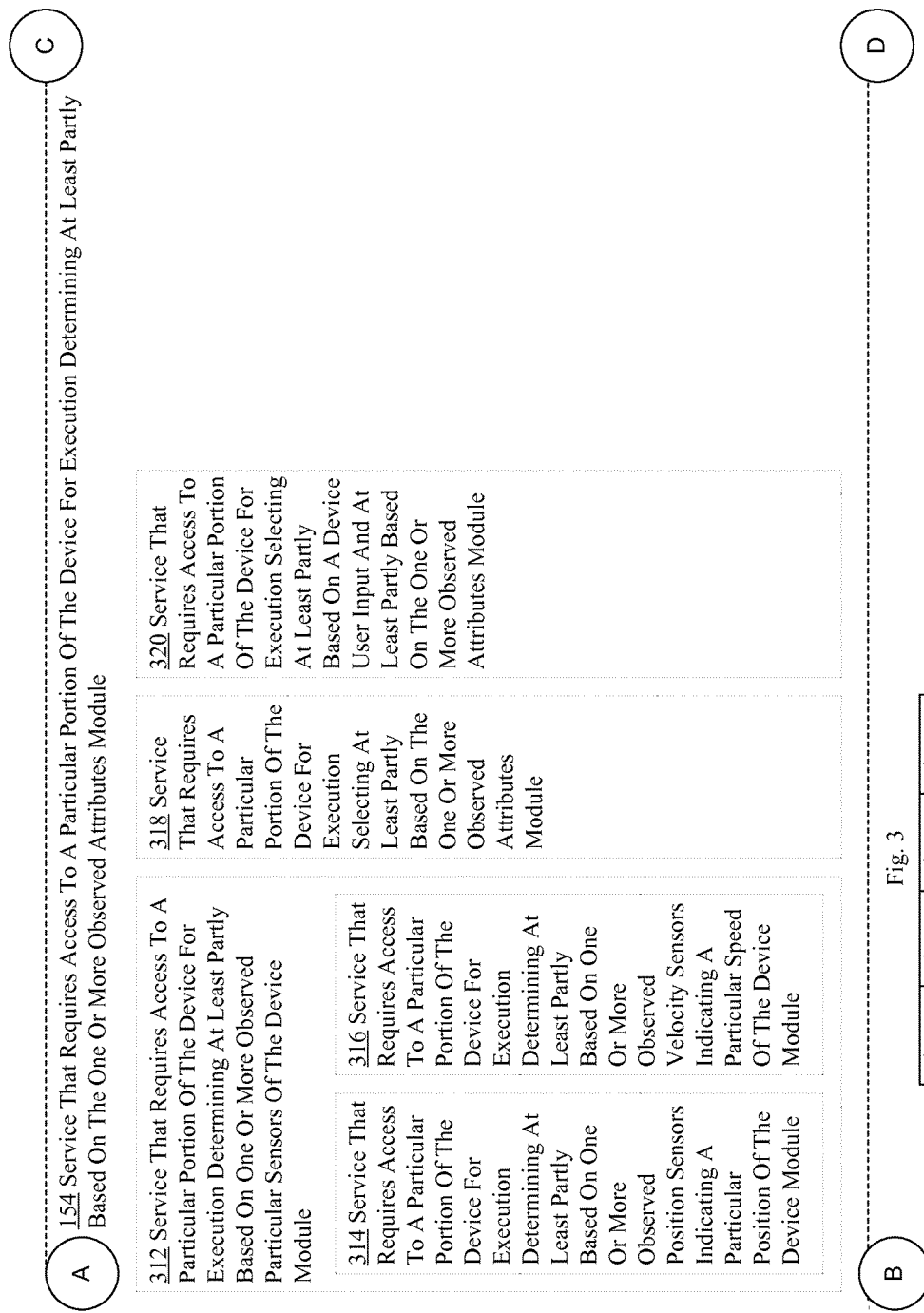

Referring again to FIG. 3, e.g., FIG. 3B, as described above, in some embodiments, module 154 may include one or more of service that requires access to a particular portion of the device for execution determining at least partly based on one or more observed particular sensors of the device module 312, service that requires access to a particular portion of the device for execution selecting at least partly based on the one or more observed attributes module 318, and service that requires access to a particular portion of the device for execution selecting at least partly based on a device user input and at least partly based on the one or more observed attributes module 320. In some embodiments, module 312 may include one or more of service that requires access to a particular portion of the device for execution determining at least partly based on one or more observed position sensors indicating a particular position of the device module 314 and service that requires access to a particular portion of the device for execution determining at least partly based on one or more observed velocity sensors indicating a particular speed of the device module 316.

Referring again to FIG. 3, e.g., FIG. 3C, in some embodiments, module 154 may include one or more of service that requires access to a particular portion of the device for execution determining at least partly based on the one or more observed attributes of the particular portion module 322 and service that requires access to particular data of the device for execution determining at least partly based on one or more observed attributes of the particular data module 330. In some embodiments, module 322 may include one or more of service that requires access to a particular portion of the device for execution determining at least partly based on an observed state of the particular portion module 324, service that requires access to a particular portion of the device for execution determining at least partly based on an observed usage of the particular portion module 326, and service that requires access to a particular portion of the device for execution determining at least partly based on an observed condition detected by a particular sensor module 328. In some embodiments, module 330 may include service that requires access to particular data of the device for execution determining at least partly based on received information regarding one or more attributes of the particular data module 332. In some embodiments, module 332 may include service that requires access to particular data of the device for execution determining at least partly based on received information regarding one or more values of at least a portion of the particular data module 334.

Referring again to FIG. 3, e.g., FIG. 3D, in some embodiments, module 154 may include one or more of service that requires access to a particular portion of the device for execution determining at least partly based on an environment of the device attribute as detected by an observed sensor of the device module 336 and service that requires ongoing access to a particular portion of the device for execution determining at least partly based on the one or more observed attributes module 340. In some embodiments, module 336 may include soda pop vending machine location finding service that requires access to a positioning sensor of the device for execution determining at least partly based on an ambient temperature surrounding the device as detected by an observed temperature sensor of the device module 338.

Figures 4, 4D:
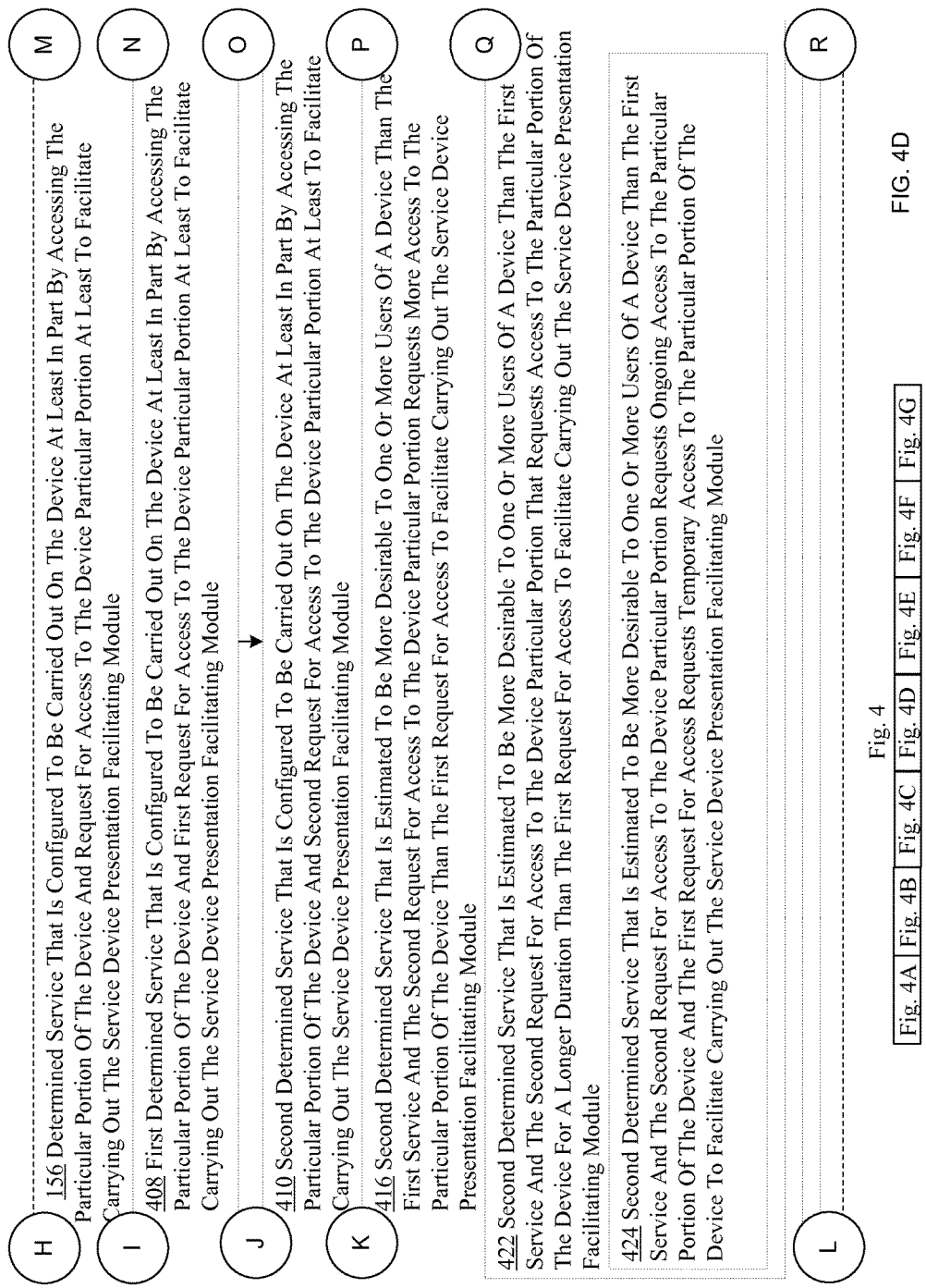

Referring now to FIG. 4, FIG. 4 illustrates an exemplary implementation of determined service that is configured to be carried out on the device at least in part by accessing the particular portion of the device and request for access to the device particular portion at least to facilitate carrying out the service device presentation facilitating module 156. As illustrated in FIG. 4, the determined service that is configured to be carried out on the device at least in part by accessing the particular portion of the device and request for access to the device particular portion at least to facilitate carrying out the service device presentation facilitating module 156 may include one or more sub-logic modules in various alternative implementations and embodiments. For example, as shown in FIG. 4, e.g., FIG. 4A, in some embodiments, module 156 may include one or more of determined service that is configured to be carried out on the device at least in part by accessing the particular portion of the device, and request for access to the device particular portion at least to facilitate carrying out the service as payment for facilitating carrying out the service device presentation facilitating module 402, determined service that is configured to be carried out on the device at least in part by accessing the particular portion of the device and request for access to the device particular portion at least to facilitate carrying out the service device presentation of the determined service and the request for access in a cell of a table of one or more services facilitating module 404, and determined service that is configured to be carried out on the device at least in part by accessing the particular portion of the device and request for access to the device particular portion at least to facilitate carrying out the service device presentation of the determined service a cell of a table and the request for access in an adjacent cell of the table facilitating module 406.

Figure 4E:
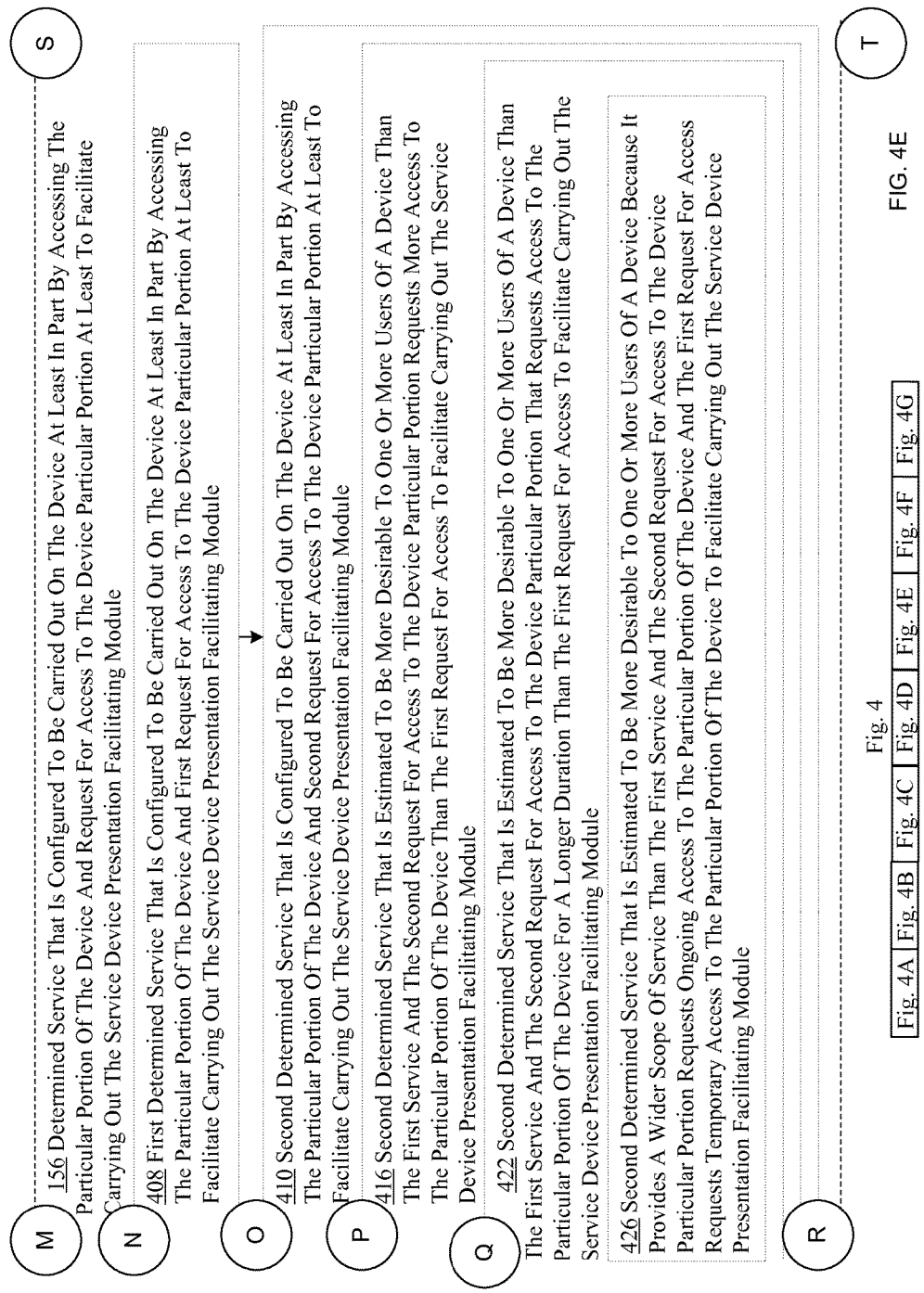

Referring again to FIG. 4, e.g., FIGS. 4B, 4C, 4D, and 4E, in some embodiments, module 156 may include one or more of first determined service that is configured to be carried out on the device at least in part by accessing the particular portion of the device and first request for access to the device particular portion at least to facilitate carrying out the service device presentation facilitating module 408 and second determined service that is configured to be carried out on the device at least in part by accessing the particular portion of the device and second request for access to the device particular portion at least to facilitate carrying out the service device presentation facilitating module 410. In some embodiments, module 410 may include one or more of second determined service that has one or more additional features not present in the first service, and second request for access to the device particular portion at least to facilitate carrying out the service device presentation facilitating module 412, second determined service that is estimated to be more desirable to one or more users of a device than the first service, and second request for access to the device particular portion at least to facilitate carrying out the service device presentation facilitating module 414, and second determined service that is estimated to be more desirable to one or more users of a device than the first service and the second request for access to the device particular portion that requests more access to the particular portion of the device than the first request for access to facilitate carrying out the service device presentation facilitating module 416. Referring to FIG. 4C, in some embodiments, module 416 may include second determined service that is estimated to be more desirable to one or more users of a device than the first service and the second request for access to the device particular portion that requests access to more of the particular portion of the device than the first request to facilitate carrying out the service device presentation facilitating module 418 (e.g., which, in some embodiments, may include second exercise monitoring service that tracks three user factors compared to two user factors tracked by the first service and the second request for access requests access to three sensors of the device particular portion compared to the first request that requests access to two sensors of the device particular portion to facilitate carrying out the service device presentation facilitating module 420). Referring to FIG. 4D, in some embodiments, module 416 may include second determined service that is estimated to be more desirable to one or more users of a device than the first service and the second request for access to the device particular portion that requests access to the particular portion of the device for a longer duration than the first request for access to facilitate carrying out the service device presentation facilitating module 422. In some embodiments, module 422 may include second determined service that is estimated to be more desirable to one or more users of a device than the first service and the second request for access to the device particular portion requests ongoing access to the particular portion of the device and the first request for access requests temporary access to the particular portion of the device to facilitate carrying out the service device presentation facilitating module 424. Referring to FIG. 4E, in some embodiments, module 422 may include second determined service that is estimated to be more desirable to one or more users of a device because it provides a wider scope of service than the first service and the second request for access to the device particular portion requests ongoing access to the particular portion of the device and the first request for access requests temporary access to the particular portion of the device to facilitate carrying out the service device presentation facilitating module 426.

Referring again to FIG. 4, e.g., FIG. 4F, in some embodiments, module 156 may include one or more of determined service that is configured to be carried out on the device at least in part by accessing the particular portion of the device and request for access to the device particular portion at least to facilitate carrying out the service device presentation of the request for access prior to the determined service facilitating module 428, determined service that is configured to be carried out on the device at least in part by accessing the particular portion of the device presentation facilitating module 430, request for access to the device particular portion at least to facilitate carrying out the service device presentation facilitating module 432, determined service that is configured to be carried out on the device at least in part by accessing the particular portion of the device and request for access to the device particular portion at least to facilitate carrying out the service device that is presented as an alternative to monetary remuneration for the determined service presentation facilitating module 434, and determined service that is configured to be carried out on the device at least in part by accessing the particular portion of the device and request for access to the device particular portion at least to facilitate carrying out the service device that is presented as an option for receiving the determined service for free presentation facilitating module 436.

Referring to FIG. 4, e.g., FIG. 4G, in some embodiments, module 156 may include one or more of determined service that is configured to be carried out on the device at least in part by accessing the particular portion of the device presentation facilitating module 438 and one or more payment options presentation facilitating, including a request for access to the device particular portion as a payment option module 440. In some embodiments, module 440 may include one or more of monetary payment as one of the one or more payment options as a first payment option presentation facilitating module 442, a request for access to the device particular portion as a second payment option of the one or more payment options presentation facilitating module 444, and multi-portion option for payment for the one or more determined services including a first portion of the option for payment for the one or more determined services as a request for monetary remuneration and a second portion of the option for payment for the one or more services as a request for access to for particular presentation facilitating module 446. In some embodiments, module 446 may include multi-portion option for payment for the one or more determined services including a first portion of the option for payment for the one or more determined services as a request for monetary remuneration and a second portion of the option for payment for the one or more services as a request for access to for particular presentation facilitating so that an amount of payment required in the first option decreases when more access is granted in the second option module 448.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
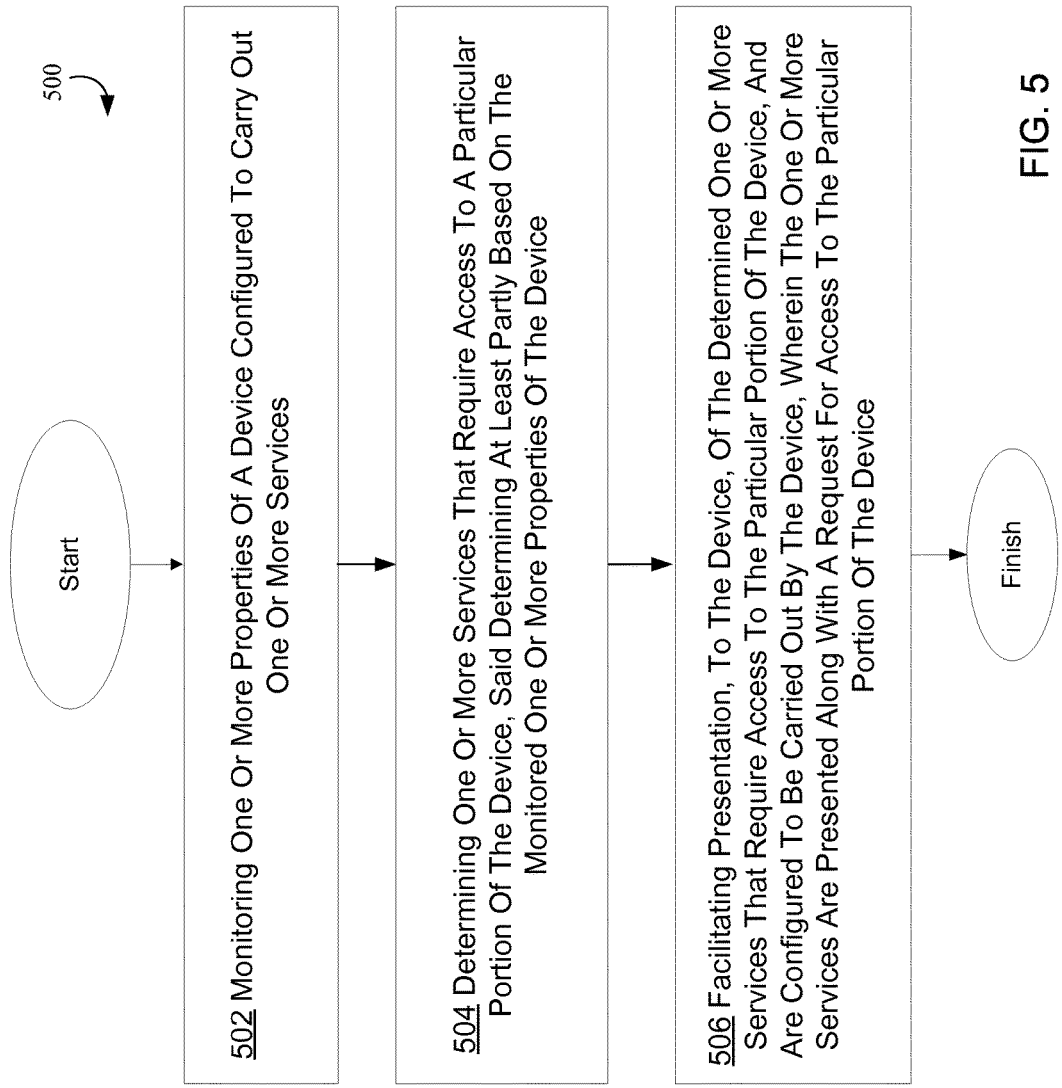
FIG. 5 is a high-level logic flowchart of a process, e.g., operational flow 500, according to an embodiment.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5-8 as well as the other operations to be described herein may be performed by at least one of a machine, an article of manufacture, or a composition of matter.

Referring now to FIG. 5, FIG. 5 shows operation 500, which may include operation 502 depicting monitoring one or more properties of a device configured to carry out one or more services. For example, FIG. 1, e.g., FIG. 1B, shows one or more attributes of a device configured to execute one or more services observing module 152 monitoring (e.g., observing, recording, having information transmitted to, collecting, seeing, regulating, controlling, viewing, receiving through a third party, receiving after the fact, and the like, whether passive or active, and regardless of the presence of intervening entities) e.g., data about a property, e.g., whether environment-dependent or environment independent, including, but not limited to, one or more of a status, characteristic, snapshot, feature, index, brand, configuration, attribute, algorithm, format, mode, flag setting, variable, data structure, and the like, and including, but not limited to, any attribute of a device or any of the hardware, software, firmware, and the like, whether static or dynamic, permanent or temporary, whether dependent on a user of the device or not, and in an embodiment, may reflect entirely on the user or one or more actions taken out by the user) of a device (e.g., a cellular phone, smart phone, IP phone, VoIP phone, handset, microphone, camera (e.g., video camera, still camera, digital camera, and the like), headphone, earpiece, screen, monitor, television, game system, receiver (e.g., an audio/visual receiver), media player (e.g., DVD player, Blu-ray player, CD player, MP3 player, cassette tape player), tablet device, netbook computer, notebook computer, router, wireless router, bridge, network equipment, server, desktop computer, personal computer, personal computer component (e.g., RAM, hard drive, video card, and the like), personal navigation system, vehicle navigation system, motor vehicle, motor vehicle stereo, motor vehicle control system, motor vehicle communication system (e.g., OnStar), appliance, security system (e.g., a home security system), electronic safety device (e.g., an electronic safe, a door security system, a door locking system), stereo system, speaker, remote control (e.g., a universal remote control, or a device remote control), radio, two-way radio, walkie-talkie, ham radio, a metal detector, a radar detector, a weather station, a robot (e.g., a Roomba), a vacuum cleaner, and the like) configured to (e.g., the one or more devices are arranged in a manner that makes them capable of) carry out (e.g., execute, perform, take a step or measure toward, schedule the performance of, instruct an entity to perform, and the like, including one or more portions of the service that are smaller than the service itself, including, but not limited to, data transmission and manipulation, and user interface handling, for example) one or more services (e.g., any task, or any portion of any task, or any combination of tasks, that can be carried out by a device, or by a device in communication with another device, which may include human interaction, or may not include human interaction, and which may require one or more resources, either locally to the device, or remotely from the device, and which may include one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like).

Referring again to FIG. 5, operation 500 may include operation 504 depicting determining one or more services that require access to a particular portion of the device, said determining at least partly based on the monitored one or more properties of the device. For example, FIG. 1, e.g., FIG. 1B, shows service that requires access to a particular portion of the device for execution determining at least partly based on the one or more observed attributes module 154 determining (e.g., acquiring, obtaining, receiving, calculating, selecting from a list or other data structure, receiving, retrieving, or receiving information regarding, performing calculations to find out, retrieving data that indicates, receiving notification, receiving information that leads to an inference, whether by human or automated process, or being party to any action or transaction that results in informing, inferring, or deducting, including but not limited to circumstances without absolute certainty, including more-likely-than-not and/or other thresholds regarding whether the service is configured to be carried out on the device) one or more services one or more services (e.g., any task, or any portion of any task, or any combination of tasks, that can be carried out by a device, or by a device in communication with another device, which may include human interaction, or may not include human interaction, and which may require one or more resources, either locally to the device, or remotely from the device, and which may include one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like) that require access (e.g., permission or authorization to perform one or more of reading, writing, altering, copying, deleting, modifying, observing, issuing commands to, receiving from, and the like) to a particular portion (e.g., any part of the device, including, but not limited to, one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like) of the device, said determining at least partly based (e.g., is used as a factor in, whether directly or indirectly, and regardless of the weight given to that factor or its relative impact in the ultimate result) on the monitored one or more properties (e.g., data about a property, e.g., whether environment-dependent or environment independent, including, but not limited to, one or more of a status, characteristic, snapshot, feature, index, brand, configuration, attribute, algorithm, format, mode, flag setting, variable, data structure, and the like, and including, but not limited to, any attribute of a device or any of the hardware, software, firmware, and the like, whether static or dynamic, permanent or temporary, whether dependent on a user of the device or not, and in an embodiment, may reflect entirely on the user or one or more actions taken out by the user) of the device.

Referring again to FIG. 5, operation 500 may include operation 506 depicting facilitating presentation, to the device, of the determined one or more services that require access to the particular portion of the device, and are configured to be carried out by the device, wherein the one or more services are presented along with a request for access to the particular portion of the device. For example, FIG. 1, e.g., FIG. 1B, shows determined service that is configured to be carried out on the device at least in part by accessing the particular portion of the device and request for access to the device particular portion at least to facilitate carrying out the service device presentation facilitating module 156 facilitating presentation facilitating (e.g., performing one or more actions that assist in the execution or completion of) presentation (e.g., show, through any combination of visual and non-visual interfaces), to the device (e.g., a cellular phone, smart phone, IP phone, VoIP phone, handset, microphone, camera (e.g., video camera, still camera, digital camera, and the like), headphone, earpiece, screen, monitor, television, game system, receiver (e.g., an audio/visual receiver), media player (e.g., DVD player, Blu-ray player, CD player, MP3 player, cassette tape player), tablet device, netbook computer, notebook computer, router, wireless router, bridge, network equipment, server, desktop computer, personal computer, personal computer component (e.g., RAM, hard drive, video card, and the like), personal navigation system, vehicle navigation system, motor vehicle, motor vehicle stereo, motor vehicle control system, motor vehicle communication system (e.g., OnStar), appliance, security system (e.g., a home security system), electronic safety device (e.g., an electronic safe, a door security system, a door locking system), stereo system, speaker, remote control (e.g., a universal remote control, or a device remote control), radio, two-way radio, walkie-talkie, ham radio, a metal detector, a radar detector, a weather station, a robot (e.g., a Roomba), a vacuum cleaner, and the like), of the determined (e.g., acquired, obtained, received, calculated, selected from a list or other data structure, received, retrieved, or received information regarding, performed calculations to find out, retrieved data that indicates, received notification, received information that leads to an inference, whether by human or automated process, or being party to any action or transaction that results in informed, inferred, or deducted, including but not limited to circumstances without absolute certainty, including more-likely-than-not and/or other thresholds regarding whether the service is configured to be carried out on the device) one or more services (e.g., any task, or any portion of any task, or any combination of tasks, that can be carried out by a device, or by a device in communication with another device, which may include human interaction, or may not include human interaction, and which may require one or more resources, either locally to the device, or remotely from the device, and which may include one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like) that require access (e.g., permission or authorization to perform one or more of reading, writing, altering, copying, deleting, modifying, observing, issuing commands to, receiving from, and the like) to the particular portion (e.g., any part of the device, including, but not limited to, one or more of hardware, software, firmware, data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like) and are configured to be carried out configured to be (e.g., the one or more services are designed to be carried out, or designed in a manner that makes the one or more services capable of being carried out) carried out (e.g., executed, performed, take a step or measure toward, schedule the performance of, instruct an entity to perform, and the like, including one or more portions of the service that are smaller than the service itself, including, but not limited to, data transmission and manipulation, and user interface handling, for example by (e.g., in this context, by means that the device plays some role in facilitating the carrying out of the device, regardless of whether the device actually performs any of the steps of carrying out, or merely supplies one or more resources, data, or instructions that are used to carry out) the device (e.g., including, but not limited to, the list of devices set forth previously), wherein the one or more services are presented along with (e.g., related in some manner, whether temporally, visually, audially, spatially, or if a relationship is implied, and the like, regardless of attenuation, and whether intentional or not) a request for access (e.g., one or more rights, as described previously) to the particular portion of the device (e.g., including, but not limited to, described examples).

Figure 6A:
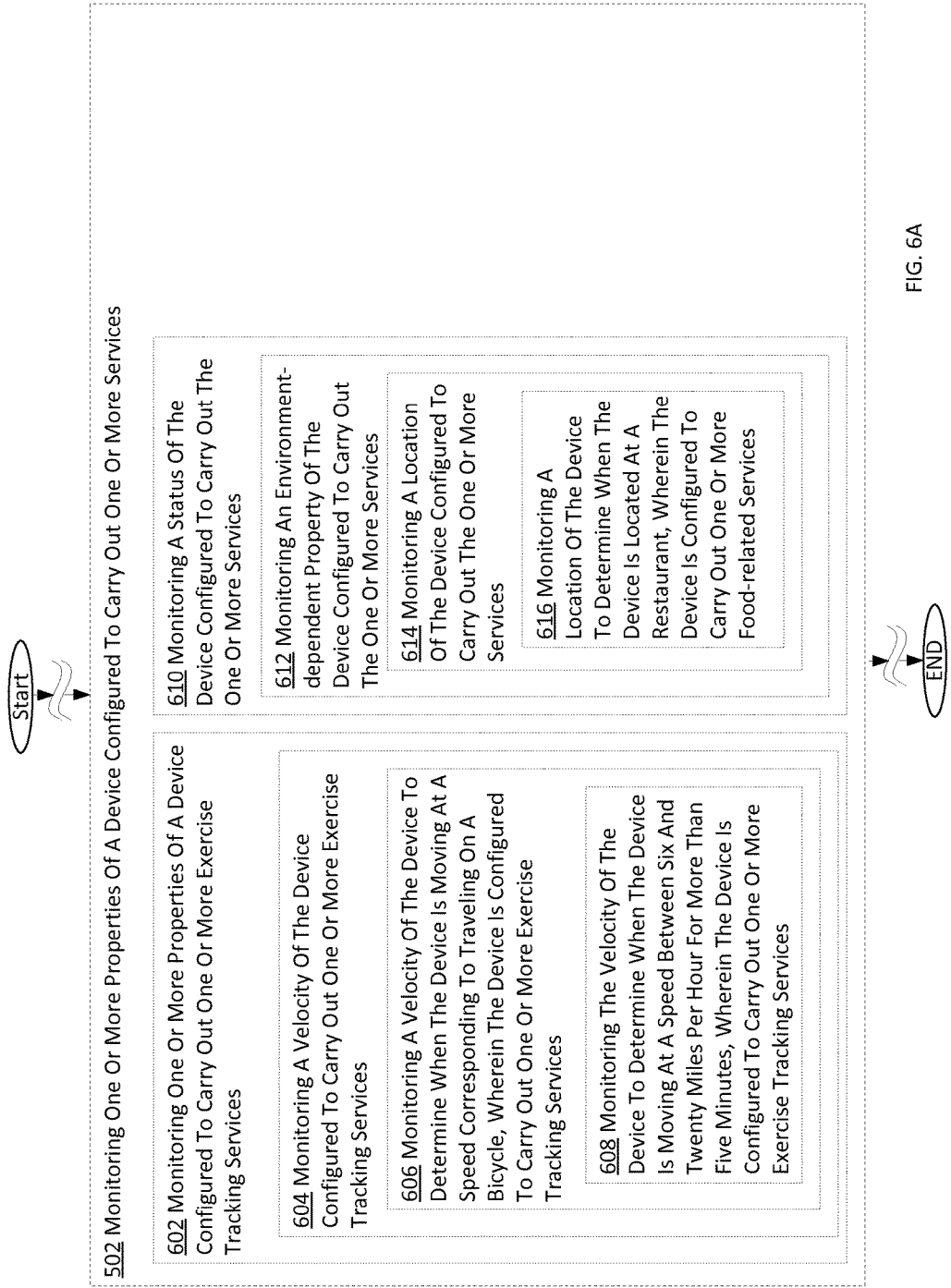
FIG. 6A is a high-level logic flow chart of a process depicting alternate implementations of a monitoring one or more device properties operation 502, according to one or more embodiments.

FIGS. 6A-6E depict various implementations of operation 502, depicting monitoring one or more properties of a device configured to carry out one or more services according to embodiments. Referring now to FIG. 6A, operation 502 may include operation 602 depicting monitoring one or more properties of a device configured to carry out one or more exercise tracking services. For example, FIG. 2, e.g., FIG. 2A shows one or more attributes of a device configured to execute one or more exercise tracking services observing module 202 monitoring (e.g., observing, collecting, watching, receiving, retrieving, any form of obtaining data or information, regardless of whether authorized, and regardless of whether directly or indirectly) one or more properties (e.g., how much processor utilization is occurring on the device) of a device (e.g., an exercise tracking device) configured to carry out one or more exercise tracking services.

Referring again to FIG. 6A, operation 602 may include operation 604 depicting monitoring a velocity of the device configured to carry out one or more exercise tracking services. For example, FIG. 2, e.g., FIG. 2A, shows one or more velocity measurements of a device configured to execute one or more exercise tracking services observing module 204 monitoring a velocity of the device (e.g., an exercise monitoring watch) configured to carry out one or more exercise tracking services).

Referring again to FIG. 6A, operation 604 may include operation 606 depicting monitoring a velocity of the device to determine when the device is moving at a speed corresponding to traveling on a bicycle, wherein the device is configured to carry out one or more exercise tracking services. For example, FIG. 2, e.g., FIG. 2A, shows one or more velocity measurements of the device configured to execute one or more exercise tracking services observing to determine when the device is moving at bicycling speed module 206 monitoring a velocity of the device to determine when the device is moving at a speed corresponding to traveling on a bicycle, wherein the device is configured to carry out one or more exercise tracking services.

Referring again to FIG. 6A, operation 606 may include operation 608 depicting monitoring the velocity of the device to determine when the device is moving at a speed between six and twenty miles per hour for more than five minutes, wherein the device is configured to carry out one or more exercise tracking services. For example, FIG. 2, e.g., FIG. 2A, shows one or more velocity measurements of the device configured to execute one or more exercise tracking services observing to determine when the device is moving at a speed between six and twenty miles per hour for more than five minutes module 208 monitoring the velocity of the device (e.g., a bicycle navigation system that attaches to bicycle handlebars and reads user data from the user's grip on the handlebars) to determine when the device is moving at a speed between six and twenty miles per hour for more than five minutes, wherein the device is configured to carry out one or more exercise tracking services.

Referring again to FIG. 6A, operation 502 may include operation 610 depicting monitoring a status of the device configured to carry out the one or more services. For example, FIG. 2, e.g., FIG. 2A, shows status of a device configured to execute one or more services observing module 210 monitoring a status (e.g., a strength of a wireless signal of an open wireless network available to the device) of the device (e.g., a smartphone) configured to carry out the one or more services (e.g., a network connection quality monitoring service)

Referring again to FIG. 6A, operation 610 may include operation 612 depicting monitoring an environment-dependent property of the device configured to carry out the one or more services. For example, FIG. 2, e.g., FIG. 2A, shows environment-dependent attribute of a device configured to execute one or more services observing module 212 monitoring an environment-dependent property (e.g., temperature) of the device (e.g., a personal assistant device made for hikers and/or backpackers) configured to carry out the one or more services (e.g., a hiking trail status tracking application that tracks a usability of a particular hiking trail in the current climate conditions).

Referring again to FIG. 6A, operation 612 may include operation 614 depicting monitoring a location of the device configured to carry out the one or more services. For example, FIG. 2, e.g., FIG. 2A, shows position data of a device configured to execute one or more services observing module 214 monitoring a location of the device configured to carry out the one or more services (e.g., a bicycling trail information and status tracking application).

Referring again to FIG. 6A, operation 614 may include operation 616 depicting monitoring a location of the device to determine when the device is located at a restaurant, wherein the device is configured to carry out one or more food-related services. For example, FIG. 2, e.g., FIG. 2A, shows position data of a device configured to execute one or more services observing to determine when the device is located at a particular attraction module 216 monitoring a location of the device (e.g., a tablet device carried by a user) to determine when the device is located at a restaurant, wherein the device is configured to carry out one or more food-related services (e.g., a steak evaluation service where a picture is taken of a steak and a remote service analyzes the picture of the steak to determine one or more attributes of the steak).

Figure 6B:
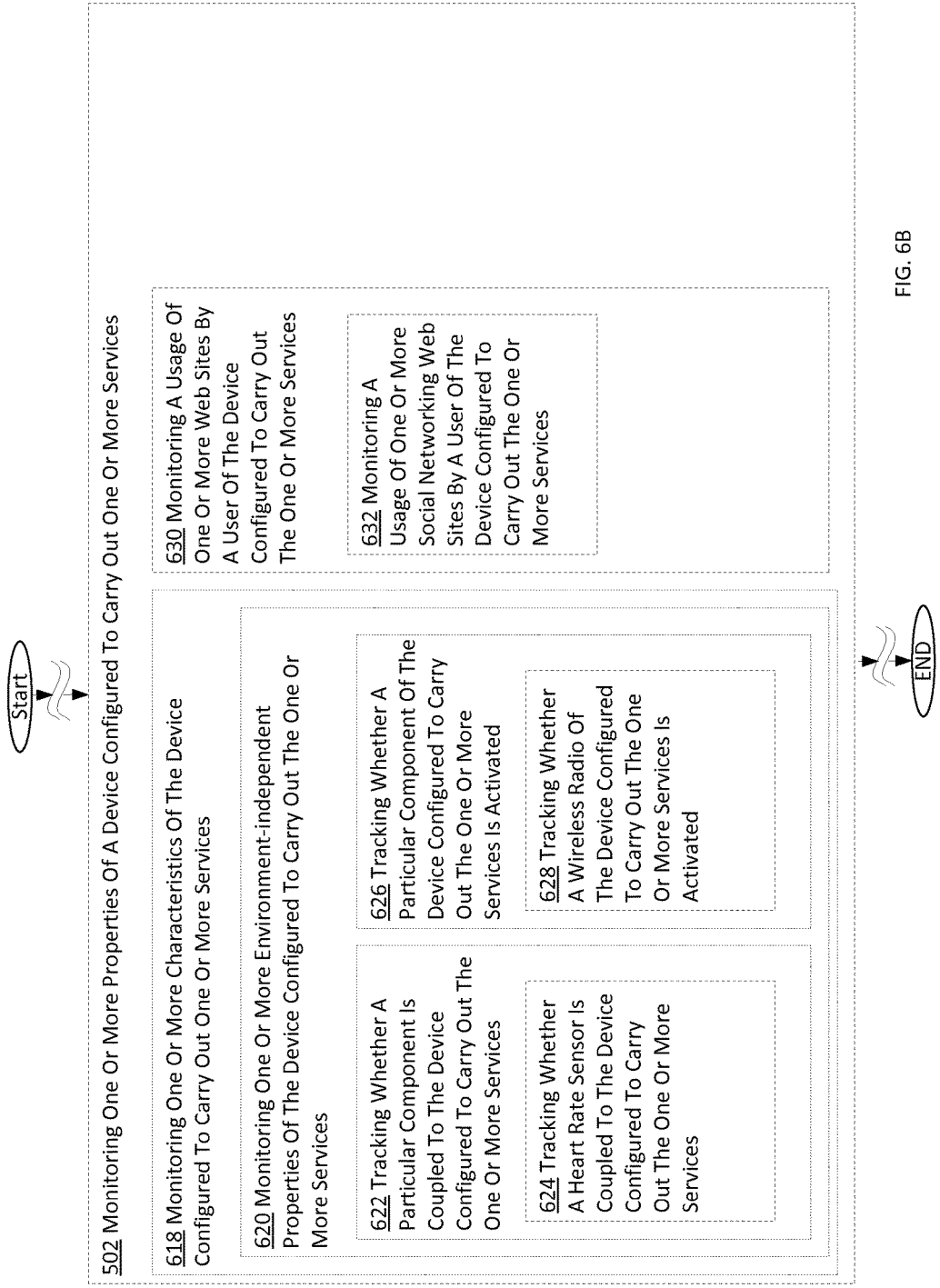
FIG. 6B is a high-level logic flow chart of a process depicting alternate implementations of a monitoring one or more device properties operation 502, according to one or more embodiments.

Referring now to FIG. 6B, operation 502 may include operation 618 depicting monitoring one or more characteristics of the device configured to carry out one or more services. For example, FIG. 2, e.g., FIG. 2B, shows characteristic of a device configured to execute one or more services observing module 218 monitoring one or more characteristics (e.g., a property that is not dependent on the environment of the device, e.g., whether the device has an accelerometer) of the device (e.g., a tablet device) configured to carry out one or more services (e.g., an athletic measurement recording service).

Referring again to FIG. 6B, operation 618 may include operation 620 depicting monitoring one or more environment-independent characteristics of the device configured to carry out one or more services. For example, FIG. 2, e.g., FIG. 2B, shows environment-independent attribute of a device configured to execute one or more services observing module 220 monitoring one or more environment-independent characteristics (e.g., whether the wireless radio of a device is on) of the device (e.g., a laptop computer) configured to carry out one or more services (e.g., a service run by a town city council to inform a user about "wired hotspots" around their town).

Referring again to FIG. 6B, operation 620 may include operation 622 depicting tracking whether a particular component is coupled to the device configured to carry out the one or more services. For example, FIG. 2, e.g., FIG. 2B, shows presence of a particular component operatively coupled to a device configured to execute one or more services observing module 222 tracking whether a particular component (e.g., an application that converts altitude, velocity, and other indirect information into an estimated location data) is coupled to (e.g., installed on) the device configured to carry out the one or more services (e.g., a new attraction finding service for use when a user is in a new city).

Referring again to FIG. 6B, operation 622 may include operation 624 depicting tracking whether a heart rate sensor is coupled to the device configured to carry out the one or more services. For example, FIG. 2, e.g., FIG. 2B, shows presence of a heart monitoring component operatively coupled to a device configured to execute one or more services observing module 224 tracking whether a heart rate sensor is coupled to the device (e.g., a smartphone) configured to carry out the one or more services (e.g., a calorie burning service).

Referring again to FIG. 6B, operation 620 may include operation 626 depicting tracking whether a particular component of the device configured to carry out the one or more services is activated. For example, FIG. 2, e.g., FIG. 2B, shows activation state of a particular component operatively coupled to a device configured to execute one or more services observing module 226 tracking whether a particular component (e.g., an image capturing sensor, e.g., a camera) of the device configured to carry out the one or more services (e.g., a landmark recognition service) is activated.

Referring again to FIG. 6B, operation 626 may include operation 628 depicting tracking whether a wireless radio of the device configured to carry out the one or more services is activated. For example, FIG. 2, e.g., FIG. 2B, shows activation state of a wireless radio operatively coupled to a device configured to execute one or more services observing module 228 tracking whether a wireless radio of the device (e.g., a desktop computer) configured to carry out the one or more services (e.g., detecting how many unsecured wireless networks are available at a particular location and whether anyone else is listening service) is activated (e.g., is the wireless radio on).

Referring again to FIG. 6B, operation 502 may include operation 630 depicting monitoring a usage of one or more web sites by a user of the device configured to carry out the one or more services. For example, FIG. 2, e.g., FIG. 2B, shows one or more internet addresses of files received by a device configured to execute one or more services observing module 230 monitoring a usage of one or more websites (e.g., financial planning websites) by a user of the device (e.g., a desktop computer) configured to carry out the one or more services (e.g., a money managing service).

Referring again to FIG. 6B, operation 502 may include operation 632 depicting monitoring a usage of one or more social networking web sites by a user of the device configured to carry out the one or more services. For example, FIG. 2, e.g., FIG. 2B, shows one or more activities carried out on a social networking website by a device configured to execute one or more services observing module 232 monitoring a usage of one or more social networking web sites (e.g., Facebook, Twitter, or LinkedIn) by a user of the device (e.g., a home web browsing station) configured to carry out the one or more services (e.g., a password manager for various websites that stores and makes more secure a user's passwords).

Figure 6C:
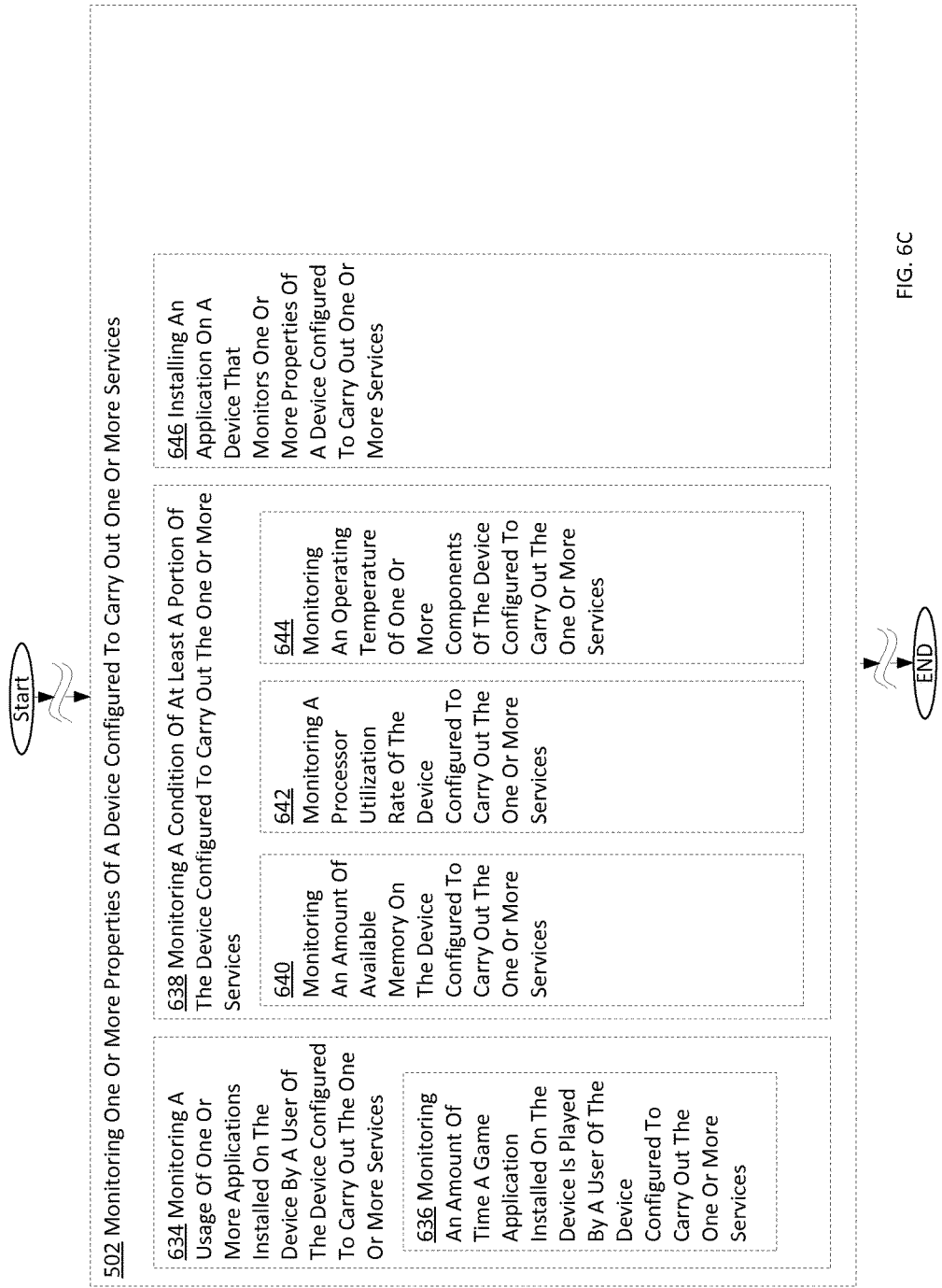
FIG. 6C is a high-level logic flow chart of a process depicting alternate implementations of a monitoring one or more device properties operation 502, according to one or more embodiments.

Referring now to FIG. 6C, operation 502 may include operation 634 depicting monitoring a usage of one or more applications installed on the device by a user of the device configured to carry out the one or more services. For example, FIG. 2, e.g., FIG. 2B, shows usage of one or more applications operating on a device configured to execute one or more services observing module 234 monitoring a usage of one or more applications (e.g., the TV guide application) installed on the device (e.g., an internet-connected television) by a user of the device configured to carry out the one or more services (e.g., an upcoming television show alert service).

Referring again to FIG. 6C, operation 634 may include operation 636 depicting monitoring an amount of time a game application installed on the device is played by a user of the device configured to carry out the one or more services. For example, FIG. 2, e.g., FIG. 2B, shows usage of one or more game applications operating on a device configured to execute one or more services observing module 236 monitoring an amount of time a game application (e.g., a first person shooter game) installed on the device (e.g., a gaming system, e.g., an Xbox or a PlayStation) is played by a user of the device configured to carry out the one or more services (e.g., a service that monitors the player's playing style and refers the player to purchase one or more in-game items, e.g., that may cost real money, that the user may use based on the user's playing style).

Referring again to FIG. 6C, operation 502 may include operation 638 depicting monitoring a condition of at least a portion of the device configured to carry out the one or more services. For example, FIG. 2, e.g., FIG. 2C, shows condition of one or more portions of a device configured to execute one or more services observing module 238 monitoring a condition (e.g., a state, e.g., whether the device has available memory, whether the device has available bandwidth, how many games are installed on the device, how many text documents are on the device, how many .pdf images are on the device, and the like) of at least a portion of the device (e.g., a smartphone) configured to carry out the one or more services (e.g. a distributed computing for-sale application).

Referring again to FIG. 6C, operation 638 may include operation 640 depicting monitoring an amount of available memory on the device configured to carry out the one or more services. For example, FIG. 2, e.g., FIG. 2C, shows available memory resource condition of the device configured to execute one or more services observing module 240 monitoring an amount of available memory on the device (e.g., a user's tablet device) configured to carry out the one or more services (e.g., a "find new fun places" service).

Referring again to FIG. 6C, operation 638 may include operation 642 depicting monitoring a processor utilization rate of the device configured to carry out the one or more services. For example, FIG. 2, e.g., FIG. 2C, shows processor utilization rate of the device configured to execute one or more services observing module 242 monitoring a processor utilization rate of the device (e.g., an IP-enabled telephone) configured to carry out the one or more services (e.g., a contact list management service).

Referring again to FIG. 6C, operation 638 may include operation 644 depicting monitoring an operating temperature of one or more components of the device configured to carry out the one or more services. For example, FIG. 2, e.g., FIG. 2C, shows component operating temperature of the device configured to execute one or more services observing module 244 monitoring an operating temperature of one or more components (e.g., an engine) of the device (e.g., a motor vehicle with a motor vehicle control system) configured to carry out the one or more services (e.g., a vehicle monitoring service, which, in an embodiment, may be a portion of a self-driving module used in a controlled environment).

Referring again to FIG. 6C, operation 502 may include operation 646 depicting facilitating installation, on the device, of an application that monitors one or more properties of the device configured to carry out one or more services. For example, FIG. 2, e.g., FIG. 2C, shows application configured to observe one or more attributes of the device configured to execute one or more services installation facilitating module 246 facilitating installation, on the device (e.g., a laptop computer), of an application that monitors one or more properties (e.g., an upload signal strength over a 4G LTE network) of the device (e.g., a 4G LTE enabled portable hotspot) configured to carry out the one or more services (e.g., a cloud data transmission and receipt management service).

Figure 6D:
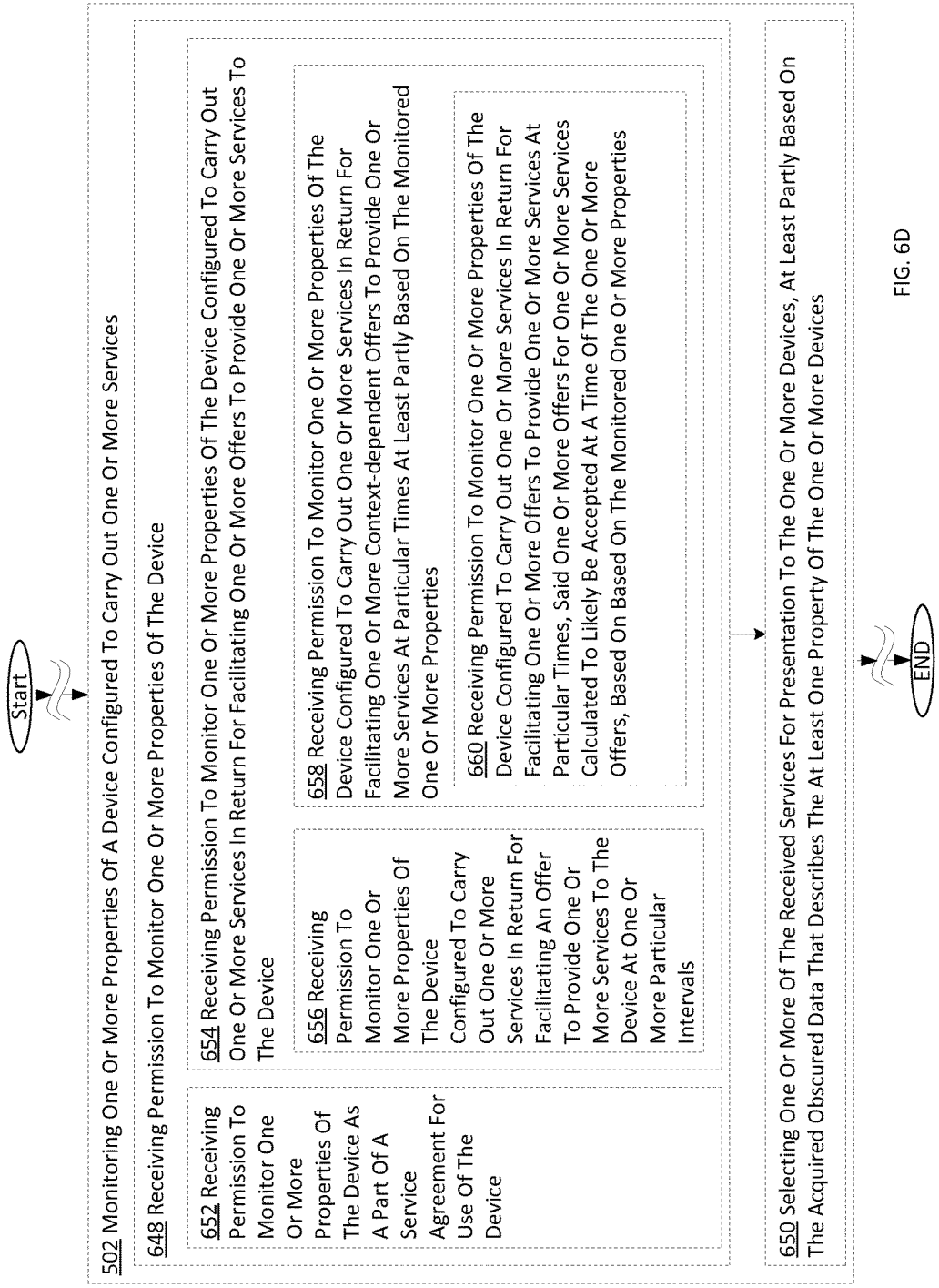
FIG. 6D is a high-level logic flow chart of a process depicting alternate implementations of a monitoring one or more device properties operation 502, according to one or more embodiments.

Referring now to FIG. 6D, operation 502 may include operation 648 depicting receiving permission to monitor one or more properties of the device. For example, FIG. 2, e.g., FIG. 2D, shows permission to observe one or more attributes of a device configured to execute one or more services acquiring module 248 receiving permission (e.g., changing an access flag, or carrying out any other step that changes, modifies, or grants a level of access, even if that access was already present through the same or different means) to monitor one or more properties (e.g., output from one or more sensors) of the device (e.g., a user's smartphone)

Referring again to FIG. 6D, operation 502 may include operation 650 depicting monitoring the one or more properties of the device after receiving the permission. For example, FIG. 2, e.g., FIG. 2D, shows one or more attributes of the device configured to execute one or more services observing upon acquisition of permission module 250 monitoring the one or more properties (e.g., output from a temperature sensor) after receiving the permission.

Referring again to FIG. 6D, operation 648 may include operation 652 depicting receiving permission to monitor one or more properties of the device as a part of a service agreement for use of the device. For example, FIG. 2, e.g., FIG. 2D, shows permission to observe one or more attributes of a device configured to execute one or more services acquiring as part of a device service agreement module 252 receiving permission to monitor one or more properties (e.g., an amount of data transmitted to various locations and received from various locations, which may be tracked by location or in the aggregate) of the device (e.g., a smartphone, e.g., a Nokia Windows Phone) as a part of a service agreement (e.g., an agreement that a user enters into with one or more of a phone manufacturer and a communication network provider).

Referring again to FIG. 2D, operation 648 may include operation 654 depicting receiving permission to monitor one or more properties of the device configured to carry out one or more services in return for facilitating one or more offers to provide one or more services to the device. For example, FIG. 2, e.g., FIG. 2D, shows permission to observe one or more attributes of a device configured to execute one or more services acquiring in response to facilitating one or more offers for one or more services to the device module 254 receiving permission to monitor one or more properties of the device (e.g., how many contacts are stored in the device's contact list) configured to carry out one or more services (e.g., a friend location updating service) in return for (e.g., as remuneration for) one or more offers to provide one or more services (e.g., the friend location updating service) to the device (e.g., a user's tablet device with VoIP service (e.g., Skype) installed for use similarly to a phone).

Referring again to FIG. 6D, operation 654 may include operation 656 depicting receiving permission to monitor one or more properties of the device configured to carry out one or more services in return for facilitating an offer to provide one or more services to the device at one or more particular intervals. For example, FIG. 2, e.g., FIG. 2D, shows permission to observe one or more attributes of a device configured to execute one or more services acquiring in response to facilitating one or more offers for one or more services to the device at one or more intervals module 256 receiving permission to monitor one or more properties (e.g., a miles traveled tracking service) of the device (e.g., a camping tool with Internet connectivity) configured to carry out one or more services (e.g., a walking-trail assistance service) in return for facilitating an offer to provide one or more services (e.g., different camping and/or hiking services) at one or more particular intervals (e.g., one service a day, or in another embodiment, one service an hour).

Referring again to FIG. 6D, operation 654 may include operation 658 depicting receiving permission to monitor one or more properties of the device configured to carry out one or more services in return for facilitating one or more context-dependent offers to provide one or more services at particular times at least partly based on the monitored one or more properties. For example, FIG. 2, e.g., FIG. 2D, shows permission to observe one or more attributes of a device configured to execute one or more services acquiring in response to facilitating one or more context-dependent offers for one or more services to the device at one or more particular times at least partly based on the observed one or more attributes module 258 receiving permission to monitor one or more properties of the device configured to carry out one or more services (e.g., a steak evaluation service based on a picture of a steak) in return for facilitating one or more context-dependent offers (e.g., when the device is at a restaurant, a steak evaluation service, and when at a bar, a drink evaluation service, and when at a shopping mall, a list of close restaurants) to provide one or more services (e.g., see previous) at particular times at least partly based on the monitored one or more properties (e.g., location).

Referring again to FIG. 6D, operation 658 may include operation 660 depicting receiving permission to monitor one or more properties of the device configured to carry out one or more services in return for facilitating one or more offers to provide one or more services at particular times, said one or more offers for one or more services calculated to likely be accepted at a time of the one or more offers, based on the monitored one or more properties. For example, FIG. 2, e.g., FIG. 2D, shows permission to observe one or more attributes of a device configured to execute one or more services acquiring in response to facilitating one or more offers for one or more services calculated, at least partly using on the observed one or more attributes, to likely be accepted to the device module 260 receiving permission to monitor one or more properties of the device configured to carry out one or more services e.g., a common web page caching and updating service for offline and/or faster reading) in return for facilitating one or more offers to provide one or more services (e.g., internet browsing based services) at particular times (e.g., after a user has visited a same website a particular number of times, indicating that the user may be bored of browsing), said one or more offers for one or more services calculated to be likely to be accepted at a time of the one or more offers (e.g., see previously, the offers are timed for when the user appears to be bored and may accept offers for new content delivery), based on the monitored one or more properties (e.g., web browser usage on a personal device).

Figure 6E:
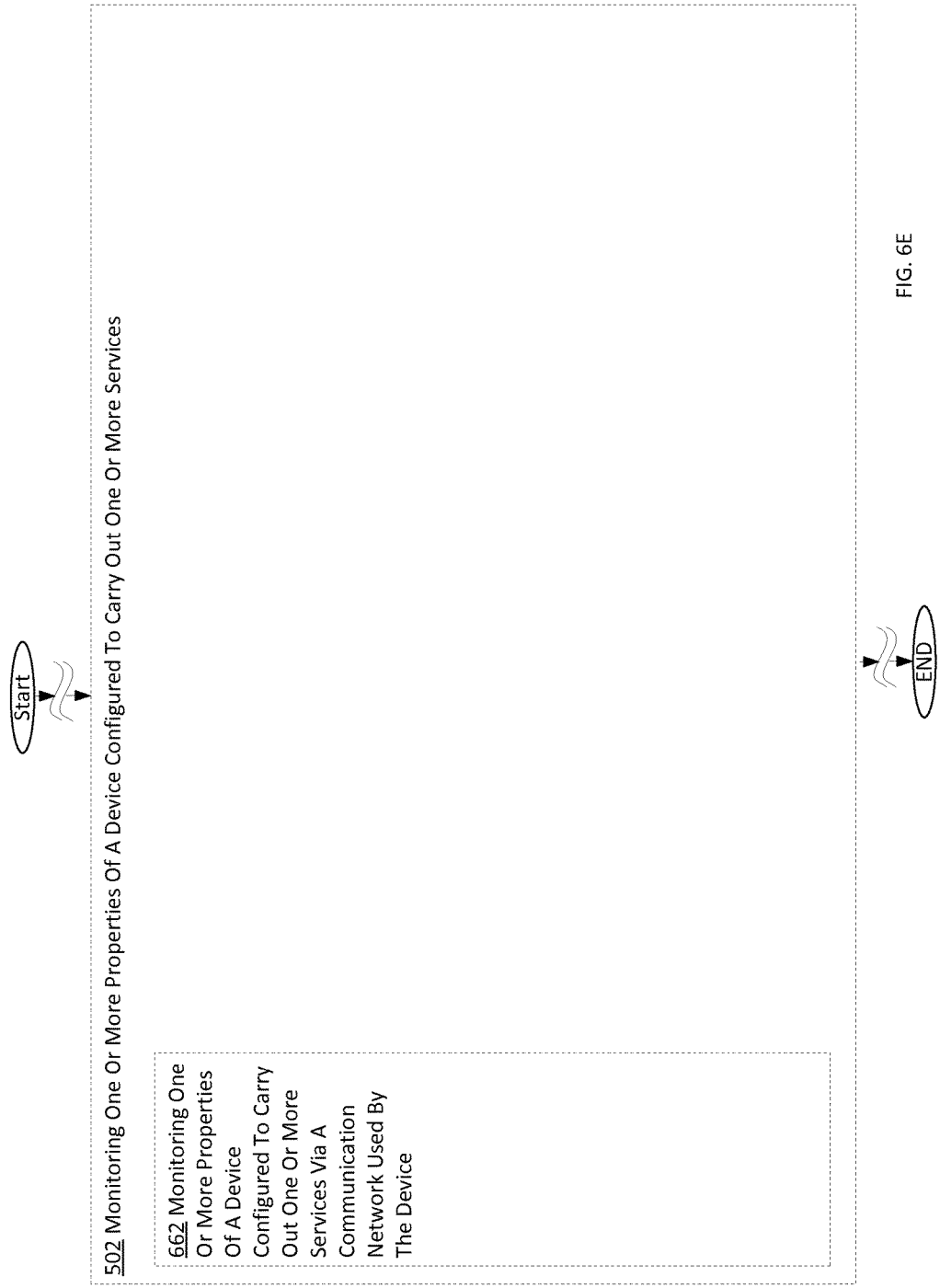
FIG. 6E is a high-level logic flow chart of a process depicting alternate implementations of a monitoring one or more device properties operation 502, according to one or more embodiments.

Referring now to FIG. 6E, operation 502 may include operation 662 depicting monitoring one or more properties of a device configured to carry out one or more services via a communication network used by the device. For example, FIG. 2, e.g., FIG. 2E, shows one or more attributes of a device configured to execute one or more services observing via a communication network over which the device has transmitted and/or received data module 262 monitoring one or more properties of a device configured to carry out one or more services via a communication network (e.g., the monitoring is of the communication network, which may happen as data is transmitted across the communication network, which may be a small, private network (e.g., an enterprise network at a corporation) or a large-scale network (e.g., a 4G cellular network used by many disparate devices) used by the device (e.g., a tablet device with 4 G communication network access enabled).

Figure 7A:
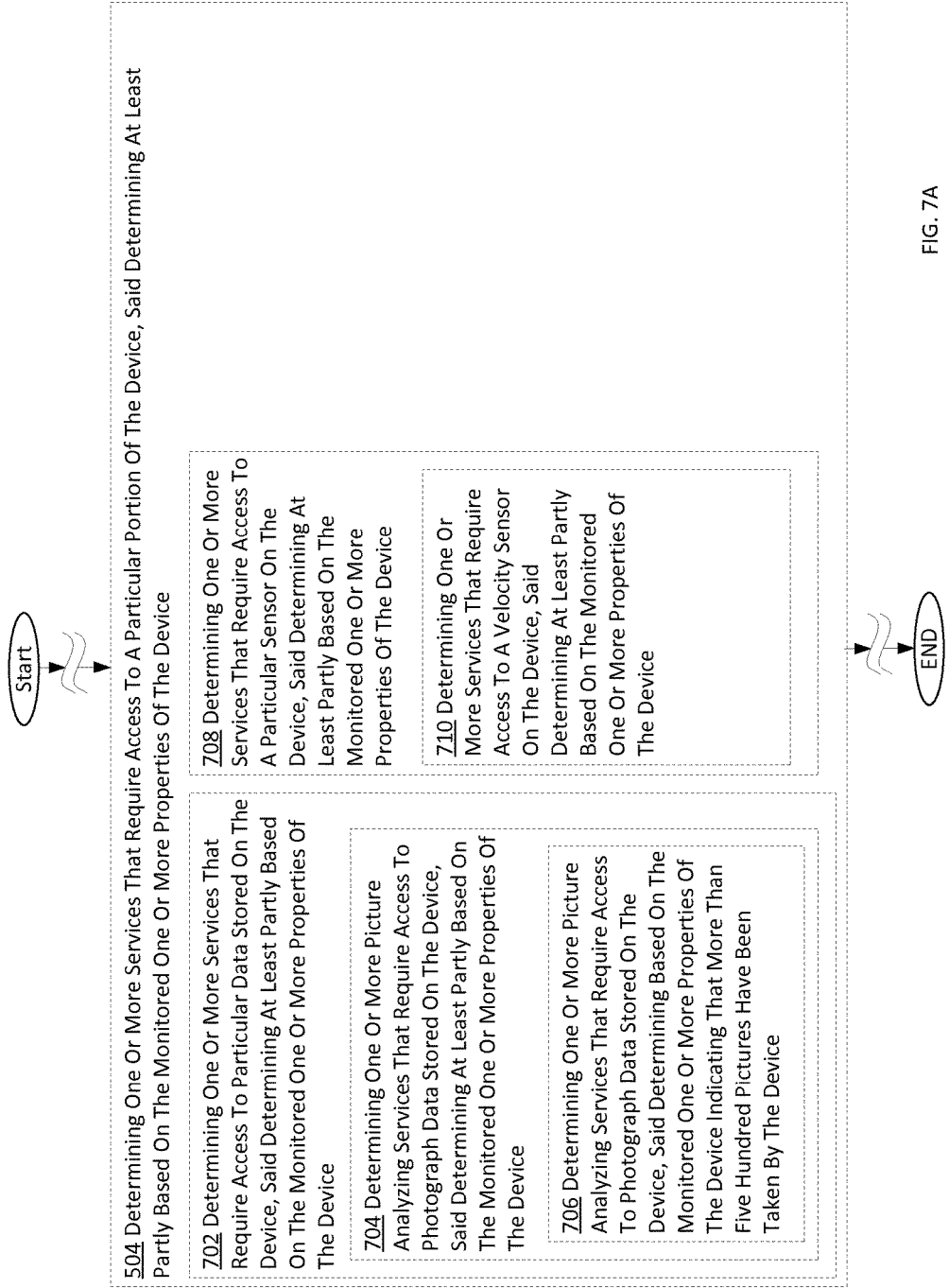
FIG. 7A is a high-level logic flow chart of a process depicting alternate implementations of a determining one or more services operation 504, according to one or more embodiments.

FIGS. 7A-7F depict various implementations of operation 504, depicting determining one or more services that require access to a particular portion of the device, said determining at least partly based on the monitored one or more properties of the device, according to embodiments. Referring now to FIG. 7A, operation 504 may include operation 702 depicting determining one or more services that require access to particular data stored on the device, said determining at least partly based on the monitored one or more properties of the device. For example, FIG. 3, e.g., FIG. 3A, shows service that requires access to particular data under control of the device for execution determining at least partly based on the one or more observed attributes module 302 determining one or more services e.g., an application that collects concert information and selects concerts a user of a device might be interested in, based on music listened to by a user of a device, e.g., a media player, or a device that includes a media player) that require access to particular data (e.g., the frequency with which the songs are played on a device), said determining at least partly based on the monitored one or more properties (e.g., audio data being sent to the audio-out port of a device) of the device (e.g., a device with an audio-out portion).

Referring again to FIG. 7A, operation 702 may include operation 704 depicting determining one or more picture analyzing services that require access to photograph data stored on the device, said determining at least partly based on the monitored one or more properties of the device. For example, FIG. 3, e.g., FIG. 3A, shows picture analyzing service that requires access to image data under control of the device for execution determining at least partly based on the one or more observed attributes module 304 determining one or more picture analyzing services that require access to photograph data stored on the device, said determining at least partly based on the monitored one or more properties of the device (e.g, a camera with a wireless internet connection).

Referring again to FIG. 7A, operation 704 may include operation 706 depicting determining one or more picture analyzing services that require access to photograph data stored on the device, said determining based on the monitored one or more properties of the device indicating that more than five hundred pictures have been taken by the device. For example, FIG. 3, e.g., FIG. 3A, shows picture analyzing service that requires access to image data under control of the device for execution determining at least partly based on the one or more observed attributes indicating that more than five hundred images are stored on the device module 306 determining one or more picture analyzing services that require access to photograph data stored on the device, said determining based on the monitored one or more properties of the device indicating that more than five hundred pictures have been taken by the device (e.g., a tablet device with a camera attachment).

Referring again to FIG. 7A, operation 504 may include operation 708 depicting determining one or more services that require access to a particular sensor on the device, said determining at least partly based on the monitored one or more properties of the device. For example, FIG. 3, e.g., FIG. 3A, shows service that requires access to a particular sensor of the device for execution determining at least partly based on the one or more observed attributes module 308 determining one or more services (e.g., a friend-finding service) that require access to a particular sensor (e.g., a positioning sensor) on the device (e.g., a tablet device running a program with a contact list management system, e.g., Microsoft Outlook), said determining at least partly based on the monitored one or more properties (e.g., the size of the contact list, e.g., the number of entries) of the device (e.g., the tablet device).

Referring again to FIG. 7A, operation 708 may include operation 710 depicting determining one or more services that require access to a velocity sensor on the device, said determining at least partly based on the monitored one or more properties of the device. For example, FIG. 3, e.g., FIG. 3A, shows service that requires access to a velocity sensor of the device for execution determining at least partly based on the one or more observed attributes module 310 determining one or more services (e.g., a driver safety evaluation service, e.g., for use by parents turning over their vehicles to new drivers, e.g., their children) that require access to a velocity sensor on the device (e.g., a portable navigation system that can be mounted to a car windshield), said determining at least partly based on the monitored one or more properties (e.g., a velocity that spikes back and forth that possibly may indicate an inexperienced driver) of the device (e.g., the portable navigation system).

Figure 7B:
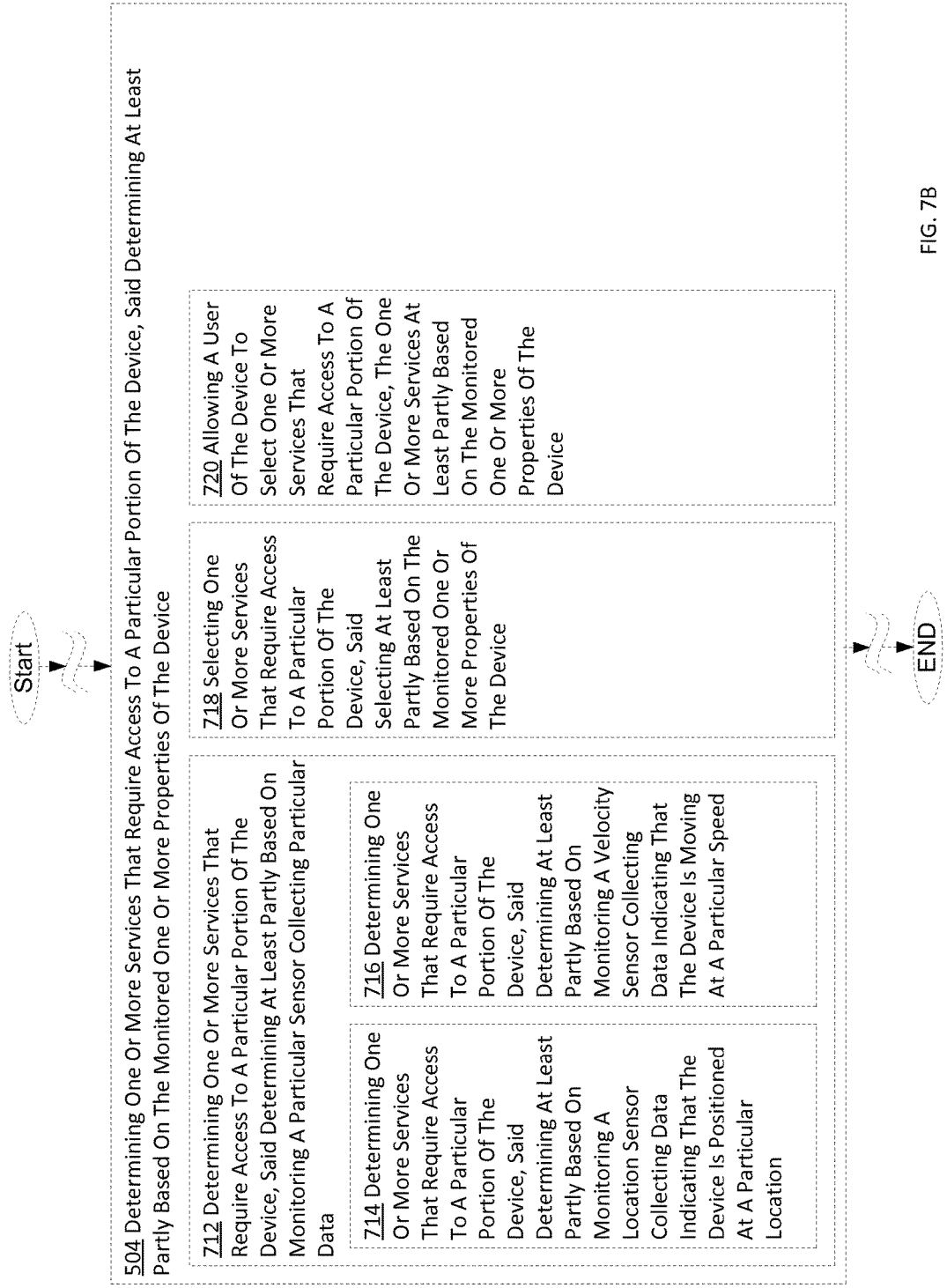
FIG. 7B is a high-level logic flow chart of a process depicting alternate implementations of a determining one or more services operation 504, according to one or more embodiments.

Referring now to FIG. 7B, operation 504 may include operation 712 depicting determining one or more services that require access to a particular portion of the device, said determining at least partly based on monitoring a particular sensor collecting particular data. For example, FIG. 3, e.g., FIG. 3A, shows service that requires access to a particular portion of the device for execution determining at least partly based on one or more observed particular sensors of the device module 312 determining one or more services (e.g., a hiking trail status tracking application that tracks a usability of a particular hiking trail in the current climate conditions) that require access to a particular portion of the device (e.g., the weather-detecting sensors and programs to control them on a device, e.g., a temperature sensor, a barometric pressure sensor, and the control software for each, loaded on a smartphone), said determining at least partly based on monitoring a particular sensor (e.g., a barometric pressure sensor) collecting particular data (e.g., that the barometric pressure is dropping rapidly, possibly indicating an imminent drastic weather change). It is noted that the particular sensor may not be a part of the particular portion of the device, in some embodiments.

Referring again to FIG. 7B, operation 712 may include operation 714 depicting determining one or more services that require access to a particular portion of the device, said determining at least partly based on monitoring a location sensor collecting data indicating that the device is positioned at a particular location. For example, FIG. 3, e.g., FIG. 3B, shows service that requires access to a particular portion of the device for execution determining at least partly based on one or more observed position sensors indicating a particular position of the device module 314 determining one or more services that require access to a particular portion of the device (e.g., an ambient light sensor, e.g., which may be the same as an image capturing sensor, or it may be separate in a more picture-taking oriented device, e.g., a digital SLR camera with a wireless internet connection), said determining at least partly based on monitoring a location sensor collecting data indicating that the device is positioned at a particular location (e.g., near to a landmark, or near to a celebrity sighting). A further example may be a "good picture" service that monitors weather and light conditions at the device location and prompts when the service thinks there is a possiblitliy of a good picture of a landmark or other point of interest.

Referring again to FIG. 7B, operation 712 may include operation 716 depicting determining one or more services that require access to a particular portion of the device, said determining at least partly based on monitoring a velocity sensor collecting data indicating that the device is moving at a particular speed. For example, FIG. 3, e.g., FIG. 3B, shows service that requires access to a particular portion of the device for execution determining at least partly based on one or more observed velocity sensors indicating a particular speed of the device module 316 determining one or more services e.g., a bicycling trail information and status tracking application) that require access to a particular portion (e.g., position information), said determining at least partly based on monitoring a velocity sensor collecting data indicating that the device is moving at a particular speed (e.g., speed that gives the appearance that the device is being moved by a bicycle).

Referring again to FIG. 7B, operation 504 may include operation 718 depicting selecting one or more services that require access to a particular portion of the device, said selecting at least partly based on the monitored one or more properties of the device. For example, FIG. 3, e.g., FIG. 3B, shows service that requires access to a particular portion of the device for execution selecting at least partly based on the one or more observed attributes module 318 selecting one or more services (e.g., an offer to provide a download for an application for organizing pictures) that require access to a particular portion of the device (e.g., the portion of the data that stores pictures, e.g., which in some embodiments, may be removable media, e.g., an SD card), said selecting at least partly based on the monitored one or more properties of the device (e.g., an amount of available memory on a wireless-equipped camera).

Referring again to FIG. 7B, operation 504 may include operation 720 depicting allowing a user of the device to select one or more services that require access to a particular portion of the device, the one or more services at least partly based on the monitored one or more properties of the device. For example, FIG. 3, e.g., FIG. 3, shows service that requires access to a particular portion of the device for execution selecting at least partly based on a device user input and at least partly based on the one or more observed attributes module 320 allowing a user of the device (e.g., a tablet device) to select one or more services that require access to a particular portion of the device, the one or more services (e.g., a rest stop finding service) at least partly based on the monitored one or more properties (e.g., monitoring that the device is in a new location that it has not been at in the last ninety days, and velocity information indicating that the device is traveling over sixty miles per hour, which may indicate that the user is driving to a new location).

Figure 7C:
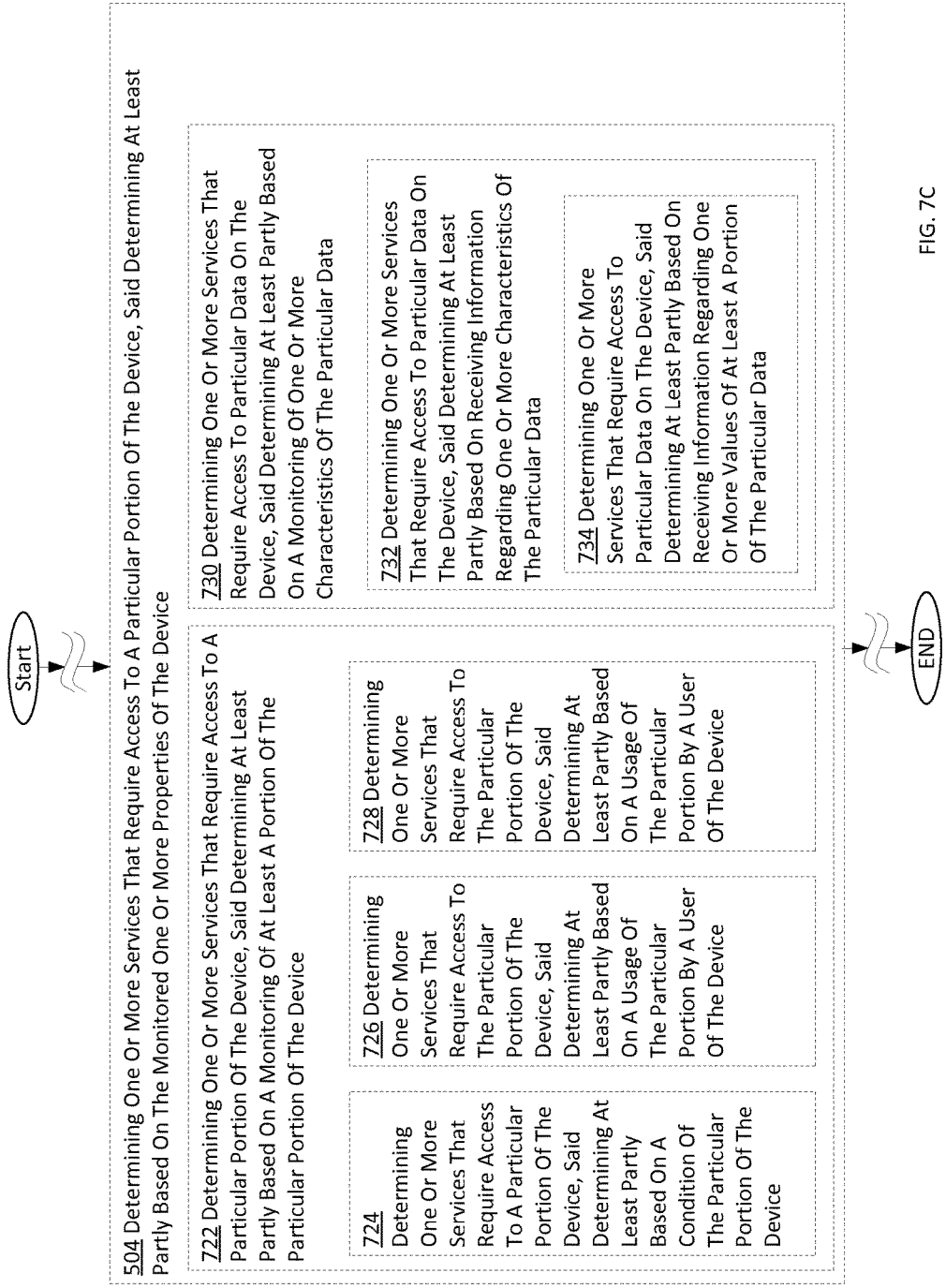
FIG. 7C is a high-level logic flow chart of a process depicting alternate implementations of a determining one or more services operation 504, according to one or more embodiments.

Referring now to FIG. 7C, operation 504 may include operation 722 depicting determining one or more services that require access to a particular portion of the device, said determining at least partly based on a monitoring of at least a portion of the particular portion of the device. For example, FIG. 3, e.g., FIG. 3C, shows service that requires access to a particular portion of the device for execution determining at least partly based on the one or more observed attributes of the particular portion module 322 determining one or more services (e.g., a new music finding service) that require access to a particular portion of the device (e.g., that require access to an input portion of the device to see which songs the user skips past when the songs are played randomly), said determining at least partly based on a monitoring of at least a portion (e.g., the input control portion, e.g., a touchscreen of a tablet device) of the particular portion (e.g., music playing logic, including the input portion and the output portion (e.g., a speaker) of the device (e.g., a tablet device that can play music).

Referring again to FIG. 7C, operation 722 may include operation 724 depicting determining one or more services that require access to a particular portion of the device, said determining at least partly based on a condition of the particular portion of the device. For example, FIG. 3, e.g., FIG. 3C, shows service that requires access to a particular portion of the device for execution determining at least partly based on an observed state of the particular portion module 324 determining one or more services (e.g., a soda pop vending machine locating service) that require access to a particular portion (e.g., temperature data (e.g., people may not want soda pop when it is twenty degrees outside), of the device, said determining at least partly based on a condition (e.g., detecting hot temperatures) of the particular portion (e.g., a temperature gauge) of the device.

Referring again to FIG. 7C, operation 722 may include operation 726 depicting determining one or more services that require access to the particular portion of the device, said determining at least partly based on a usage of the particular portion by a user of the device. For example, FIG. 3, e.g., FIG. 3C, shows service that requires access to a particular portion of the device for execution determining at least partly based on an observed usage of the particular portion module 326 determining one or more services (e.g., a pickup football game scheduler that compares friends' locations and schedules) that require access to the particular portion of the device (e.g., a telephone number contact list stored on a smartphone), said determining at least partly based on a usage of the particular portion (e.g., when the user starts making lots of phone calls to particular persons in the user's contact list) by a user of the device (e.g., a cellular telephone).

Referring again to FIG. 7C, operation 722 may include operation 728 depicting determining one or more services that require access to a particular sensor of the device, said determining at least partly based on a condition detected by the particular sensor of the device. For example, FIG. 3, e.g., FIG. 3C, shows service that requires access to a particular portion of the device for execution determining at least partly based on an observed condition detected by a particular sensor module 328 determining one or more services (e.g., tracking an employee's use of their time in order to boost efficiency) that require access to a particular sensor (e.g., a monitoring application that is resident in a computer's memory, whether part of the operating system or installed separately), said determining at least partly based on a condition (e.g., more than ten applications opened at once) detected by the particular sensor (e.g., the monitoring application) of the device (e.g., a computer in an enterprise corporate environment).

Referring again to FIG. 7C, operation 504 may include operation 730 depicting determining one or more services that require access to particular data on the device, said determining at least partly based on a monitoring of one or more traits of the particular data. For example, FIG. 3, e.g., FIG. 3C, shows service that requires access to particular data of the device for execution determining at least partly based on one or more observed attributes of the particular data module 330 determining one or more services (e.g., an optimal workout designing service) that require access to particular data on the device (e.g., a smartphone), said determining at least partly based on a monitoring of one or more traits (e.g., the heart rate is not consistently kept at optimal levels, perhaps indicating an inefficient workout) of the particular data (e.g., heart rate data).

Referring again to FIG. 7C, operation 730 may include operation 732 depicting determining one or more services that require access to particular data on the device, said determining at least partly based on receiving information regarding one or more characteristics of the particular data. For example, FIG. 3, e.g., FIG. 3C, shows service that requires access to particular data of the device for execution determining at least partly based on received information regarding one or more attributes of the particular data module 322 determining one or more services (e.g., a steak dinner finding service) that require access to particular data (e.g., the GPS sensor that shows the user's current location) of the device (e.g., a user's smartphone), said determining at least partly based on receiving information (e.g., information about how long the position has remained substantially unchanged) regarding one or more characteristics of the particular data (e.g., location data).

Referring again to FIG. 7C, operation 732 may include operation 734 depicting determining one or more services that require access to particular data on the device, said determining at least partly based on receiving information regarding one or more values of at least a portion of the particular data. For example, FIG. 3, e.g., FIG. 3C, shows service that requires access to particular data of the device for execution determining at least partly based on received information regarding one or more values of at least a portion of the particular data module 334 determining one or more services (e.g., the ideal garden planting time calculating service) that require access to particular data (e.g., humidity data) on the device (e.g., a smartphone), said determining at least partly based on receiving information regarding one or more values (e.g., rising humidity) of at least a portion of the particular data (e.g., the humidity data is a portion of the particular data, which also includes temperature data and barometric pressure data).

Figure 7D:
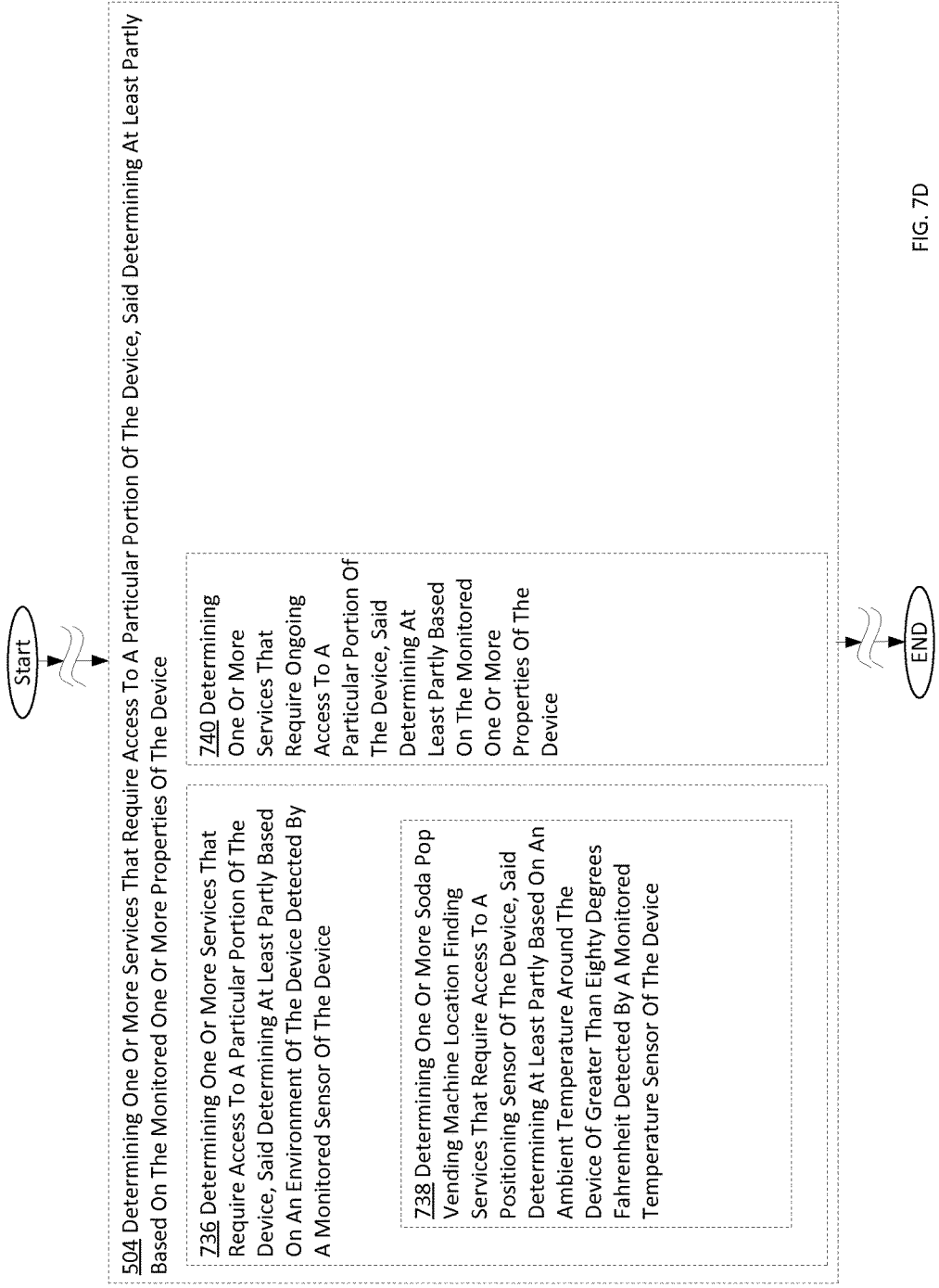
FIG. 7D is a high-level logic flow chart of a process depicting alternate implementations of a determining one or more services operation 504, according to one or more embodiments.

Referring now to FIG. 7D, operation 504 may include operation 736 depicting determining one or more services that require access to a particular portion of the device, said determining at least partly based on an environment of the device detected by a monitored sensor of the device. For example, FIG. 3, e.g., FIG. 3D, shows service that requires access to a particular portion of the device for execution determining at least partly based on an environment of the device attribute as detected by an observed sensor of the device module 336 determining one or more services (e.g., displaying a rule book for a sport or game being played in the proximity of the device) that require access to a particular portion of the device (e.g., a location, to determine what sporting events are in the immediate proximity), said determining at least partly based on an environment (e.g., the surrounding conditions, e.g., is there a game going on, and is the device located in the proximity of the game) of the device detected by a monitored sensor (e.g., the positioning sensor) of the device (e.g., a user's smartphone device).

Referring again to FIG. 7D, operation 504 may include operation 738 depicting determining one or more soda pop vending machine location finding services that require access to a positioning sensor of the device, said determining at least partly based on an ambient temperature around the device of greater than eighty degrees Fahrenheit detected by a monitored temperature sensor of the device. For example, FIG. 3, e.g., FIG. 3D, shows soda pop vending machine location finding service that requires access to a positioning sensor of the device for execution determining at least partly based on an ambient temperature surrounding the device as detected by an observed temperature sensor of the device module 338 determining one or more soda pop vending machine location finding services that require access to a positioning sensor of the device, said determining at least partly based on an ambient temperature around the device of greater than eighty degrees Fahrenheit detected by a monitored temperature sensor of the device.

Referring again to FIG. 7D, operation 504 may include operation determining one or more services that require ongoing access to a particular portion of the device, said determining at least partly based on the monitored one or more properties of the device. For example, FIG. 3, e.g., FIG. 3D, shows service that requires ongoing access to a particular portion of the device for execution determining at least partly based on the one or more observed attributes module 340 determining one or more services (e.g., calorie counting services) that require ongoing access to a particular portion (e.g., food consumed data entered into the device and stored remotely, e.g., on a web blog), of the device, said determining at least partly based on the monitored one or more properties of the device (e.g., the data stored on the device indicates that the user is consuming too many calories).

Figure 8A:
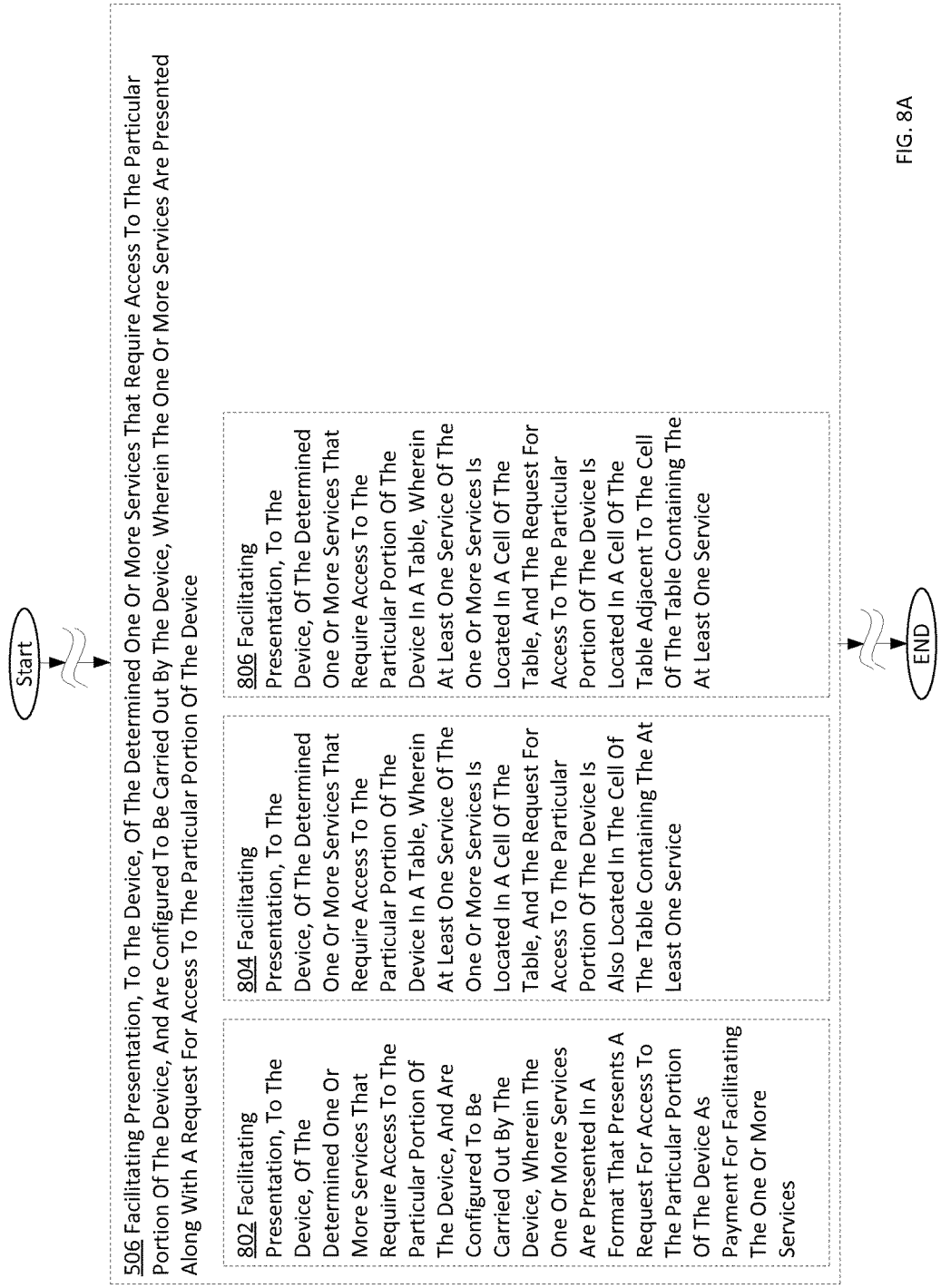
FIG. 8A is a high-level logic flow chart of a process depicting alternate implementations of a facilitating presentation operation 506, according to one or more embodiments.
Figure 8C:
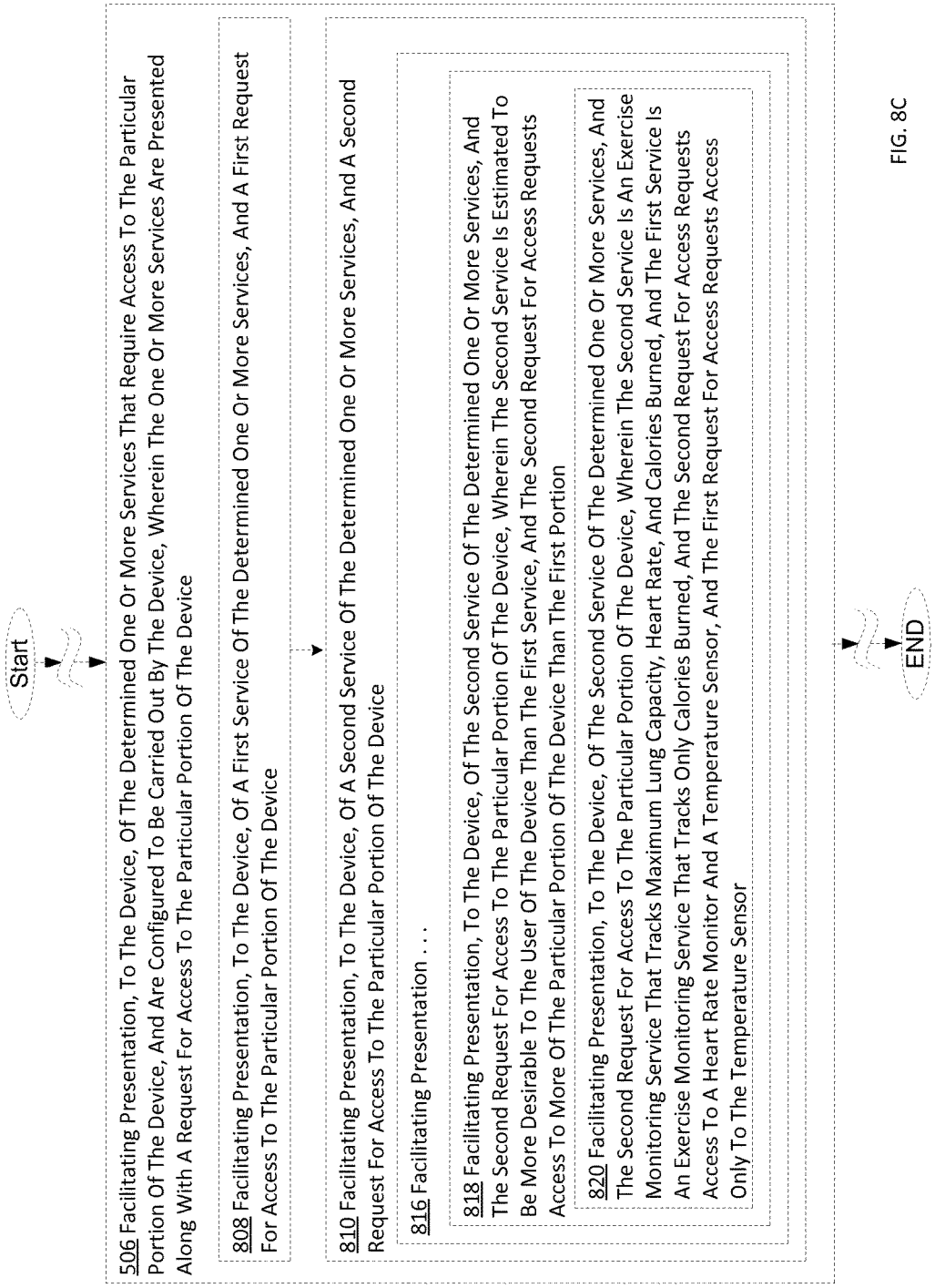
FIG. 8C is a high-level logic flow chart of a process depicting alternate implementations of a facilitating presentation operation 506, according to one or more embodiments.
Figure 8D:
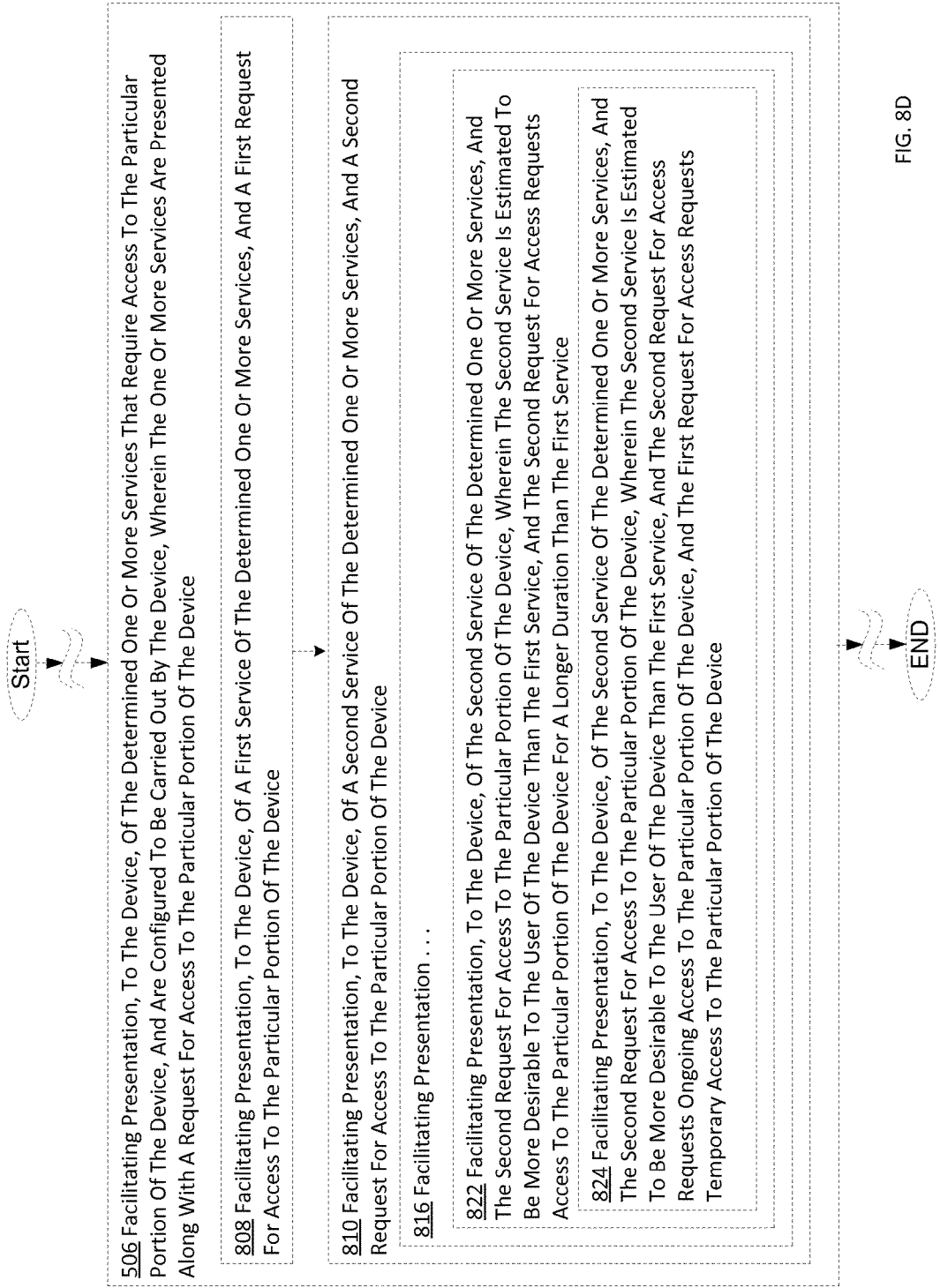
FIG. 8D is a high-level logic flow chart of a process depicting alternate implementations of a facilitating presentation operation 506, according to one or more embodiments.

FIGS. 8A-8C depict various implementations of operation 506 depicting facilitating presentation, to the device, of the determined one or more services that require access to the particular portion of the device, and are configured to be carried out by the device, wherein the one or more services are presented along with a request for access to the particular portion of the device, according to embodiments. Referring now to FIG. 8A, operation 506 may include operation 802 depicting facilitating presentation, to the device, of the determined one or more services that require access to the particular portion of the device, and are configured to be carried out by the device, wherein the one or more services are presented in a format that presents a request for access to the particular portion of the device as payment for facilitating the one or more services. For example, FIG. 4, e.g., FIG. 4A, shows determined service that is configured to be carried out on the device at least in part by accessing the particular portion of the device, and request for access to the device particular portion at least to facilitate carrying out the service as payment for facilitating carrying out the service device presentation facilitating module 402 facilitating presentation, to the device, of the determined one or more services that require access to the particular portion of the device, and are configured to be carried out by the device, wherein the one or more services are presented in a format that presents a request for access to the particular portion of the device as payment (e.g., remuneration, e.g., in this example, in lieu of cash or cash equivalents) for facilitating the one or more services (e.g., a service for managing data transfer over a tablet that has wireless and cellular connections).

Referring again to FIG. 8A, operation 506 may include operation 804 depicting facilitating presentation, to the device, of the determined one or more services that require access to the particular portion of the device in a table, wherein at least one service of the one or more services is located in a cell of the table, and the request for access to the particular portion of the device is also located in the cell of the table containing the at least one service. For example, FIG. 4, e.g., FIG. 4A, shows determined service that is configured to be carried out on the device at least in part by accessing the particular portion of the device and request for access to the device particular portion at least to facilitate carrying out the service device presentation of the determined service and the request for access in a cell of a table of one or more services facilitating module 404 facilitating presentation, to the device, of the determined one or more services that require access to the particular portion of the device in a table, wherein at least one service of the one or more services is located in a cell of the table, and the request for access to the particular portion of the device is also located in the cell of the table containing the at least one service. It is noted here that the table does not have to be visible, or aligned, or even specifically defined. For the purposes of this application "table" merely refers to an arrangement of one or more items that is visually or audially consistent when presented, e.g., displayed. Two services and the request for access that are side by side, for example, would be a table, as would three services and three requests for access arranged in a pyramid formation. The table does not need to be uniform or contain equal numbers or sizes of rows and/or columns, or even to have specifically defined rows and columns. In some embodiments, not every service that is visually presented is necessarily visually presented in the table. In some embodiments, a single service and a request for access may form a table, e.g., a table of one.

Referring again to FIG. 8A, operation 506 may include operation 806 depicting facilitating presentation, to the device, of the determined one or more services that require access to the particular portion of the device in a table, wherein at least one service of the one or more services is located in a cell of the table, and the request for access to the particular portion of the device is located in a cell of the table adjacent to the cell of the table containing the at least one service. For example, FIG. 4, e.g., FIG. 4A, shows determined service that is configured to be carried out on the device at least in part by accessing the particular portion of the device and request for access to the device particular portion at least to facilitate carrying out the service device presentation of the determined service a cell of a table and the request for access in an adjacent cell of the table facilitating module 404 facilitating presentation, to the device, of the determined one or more services (e.g., the alternative health-food finding service) that require access to the particular portion of the device (e.g., an updating inventory of what is in the refrigerator that is stored and maintained on the device, e.g., a smart appliance, e.g., a smart refrigerator in a user's house) in a table, wherein at least one service of the one or more services is located in a cell of the table, and the request for access to the particular portion of the device (e.g., access to the updating inventory) is located in a cell of the table adjacent to the cell of the table containing the at least one service (e.g., an alternative health-food finding service).

Referring now to FIG. 8B, operation 506 may include operation 808 depicting facilitating presentation, to the device, of a first service of the determined one or more services, and a first request for access to the particular portion of the device. For example, FIG. 4, e.g., FIG. 4B, shows first determined service that is configured to be carried out on the device at least in part by accessing the particular portion of the device and first request for access to the device particular portion at least to facilitate carrying out the service device presentation facilitating module 408 facilitating presentation, to the device (e.g., to a tablet device), of a first service (e.g., a service identifying which grocery store has the freshest inventory of blackberries) of the determined one or more services, and a first request for access (e.g., access for the next hour to a location within two miles) to the particular portion of the device (e.g., the tablet device)

Referring again to FIG. 8B, operation 506 may include operation 810 depicting facilitating presentation, to the device, of a second service of the determined one or more services, and a second request for access to the particular portion of the device. For example, FIG. 4, e.g., FIG. 4B, shows second determined service that is configured to be carried out on the device at least in part by accessing the particular portion of the device and second request for access to the device particular portion at least to facilitate carrying out the service device presentation facilitating module 410 facilitating presentation, to the device, of a second service (e.g., a healthy, locally-grown ingredient health food meal planner service) of the determined one or more services, and a second request for access to the particular portion (e.g., twenty four hours access to the device location within 20 meters).

Referring again to FIG. 8B, operation 410 may include operation 812 depicting facilitating presentation, to the device, of the second service of the determined one or more services, and the second request for access to the particular portion of the device, wherein the second service has one or more additional features that are absent from the first service. For example, FIG. 4, e.g., FIG. 4B, shows second determined service that has one or more additional features not present in the first service, and second request for access to the device particular portion at least to facilitate carrying out the service device presentation facilitating module 412 facilitating presentation, to the device, of the second service of the determined one or more services, and the second request for access to the particular portion of the device, wherein the second service has one or more additional features (e.g., in addition to sorting pictures, which is the first service, the second service sorts the pictures and tags them according to facial recognition and geotagging) that are absent from the first service (e.g., merely sorting pictures).

Referring again to FIG. 8B, operation 810 may include operation 814 depicting facilitating presentation, to the device, of the second service of the determined one or more services, and the second request for access to the particular portion of the device, wherein the second service is estimated to be more desirable to a user of the device than the first service. For example, FIG. 4, e.g., FIG. 4B, shows second determined service that is estimated to be more desirable to one or more users of a device than the first service, and second request for access to the device particular portion at least to facilitate carrying out the service device presentation facilitating module 414 facilitating presentation, to the device, of the second service (e.g., a friend-finding service that targets members of the opposite sex than the user and within ten years of the user's age) of the determined one or more services, and the second request for access to the particular portion of the device, wherein the second service is estimated to be more desirable to a user of the device than the first service (e.g., a generic friend-finding service that does not discriminate by gender and age).

Referring again to FIG. 8B, operation 810 may include operation 816 depicting facilitating presentation, to the device, of the second service of the determined one or more services, and the second request for access to the particular portion of the device, wherein the second service is estimated to be more desirable to a user of the device than the first service, and the second request for access requests more access to the particular portion of the device than the first request for access. For example, FIG. 4, e.g., FIG. 4B, shows second determined service that is estimated to be more desirable to one or more users of a device than the first service and the second request for access to the device particular portion that requests more access to the particular portion of the device than the first request for access to facilitate carrying out the service device presentation facilitating module 416 facilitating presentation, to the device, of the second service of the determined one or more services, and the second request for access to the particular portion of the device, wherein the second service is estimated to be more desirable to a user of the device than the first service, and the second request for access requests more access (e.g., more data, or more specific data, or more parts (e.g., more sensors), or more time, or more privileges (e.g., to sell or otherwise distribute the data), or any combination thereof) to the particular portion of the device than the first request for access Referring now to FIG. 8C, operation 816 may include operation 818 depicting facilitating presentation, to the device, of the second service of the determined one or more services, and the second request for access to the particular portion of the device, wherein the second service is estimated to be more desirable to the user of the device than the first service, and the second request for access requests access to more of the particular portion of the device than the first portion. For example, FIG. 4, e.g., FIG. 4C, shows second determined service that is estimated to be more desirable to one or more users of a device than the first service and the second request for access to the device particular portion that requests access to more of the particular portion of the device than the first request to facilitate carrying out the service device presentation facilitating module 418 facilitating presentation, to the device, of the second service of the determined one or more services, and the second request for access to the particular portion of the device, wherein the second service is estimated to be more desirable to the user of the device than the first service, and the second request for access requests access to more (e.g., more data, or more specific data, or more parts (e.g., more sensors), or more time, or more privileges (e.g., to sell or otherwise distribute the data), or any combination thereof) of the particular portion of the device than the first portion.

Referring again to FIG. 8C, operation 818 may include operation 820 depicting facilitating presentation, to the device, of the second service of the determined one or more services, and the second request for access to the particular portion of the device, wherein the second service is an exercise monitoring service that tracks maximum lung capacity, heart rate, and calories burned, and the first service is an exercise monitoring service that tracks only calories burned, and the second request for access requests access to a heart rate monitor and a temperature sensor, and the first request for access requests access only to the temperature sensor. For example, FIG. 4, e.g., FIG. 4C, shows second exercise monitoring service that tracks three user factors compared to two user factors tracked by the first service and the second request for access requests access to three sensors of the device particular portion compared to the first request that requests access to two sensors of the device particular portion to facilitate carrying out the service device presentation facilitating module 420 facilitating presentation, to the device (e.g., an exercise assistance device, e.g., that is worn around the wrist like a watch), of the second service of the determined one or more services, and the second request for access to the particular portion of the device, wherein the second service is an exercise monitoring service that tracks maximum lung capacity, heart rate, and calories burned, and the first service is an exercise monitoring service that tracks only calories burned, and the second request for access requests access to a heart rate monitor and a temperature sensor, and the first request for access requests access only to the temperature sensor Referring now to FIG. 8D, operation 816 may include operation 822 depicting facilitating presentation, to the device, of the second service of the determined one or more services, and the second request for access to the particular portion of the device, wherein the second service is estimated to be more desirable to the user of the device than the first service, and the second request for access requests access to the particular portion of the device for a longer duration than the first service. For example, FIG. 4, e.g., FIG. 4D, shows second determined service that is estimated to be more desirable to one or more users of a device than the first service and the second request for access to the device particular portion that requests access to the particular portion of the device for a longer duration than the first request for access to facilitate carrying out the service device presentation facilitating module 422 facilitation presentation, to the device, of the second service (e.g., a rest stop planning service) of the determined one or more services, and the second request for access to the particular portion of the device (e.g., access to the positioning sensor for the entire trip), wherein the second service is estimated to be more desirable to the user of the device than the first service, and the second request for access requests access to the particular portion of the device for a longer duration than the first service.

Referring again to FIG. 8D, operation 822 may include operation 824 depicting facilitating presentation, to the device, of the second service of the determined one or more services, and the second request for access to the particular portion of the device, wherein the second service is estimated to be more desirable to the user of the device than the first service, and the second request for access requests ongoing access to the particular portion of the device, and the first request for access requests temporary access to the particular portion of the device. For example, FIG. 4, e.g., FIG. 4D, shows second determined service that is estimated to be more desirable to one or more users of a device than the first service and the second request for access to the device particular portion requests ongoing access to the particular portion of the device and the first request for access requests temporary access to the particular portion of the device to facilitate carrying out the service device presentation facilitating module 424 facilitating presentation, to the device, of the second service (e.g., a picture sorting service using facial recognition techniques) of the determined one or more services, and the second request for access to the particular portion of the device (e.g., an area of memory where pictures are stored), wherein the second service is estimated to be more desirable to the user of the device than the first service (e.g., a picture sorting service using color histogram analysis, which for the purposes of example may be less accurate or less desirable way of sorting), and the second request for access requests ongoing access to the particular portion of the device (e.g., ongoing access to picture memory), and the first request for access requests temporary access (e.g., one-time access to picture memory) to the particular portion of the device.

Figure 8E:
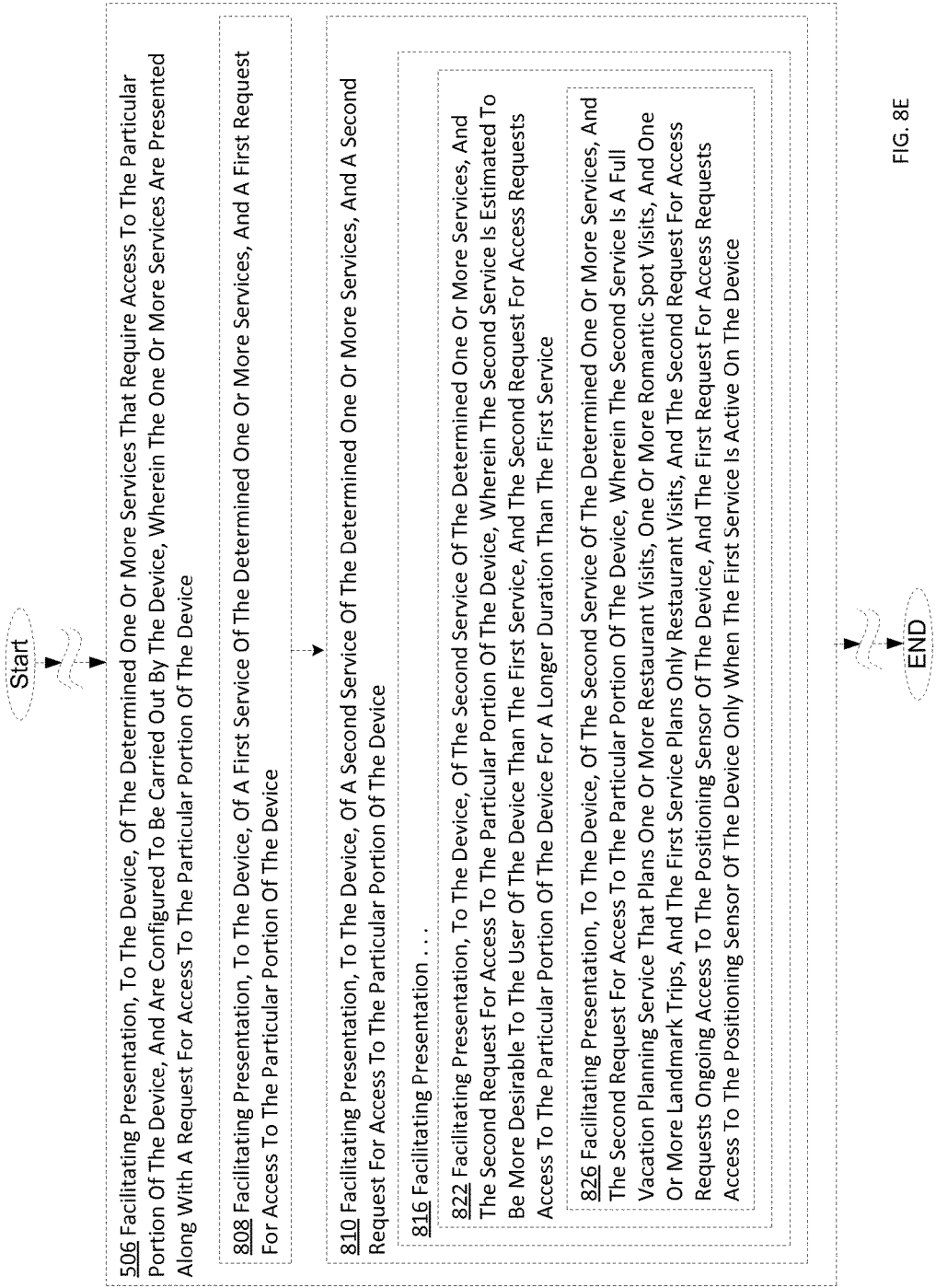
FIG. 8E is a high-level logic flow chart of a process depicting alternate implementations of a facilitating presentation operation 506, according to one or more embodiments.

Referring now to FIG. 8E, operation 822 may include operation 826 depicting facilitating presentation, to the device, of the second service of the determined one or more services, and the second request for access to the particular portion of the device, wherein the second service is a full vacation planning service that plans one or more restaurant visits, one or more romantic spot visits, and one or more landmark trips, and the first service plans only restaurant visits, and the second request for access requests ongoing access to the positioning sensor of the device, and the first request for access requests access to the positioning sensor of the device only when the first service is active on the device. For example, FIG. 4, e.g., FIG. 4E, shows second determined service that is estimated to be more desirable to one or more users of a device because it provides a wider scope of service than the first service and the second request for access to the device particular portion requests ongoing access to the particular portion of the device and the first request for access requests temporary access to the particular portion of the device to facilitate carrying out the service device presentation facilitating module 426 facilitating presentation, to the device, of the second service of the determined one or more services, and the second request for access to the particular portion of the device, wherein the second service is a full vacation planning service that plans one or more restaurant visits, one or more romantic spot visits, and one or more landmark trips, and the first service plans only restaurant visits, and the second request for access requests ongoing access to the positioning sensor of the device, and the first request for access requests access to the positioning sensor of the device only when the first service is active on the device (e.g., a smartphone).

Figure 8F:
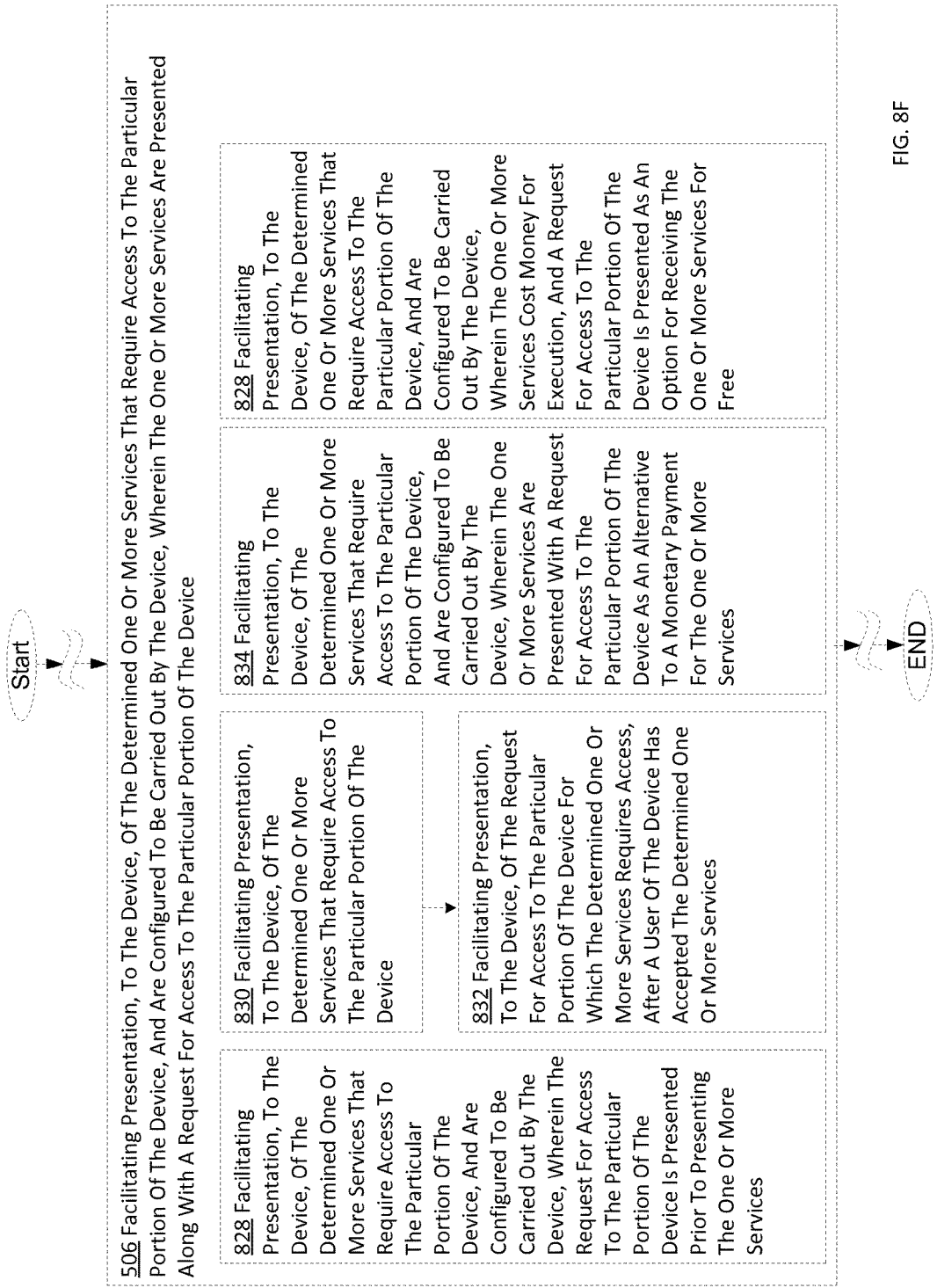
FIG. 8F is a high-level logic flow chart of a process depicting alternate implementations of a facilitating presentation operation 506, according to one or more embodiments.

Referring now to FIG. 8F, operation 506 may include operation 828 depicting facilitating presentation, to the device, of the determined one or more services that require access to the particular portion of the device, and are configured to be carried out by the device, wherein the request for access to the particular portion of the device is presented prior to presenting the one or more services. For example, FIG. 4, e.g., FIG. 4F, shows determined service that is configured to be carried out on the device at least in part by accessing the particular portion of the device and request for access to the device particular portion at least to facilitate carrying out the service device presentation of the request for access prior to the determined service facilitating module 428 facilitating presentation, to the device, of the determined one or more services (e.g., a driving habit tracking service), that require access to the particular portion of the device, and are configured to be carried out by the device, wherein the request for access to the particular portion of the device is presented prior to presenting the one or more services.

Referring again to FIG. 8F, operation 506 may include operation 830 depicting facilitating presentation, to the device, of the determined one or more services that require access to the particular portion of the device. For example, FIG. 4, e.g., FIG. 4F, shows determined service that is configured to be carried out on the device at least in part by accessing the particular portion of the device presentation facilitating module 430 facilitating presentation, to the device (e.g., a user's tablet device), of the determined one or more services (e.g., a coffee shop having fresh bagels finding service) that require access to the particular portion (e.g., a GPS sensor) of the device (e.g., a user's smartphone).

Referring again to FIG. 8F, operation 506 may include operation 832 depicting facilitating presentation, to the device, of the request for access to the particular portion of the device for which the determined one or more services requires access, after a user of the device has accepted the determined one or more services. For example, FIG. 4, e.g., FIG. 4F, shows request for access to the device particular portion at least to facilitate carrying out the service device presentation facilitating module 432 facilitating presentation, to the device, of the request for access to the particular portion of the device for which the determined one or more services (e.g., a friend finding service) requires access (e.g., a device contact list), after a user of the device has accepted the determined one or more services (e.g., after a user has agreed to install the friend finding service, and possibly, but not necessarily, before the service has been installed and/or executed).

Referring again to FIG. 8F, operation 506 may include operation 834 depicting facilitating presentation, to the device, of the determined one or more services that require access to the particular portion of the device, and are configured to be carried out by the device, wherein the one or more services are presented with a request for access to the particular portion of the device as an alternative to a monetary payment for the one or more services. For example, FIG. 4, e.g., FIG. 4F, shows determined service that is configured to be carried out on the device at least in part by accessing the particular portion of the device and request for access to the device particular portion at least to facilitate carrying out the service device that is presented as an alternative to monetary remuneration for the determined service presentation facilitating module 434 facilitating presentation, to the device, of the determined one or more services (e.g., a weather forecasting service) that require access to the particular portion of the device (e.g., a temperature sensor of a home weather station) and are configured to be carried out by the device, wherein the one or more services are presented with a request for access to the particular portion of the device as an alternative to a monetary payment for the one or more services.

Referring again to FIG. 8F, operation 506 may include operation 836 depicting facilitating presentation, to the device, of the determined one or more services that require access to the particular portion of the device, and are configured to be carried out by the device, wherein the one or more services cost money for execution, and a request for access to the particular portion of the device is presented as an option for receiving the one or more services for free. For example, FIG. 4, e.g., FIG. 4F, shows determined service that is configured to be carried out on the device at least in part by accessing the particular portion of the device and request for access to the device particular portion at least to facilitate carrying out the service device that is presented as an option for receiving the determined service for free presentation facilitating module 436 facilitating presentation, to the device (e.g., a smartphone), of the determined one or more services e.g., an application that plans stops and sights and bathroom breaks on a road trip) that require access to the particular portion of the device (e.g., location information), and are configured to be carried out by the device, wherein the one or more services cost money for execution, and a request for access to the particular portion of the device is presented as an option for receiving the one or more services for free (e.g., without cash or cash-equivalent remuneration).

Figure 8G:
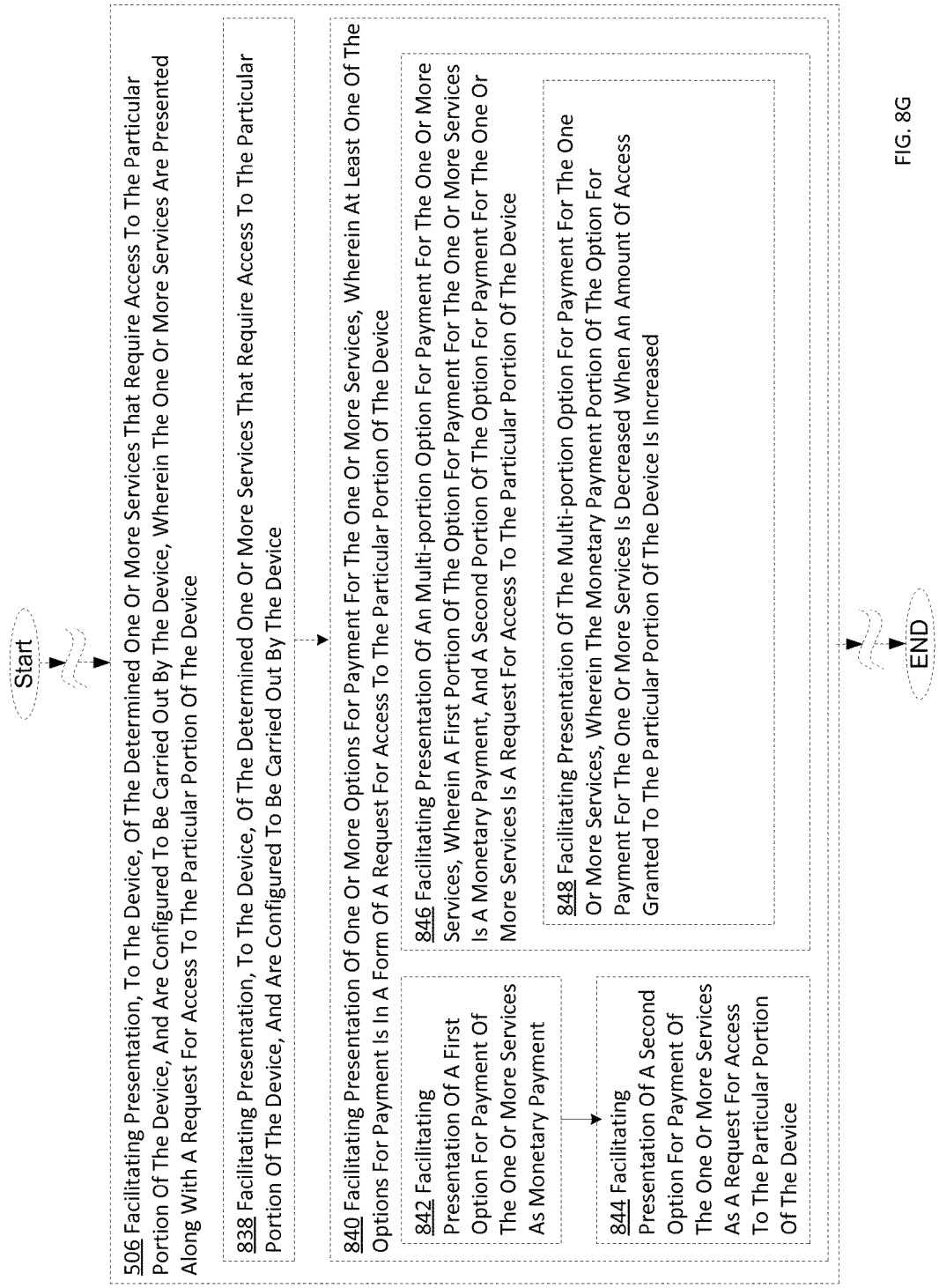
FIG. 8G is a high-level logic flow chart of a process depicting alternate implementations of a facilitating presentation operation 506, according to one or more embodiments.

Referring now to FIG. 8G, operation 506 may include operation 838 depicting facilitating presentation, to the device, of the determined one or more services that require access to the particular portion of the device, and are configured to be carried out by the device. For example, FIG. 4, e.g., FIG. 4G, shows determined service that is configured to be carried out on the device at least in part by accessing the particular portion of the device presentation facilitating module 438 facilitating presentation (e.g., displaying), to the device (e.g., an athletic training assistance body monitoring device), of the determined one or more services (e.g., an optimal workout designing service) that require access to the particular portion of the device (e.g., the health profile storage portion) of the device, and are configured to be carried out by the device (e.g., the device is configured to carry out the optimal workout designing service).

Referring again to FIG. 8G, operation 506 may include operation 840 depicting facilitating presentation of one or more options for payment for the one or more services, wherein at least one of the options for payment is in a form of a request for access to the particular portion of the device. For example, FIG. 4, e.g., FIG. 4G, shows one or more payment options presentation facilitating, including a request for access to the device particular portion as a payment option module 440 facilitating presentation of one or more options for payment (e.g., remuneration for the one or more services), wherein at least one of the options for payment is in a form of a request for access to the particular portion (e.g., a list of how many songs from each artist is stored on the device).

Referring again to FIG. 8G, operation 840 may include operation 842 depicting facilitating presentation of a first option for payment of the one or more services as monetary payment. For example, FIG. 4, e.g., FIG. 4G, shows monetary payment as one of the one or more payment options as a first payment option presentation facilitating module 442 facilitating presentation of a first option for payment for the one or more services (e.g., a music playlist creating service) as monetary payment (e.g., cash or its equivalent, e.g., credit card, check, online service, e.g., PayPal, Western Union, COD, or online currency equivalents, e.g., in-game currency for an MMO, and the like).

Referring again to FIG. 8G, operation 840 may include operation 844 depicting facilitating presentation of a second option for payment of the one or more services as a request for access to the particular portion of the device. For example, FIG. 4, e.g., FIG. 4G, shows a request for access to the device particular portion as a second payment option of the one or more payment options presentation facilitating module 444 facilitating presentation (e.g., causing a device to display, e.g., visually, audially, or through a different medium) of a second option for payment of the one or more services as a request for access to the particular portion (e.g., a list of songs stored in cloud storage that is accessible by the device) of the device (e.g., a portable music player with removable storage).

Referring again to FIG. 8G, operation 840 may include operation 846 depicting facilitating presentation of an multi-portion option for payment for the one or more services, wherein a first portion of the option for payment for the one or more services is a monetary payment, and a second portion of the option for payment for the one or more services is a request for access to the particular portion of the device. For example, FIG. 4, e.g., FIG. 4G, shows multi-portion option for payment for the one or more determined services including a first portion of the option for payment for the one or more determined services as a request for monetary remuneration and a second portion of the option for payment for the one or more services as a request for access to for particular presentation facilitating module 446 facilitating presentation (e.g., providing one or more of the steps needed to present, e.g., display, whether directly or indirectly) of the multi-portion option for payment (e.g., the payment comes in multiple, e.g., two or more, options) for the one or more services (e.g., music playlist creating service), wherein a first portion of the payment for the one or more services is a monetary payment (e.g., cash or its equivalent, e.g., credit card, check, online service, e.g., PayPal, Western Union, COD, or online currency equivalents, e.g., in-game currency for an MMO, and the like), and a second portion of the payment for the one or more services is a request for access to the particular portion (e.g., a list of songs stored on the device memory) of the device (e.g., an a/v receiver in a home that is connected to a home network that communicates with a wide-area network, e.g., the Internet).

Referring again to FIG. 8G, operation 840 may include operation 848 depicting facilitating presentation of the multi-portion option for payment for the one or more services, wherein the monetary payment portion of the option for payment for the one or more services is decreased when an amount of access granted to the particular portion of the device is increased. For example, FIG. 4, e.g., FIG. 4G, shows multi-portion option for payment for the one or more determined services including a first portion of the option for payment for the one or more determined services as a request for monetary remuneration and a second portion of the option for payment for the one or more services as a request for access to for particular presentation facilitating so that an amount of payment required in the first option decreases when more access is granted in the second option module 448 facilitating presentation (e.g., providing one or more of the steps needed to present, e.g., display, whether directly or indirectly) of the multi-portion option for payment (e.g., the payment comes in multiple, e.g., two or more, options) for the one or more services (e.g., a weather status tracking application), wherein the monetary payment portion (e.g., cash or its equivalent, e.g., credit card, check, online service, e.g., PayPal, Western Union, COD, or online currency equivalents, e.g., in-game currency for an MMO, and the like) of the option for payment for the one or more services is decreased (e.g., gets smaller, e.g., approaching zero, and in an embodiment, may include zero, or may be negative (e.g., a reverse payment, e.g., in the example of an in-game currency) when an amount of access granted to the particular portion of the device is increased.

In some embodiments, an operation may include requesting a reverse lookup table to convert previously received data into the particular data, in exchange for providing one or more of the identified one or more services. For example, a reverse lookup table may be configured to convert previously received data into particular data in exchange for providing at least part of identified service requesting module requesting a reverse lookup table (e.g., the reverse table of a table that was used to substitute identifying information for non-identifying information) to convert previously received data into the particular data, in exchange for providing one or more of the identified one or more services (e.g., a "good picture" service that monitors weather and light conditions at the device location and prompts when the service thinks there is a possibility of a good picture of a landmark or other point of interest).

In some embodiments, an operation may include identifying a service that indicates when a device is within a particular proximity to one or more particular items, said one or more services requiring access to particular data controlled by the device, wherein access to the particular data controlled by the device is managed by the device. For example, device user object proximity notification application services that are based on access to particular data that is under a device authority identifying module identifying a service that indicates when a device (e.g., a user's tablet device) is within a particular proximity (e.g., when a device is within 500 feet) to one or more particular items (e.g., a particular brand of automated teller machine device ("ATM")), said one or more services requiring access to particular data (e.g., location information regarding the device, which may be pulled directly from the sensor or stored in memory) controlled by the device (e.g., the device determines which applications get access to the positioning sensor), wherein access to the particular data (e.g., the data gathered by the positioning sensor) controlled by the device is managed by the device (e.g., in order to access the positioning sensor, an entity must be granted access by the device).

In some embodiments, an operation may include identifying one or more services configured to be provided to a user of the device, said one or more services requiring access to particular data controlled by the device, wherein transmission of the particular data controlled by the device is permitted only to one or more predetermined locations. For example, device user services providing prior user action analysis information and based on access to particular data that is transmitted only to one or more identified locations identifying module identifying one or more services (e.g., a plant-watering application that uses ambient light and a growing-plant database to determine when to water one or more plants) configured to be provided to a user of the device (e.g., a garden-aid device), said one or more services requiring access to particular data controlled by the device (e.g., a light sensor, or, in an embodiment, the image capturing sensor, which also can be used to measure the ambient light), wherein transmission of the particular data controlled by the device is permitted only to one or more predetermined locations (e.g., a plant-growing community server).

In some embodiments, an operation may include identifying one or more services configured to be provided to a user of the device, said one or more services requiring access to particular data stored on the device, wherein access to the particular data controlled by the device is managed by the device. For example, user services that are based on usage data and that are partly based on access to particular data that is controlled by the device identifying module identifying one or more services (e.g., a route-mapping service based on current conditions for outdoor enthusiasts) configured to be provided to a user of the device (e.g., a wilderness navigation unit with GPS, compass, and weather instruments), said one or more services requiring access (e.g., without this access, the service cannot be performed adequately) to particular data stored on the device (e.g., location and weather information gathered by the device sensor, and "stored" only briefly as the sensor collects it), wherein access to the particular data controlled by the device is managed by the device (e.g., the device watches how much of its data is being sampled to make predictions).

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
   circuitry configured for receiving permission to monitor a location of a device, the device configured to carry out one or more services;
   circuitry configured for monitoring the location of the device;
   circuitry configured for determining one or more of at least one light condition or at least one weather condition present at the location of the device;
   circuitry configured for determining one or more picture services requiring access to a particular portion of the device at least partly based on the circuitry configured for monitoring the location of the device and at least partly based on the circuitry configured for determining one or more of at least one light condition or at least one weather condition present at the location of the device; and circuitry configured for facilitating presentation, to the device, of the determined one or more picture services requiring access to the particular portion of the device, the presentation including at least a request for access to the particular portion of the device.

2. The system of claim 1, wherein circuitry configured for determining one or more picture services requiring access to a particular portion of the device at least partly based on the circuitry configured for monitoring the location of the device and at least partly based on the circuitry configured for determining one or more of at least one light condition or at least one weather condition present at the location of the device comprises:

circuitry configured for determining one or more picture services requiring access to picture data stored on the device at least partly based on the circuitry configured for monitoring the location of the device and at least partly based on the circuitry configured for determining one or more of at least one light condition or at least one weather condition present at the location of the device.

3. The system of claim 1, wherein circuitry configured for determining one or more picture services requiring access to a particular portion of the device at least partly based on the circuitry configured for monitoring the location of the device and at least partly based on the circuitry configured for determining one or more of at least one light condition or at least one weather condition present at the location of the device comprises:

circuitry configured for determining one or more picture services requiring access to an image capturing component of the device at least partly based on the circuitry configured for monitoring the location of the device and at least partly based on the circuitry configured for determining one or more of at least one light condition or at least one weather condition present at the location of the device.

4. The system of claim 1, wherein circuitry configured for determining one or more picture services requiring access to a particular portion of the device at least partly based on the circuitry configured for monitoring the location of the device and at least partly based on the circuitry configured for determining one or more of at least one light condition or at least one weather condition present at the location of the device comprises:

circuitry configured for determining one or more picture services operable to request a user of the device to upload at least one picture captured using an image capturing component of the device at least partly based on the circuitry configured for monitoring the location of the device and at least partly based on the circuitry configured for determining one or more of at least one light condition or at least one weather condition present at the location of the device.

5. The system of claim 4, wherein circuitry configured for determining one or more picture services operable to request a user of the device to upload at least one picture captured using an image capturing component of the device at least partly based on the circuitry configured for monitoring the location of the device and at least partly based on the circuitry configured for determining one or more of at least one light condition or at least one weather condition present at the location of the device comprises:

circuitry configured for determining one or more picture services operable to request a user of the device to upload at least one picture captured using an image capturing component of the device or at least partly based on one or more locations of interest determined by the circuitry configured for monitoring the location of the device as being visited by the device and at least partly based on the circuitry configured for determining one or more of at least one light condition or at least one weather condition present at the location of the device.

6. The system of claim 1, wherein circuitry configured for monitoring the location of the device comprises:

circuitry configured for determining that the device is visiting at least one location for which at least one interest in receiving at least one picture associated with the at least one location has been expressed by at least one entity in communication with at least one of the device or the one or more picture services.

7. The system of claim 1, wherein circuitry configured for facilitating presentation, to the device, of the determined one or more picture services requiring access to the particular portion of the device, the presentation including at least a request for access to the particular portion of the device comprises:

circuitry configured for facilitating presentation, via the device, of at least one request of the one or more picture services to provide access to the particular portion of the device, including at least one request for a user of the device to direct an image capturing component of the device towards at least one point of interest proximate to the device and upload at least one picture of the at least one point of interest proximate to the device captured using the image capturing component of the device.

8. The system of claim 1, wherein circuitry configured for facilitating presentation, to the device, of the determined one or more picture services requiring access to the particular portion of the device, the presentation including at least a request for access to the particular portion of the device comprises:

circuitry configured for causing the device to provide a user notification that the device is in proximity of at least one location associated with at least one interest in receiving at least one picture via the one or more picture services, the user notification including at least one request to at least one user of the device to upload to the one or more picture services at least one picture captured using an image capturing component of the device; and circuitry configured for uploading at least one picture to the one or more picture services after a user of the device has captured at least one picture using the image capturing component of the device.

9. The system of claim 1, wherein circuitry configured for determining one or more picture services requiring access to a particular portion of the device at least partly based on the circuitry configured for monitoring the location of the device and at least partly based on the circuitry configured for determining one or more of at least one light condition or at least one weather condition present at the location of the device comprises:

circuitry configured for receiving at least one request from the one or more picture services, the at least one request originating from the one or more picture services at least partly based on the monitored location of the device and at least partly based on at least one light condition detected by at least one light sensor of the device, the at least one request including at least a request for access to the particular portion of the device.

10. The system of claim 9, wherein circuitry configured for receiving at least one request from the one or more picture services, the at least one request originating from the one or more picture services at least partly based on the monitored location of the device and at least partly based on at least one light condition detected by at least one light sensor of the device, the at least one request including at least a request for access to the particular portion of the device comprises:
  circuitry configured for receiving at least one request from one or more picture services, the at least one request originating from the one or more picture services responsive to at least one indication associated with the monitoring the location of the device that the device is in a proximity of at least one location for which at least one interest in receiving at least one picture associated with the at least one location has been expressed by at least one entity in communication with the device and with the one or more picture services and responsive to at least one indication associated with the at least one light sensor of the device that at least one good picture could be captured of the at least one location for which the at least one interest in receiving the at least one picture associated with the at least one location has been expressed by the at least one entity in communication with the device and with the one or more picture services.

11. The system of claim 1, wherein circuitry configured for receiving permission to monitor a location of a device, the device configured to carry out one or more services comprises:
  circuitry configured for receiving permission to monitor a location of the device as a part of a service agreement for use of the device.

12. The system of claim 11, wherein circuitry configured for receiving permission to monitor a location of the device as a part of a service agreement for use of the device comprises:
  circuitry configured for receiving permission to monitor a location of the device as a part of a service agreement entered into with at least one of a manufacturer of the device or a provider of an operating system installed on the device for use of the device.

13. The system of claim 1, wherein circuitry configured for receiving permission to monitor a location of a device, the device configured to carry out one or more services comprises:
  circuitry configured for detecting, by the device, at least one indication of a user of the device desiring to use at least one of one or more location-related applications or one or more location-related services configured to be carried out at least partially via running an application on the device or accessing a communication network via the device;
  circuitry configured for providing, by the device, at least one notification to the user of the device that a location of the device may be provided to at least one of one or more applications or one or more services other than the at least one of one or more location-related applications or one or more location-related services desired to be used by the user of the device; and
  circuitry configured for receiving an indication of permission of the user for the device to provide the location of the device to the at least one of one or more applications or one or more services other than the at least one of one or more location-related applications or one or more location-related services desired to be used by the user of the device.

14. The system of claim 1, wherein circuitry configured for monitoring the location of the device comprises:
  circuitry configured for monitoring the location of the device at least partially via location services of the device.

15. The system of claim 1, wherein circuitry configured for monitoring the location of the device comprises:
  circuitry configured for monitoring the location of the device at least partially via location services provided by an operating system of the device.

16. The system of claim 1, wherein circuitry configured for monitoring the location of the device comprises:
  circuitry configured for monitoring at least one indication of the location of the device determined at least partially via one or more of at least one satellite positioning sensor of the device, at least one cellular connection of the device, or at least one accelerometer of the device.

17. The system of claim 1, wherein circuitry configured for monitoring the location of the device comprises:
  circuitry configured for transmitting the location of the device to at least one entity associated with the one or more picture services, the location of the device usable by the at least one entity associated with the one or more picture services for determining whether the device is in proximity of at least one location associated with at least one interest in receiving at least one picture via the one or more picture services.

18. The system of claim 1, wherein circuitry configured for monitoring the location of the device comprises:
  circuitry configured for monitoring at least one indication of the location of the device determined at least partially via at least one identifier of at least one wireless access point to which the device is connected.

19. The system of claim 1, wherein circuitry configured for monitoring the location of the device comprises:
  circuitry configured for monitoring the location of the device via a communication network used by the device.

20. The system of claim 1, wherein circuitry configured for determining one or more picture services requiring access to a particular portion of the device at least partly based on the circuitry configured for monitoring the location of the device and at least partly based on the circuitry configured for determining one or more of at least one light condition or at least one weather condition present at the location of the device comprises:
  circuitry configured for determining one or more mapping services requiring access to the location of the device.

21. The system of claim 20, wherein circuitry configured for determining one or more mapping services requiring access to the location of the device comprises:
  circuitry configured for determining one or more mapping services requiring access to the location of the device, the one or more mapping services including at least availability of one or more pictures associated with one or more locations of interest indexed by the one or more mapping services.

22. The system of claim 1, wherein circuitry configured for receiving permission to monitor a location of the device, the device configured to carry out one or more services comprises:

circuitry configured for receiving permission to monitor a location of the device as a part of a service agreement entered into with at least one of (a) a provider of a mapping application installed on the device for use of the mapping application installed on the device or (b) a provider of telecommunications services for the device for facilitating telecommunications services via the device.

23. The system of claim 1, wherein circuitry configured for receiving permission to monitor a location of the device, the device configured to carry out one or more services comprises:
   circuitry configured for detecting a request from a user of the device for the device to provide location information to one or more of at least one application or at least one service on the device; and
   circuitry configured for causing the device to prompt the user of the device to grant permission for access to the location information to be provided.

24. The system of claim 23, wherein circuitry configured for detecting a request from a user of the device for the device to provide location information to one or more of at least one application or at least one service on the device comprises:
   circuitry configured for detecting a request from a user of the device for the device to activate at least one satellite positioning sensor of the device.

25. The system of claim 23, wherein circuitry configured for detecting a request from a user of the device for the device to provide location information to one or more of at least one application or at least one service on the device comprises:
   circuitry configured for detecting a request from a user of the device for the device to turn location services on.

26. The system of claim 23, wherein circuitry configured for causing the device to prompt the user of the device to grant permission for access to the location information to be provided comprises:
   circuitry configured for causing the device to notify the user that one or more of at least one application or at least one service other than one or more applications or services associated with the request to provide location information will have access to location information related to the device; and
   circuitry configured for providing a selection opportunity for the user of the device to consent to access by the one or more of at least one application or at least one service other than one or more applications or services associated with the request to the location information related to the device.

27. The system of claim 26, wherein circuitry configured for causing the device to notify the user that one or more of at least one application or at least one service other than one or more applications or services associated with the request to provide location information will have access to location information related to the device comprises:
   circuitry configured for causing the device to notify the user that one or more of at least one application or at least one service in addition to one or more mapping applications or services requiring access to location information related to the device may also have access to location information related to the device.

28. The system of claim 1, further comprising:
   circuitry configured for uploading at least one picture to the one or more picture services after a user of the device has captured at least one picture using an image capturing component of the device for sharing via the one or more picture services, the at least one picture including at least one still picture or at least one moving picture.

29. The system of claim 1, wherein circuitry configured for determining one or more picture services requiring access to a particular portion of the device at least partly based on the circuitry configured for monitoring the location of the device and at least partly based on the circuitry configured for determining one or more of at least one light condition or at least one weather condition present at the location of the device comprises:
   circuitry configured for determining one or more cloud services providing access to one or more pictures to one or more users of the one or more cloud services, the one or more cloud services requiring access to one or more pictures captured by an image capturing component of the device at least partly based on the circuitry configured for monitoring the location of the device and at least partly based on the circuitry configured for determining one or more of at least one light condition or at least one weather condition present at the location of the device.

30. The system of claim 1, wherein circuitry configured for determining one or more of at least one light condition or at least one weather condition present at the location of the device comprises:
   circuitry configured for receiving permission to monitor light conditions present in a vicinity of the device in association with the receiving permission to monitor a location of the device; and
   circuitry configured for receiving one or more light conditions present at the location of the device.

31. The system of claim 30, wherein circuitry configured for receiving permission to monitor light conditions present in a vicinity of the device in association with the receiving permission to monitor a location of the device comprises:
   circuitry configured for receiving permission to access an image capturing component of the device for monitoring light conditions present in a vicinity of the device.

32. The system of claim 30, wherein circuitry configured for receiving one or more light conditions present at the location of the device comprises:
   circuitry configured for receiving one or more images captured by the image capturing component of the device; and
   circuitry configured for analyzing the one or more images captured by the image capturing component of the device to infer one or more light conditions present in the vicinity of the device.

33. The system of claim 30, wherein circuitry configured for receiving one or more light conditions present at the location of the device comprises:
   circuitry configured for receiving one or more light conditions determined by an application running on the device at least partly through access of the image capturing component of the device.

34. The system of claim 30, wherein circuitry configured for determining one or more of at least one light condition or at least one weather condition present at the location of the device comprises:
   circuitry configured for obtaining, at least partly based on at least one location received via the circuitry configured for monitoring the location of the device, one or more current weather conditions at the at least one location from at least one weather service.

35. The system of claim 30, wherein circuitry configured for determining one or more picture services requiring access to a particular portion of the device at least partly based on the circuitry configured for monitoring the location of the device and at least partly based on the circuitry configured for determining one or more of at least one light condition or at least one weather condition present at the location of the device comprises:

circuitry configured for monitoring one or more weather conditions and one or more light conditions at the location of the device and determining that there is a possibility of a good picture of at least one of a landmark or point of interest proximate to the location of the device.

36. A system, comprising:

circuitry configured for receiving, by a server, at least one indication of permission of at least one user of at least one user device to monitor a location of the user device, the user device configured for accessing, through at least one of one or more applications or one or more services installed on the user device, one or more cloud services provided at least partially via the server device;

circuitry configured for monitoring the location of the user device, including at least receiving, by the server, one or more indications of location of the user device determined at least in part via one or more location services of the user device;

circuitry configured for determining one or more of at least one light condition or at least one weather condition present at the location of the device;

circuitry configured for determining, by the server, one or more cloud services requiring access to a particular portion of the user device at least partly based on the circuitry configured for monitoring the location of the user device and at least partly based on the circuitry configured for determining one or more of at least one light condition or at least one weather condition present at the location of the device, including at least:

circuitry configured for determining that the user device is in proximity of at least one location associated with a requirement for at least one picture of the at least one location for storage by the one or more cloud services;

circuitry configured for determining that one or more of at least one light condition or at least one weather condition present at the location of the device at least partly facilitates capture of at least one picture of the at least one location; and circuitry configured for determining that access to at least one picture captured by the user device in the one or more of at least one light condition or at least one weather condition present at the location of the device may fulfill the requirement for at least one picture of the at least one location for storage by the one or more cloud services; and circuitry configured for facilitating presentation, to the user device, of the determined one or more cloud services requiring access to the particular portion of the user device, including at least transmitting, by the server device, at least one indication to the user device to cause the user device to request that a user of the user device upload at least one picture captured using an image capturing component of the user device for providing cloud-based access to the at least one picture by the one or more cloud services.

37. A user device, comprising:

at least one processing device; and at least one non-transitory computer-readable medium including at least one or more instructions which, when executed by the at least one processing device, cause the at least one user device to perform one or more operations including at least:

detecting at least one indication of a user of the user device desiring to use at least one of one or more location-related applications or one or more location-related services configured to be carried out at least partially via running an application on the user device or accessing a communication network via the user device;

providing at least one notification to the user of the user device that a location of the user device may be provided to at least one of one or more applications or one or more services other than the at least one of one or more location-related applications or one or more location-related services desired to be used by the user of the user device;

receiving an indication of permission of the user for the user device to provide the location of the user device to the at least one of one or more applications or one or more services other than the at least one of one or more location-related applications or one or more location-related services desired to be used by the user of the user device;

monitoring the location of the user device, including at least transmitting at least one indication of the location of the user device determined at least partially via one or more of at least one satellite positioning sensor of the user device, at least one cellular connection of the user device, or at least one accelerometer of the user device;

transmitting one or more of at least one light condition or at least one weather condition present at the location of the user device;

receiving at least one request from the one or more picture services, the at least one request originating from the one or more picture services at least partly responsive to at least one indication associated with the monitoring the location of the user device that the user device is in a proximity of at least one location for which at least one interest in receiving at least one picture associated with the at least one location has been expressed by at least one entity in communication with at least one of the user device or the one or more picture services and at least partly responsive to the one or more of at least one light condition or at least one weather condition present at the location of the user device;

causing the user device to provide a user notification that the user device is in proximity of at least one location associated with at least one interest in receiving at least one picture via the one or more picture services, the user notification including at least one request to at least one user of the user device to upload to the one or more picture services at least one picture at least one of captured using an image capturing component of the user device or stored on the user device; and uploading at least one picture to the one or more picture services after a user of the user device has at least one of captured at least one picture using the image capturing component of the user device or selected at least one picture stored on the user device for sharing via the one or more picture services.

\* \* \* \* \*